(12) United States Patent
Kim et al.

(10) Patent No.: US 9,603,169 B2
(45) Date of Patent: Mar. 21, 2017

(54) METHOD AND DEVICE FOR TRANSMITTING AND RECEIVING APERIODIC REFERENCE SIGNAL

(75) Inventors: Jong Nam Kim, Seoul (KR); Kyoungmin Park, Seoul (KR)

(73) Assignee: Pantech Inc., Ltd., Seoul (KR)

( * ) Notice: Subject to any disclaimer, the term of this patent is extended or adjusted under 35 U.S.C. 154(b) by 383 days.

(21) Appl. No.: 13/883,750

(22) PCT Filed: Nov. 3, 2011

(86) PCT No.: PCT/KR2011/008327
§ 371 (c)(1),
(2), (4) Date: May 6, 2013

(87) PCT Pub. No.: WO2012/060641
PCT Pub. Date: May 10, 2012

(65) Prior Publication Data
US 2013/0223397 A1    Aug. 29, 2013

(30) Foreign Application Priority Data

Nov. 5, 2010 (KR) .................. 10-2010-0110073
Nov. 5, 2010 (KR) .................. 10-2010-0110075

(51) Int. Cl.
*H04W 4/00* (2009.01)
*H04W 74/08* (2009.01)
(Continued)

(52) U.S. Cl.
CPC ......... *H04W 74/085* (2013.01); *H04L 1/0027* (2013.01); *H04L 1/0079* (2013.01);
(Continued)

(58) Field of Classification Search
CPC .......... H04J 11/00; H04B 7/26; H04W 48/12; H04W 72/12
(Continued)

(56) References Cited

U.S. PATENT DOCUMENTS

2009/0207784 A1* 8/2009 Lee .................. H04B 7/063
                                                    370/328
2009/0323664 A1* 12/2009 Li .................... H04L 5/0051
                                                    370/344
(Continued)

FOREIGN PATENT DOCUMENTS

KR   10-2010-0106437      10/2010
WO   2010-082756           7/2010
(Continued)

OTHER PUBLICATIONS

International Search Report issued for International Application No. PCT/KR2011/008327 dated May 18, 2012.
(Continued)

*Primary Examiner* — Khaled Kassim
*Assistant Examiner* — Berhanu Belete
(74) *Attorney, Agent, or Firm* — H.C. Park & Associates, PLC

(57) ABSTRACT

Disclosed are a method and a device for transmitting and receiving an aperiodic reference signal. The method for receiving an aperiodic reference signal comprises: allowing a reference signal receiving device to determine a radio resource area that can be calculated by environmental information from a first reference signal transmission device, and to transmit an aperiodic reference signal to the first reference signal transmission device by including first instruction information which instructs the aperiodic reference signal to be transmitted in the radio resource area; transmitting the aperiodic reference signal by including second instruction information which instructs a second reference signal transmission device, to which a periodic reference signal is to be transmitted in said radio resource area; and receiving the aperiodic reference signal from the first reference signal transmission device in the radio resource area.

8 Claims, 31 Drawing Sheets

| SRS CONFIGURATION INDEX $I_{SRS}$ | SRS PERIODICITY $T_{SRS}$(ms) | SRS SUBFRAME OFFSET $T_{offset}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-36 | 20 | $I_{SRS}-17$ |
| 37-76 | 40 | $I_{SRS}-37$ |
| 77-156 | 80 | $I_{SRS}-77$ |
| 157-316 | 160 | $I_{SRS}-157$ |
| 317-636 | 320 | $I_{SRS}-317$ |
| 637-1023 | RESERVED | RESERVED |

310

(51) Int. Cl.
*H04L 5/00* (2006.01)
*H04L 1/00* (2006.01)
(52) U.S. Cl.
CPC .......... *H04L 5/0023* (2013.01); *H04L 5/0048* (2013.01); *H04L 5/0094* (2013.01)
(58) Field of Classification Search
USPC .................................................. 370/328–329
See application file for complete search history.

(56) References Cited

U.S. PATENT DOCUMENTS

| | | | | |
|---|---|---|---|---|
| 2010/0080269 A1* | 4/2010 | Kim | .................. | H04L 5/0032 375/211 |
| 2010/0111107 A1* | 5/2010 | Han | .................. | H04L 1/0038 370/472 |
| 2010/0208629 A1* | 8/2010 | Ahn | .................. | H04L 1/1607 370/280 |
| 2011/0009139 A1* | 1/2011 | Nagata | .................. | H04W 24/10 455/509 |
| 2011/0085458 A1* | 4/2011 | Montojo | .............. | H04L 1/0038 370/252 |
| 2011/0090862 A1* | 4/2011 | Liang | .................. | H04L 5/0007 370/329 |
| 2011/0103327 A1* | 5/2011 | Lee | .................. | H04W 48/12 370/329 |
| 2011/0171964 A1* | 7/2011 | Lin et al. | .................. | 455/450 |
| 2011/0194523 A1* | 8/2011 | Chung | .................. | H04L 5/0053 370/329 |
| 2011/0211489 A1* | 9/2011 | Chung | .................. | H04L 5/001 370/252 |
| 2011/0261716 A1* | 10/2011 | Kim | .................. | H04B 7/0671 370/252 |
| 2012/0008588 A1* | 1/2012 | Chung | .................. | H04B 7/0613 370/329 |
| 2012/0014349 A1* | 1/2012 | Chung | .................. | H04B 7/0684 370/329 |
| 2012/0039228 A1* | 2/2012 | Wang | .................. | H04W 76/002 370/311 |
| 2012/0039298 A1* | 2/2012 | Lee | .................. | H04L 5/0051 370/330 |
| 2012/0044826 A1* | 2/2012 | Wang | .................. | H04W 72/005 370/252 |
| 2012/0076115 A1* | 3/2012 | Noh | .................. | H04B 7/2656 370/336 |
| 2012/0134275 A1* | 5/2012 | Choi et al. | .................. | 370/241 |
| 2012/0182957 A1* | 7/2012 | Noh | .................. | H04L 5/0048 370/329 |
| 2012/0224552 A1* | 9/2012 | Feuersanger | ......... | H04L 5/0007 370/329 |
| 2012/0281625 A1* | 11/2012 | Noh et al. | .................. | 370/328 |
| 2013/0128855 A1* | 5/2013 | Noh | .................. | H04W 72/0453 370/329 |
| 2013/0182674 A1* | 7/2013 | Lunttila | .................. | H04L 5/001 370/329 |
| 2013/0194908 A1* | 8/2013 | Gao et al. | .................. | 370/203 |

FOREIGN PATENT DOCUMENTS

WO     2010-123287     10/2010
WO     WO 2011034400 A3 *  8/2011

OTHER PUBLICATIONS

Catt,"Remaining issues on SRS transmission in Rel-10", 3GPP TSG RAN WG1 Meeting #62bis, R1-105174, Xi'an, China, Oct. 11-15, 2010, 5 pages.
Texas Instruments,"Resource Allocation and Signaling for Aperiodic Sounding", 3GPP TSG RAN WGI #62bis, R1-105291, Xian, China, Oct. 11-15, 2010, 4 pages.
Samsung et al. "Way Forward on Aperiodic SRS" 3GPP TSG RAN WG1 #62bis, R1-105787, Xian, China, Oct. 11-15, 2010, 2 pages.
Nokia Siemens Networks et al. "Channel sounding enhancements for LTE-Adanced uplink", 3Gpp TSG Meetng #60, R1-101438, San Francisco, US, Feb. 22-26, 2010, 3 Pages.

* cited by examiner

FIG.2

| SRS-SUBFRAMECONFIG | BINARY | CONFIGURATION PERIOD $T_{SFC}$ (SUBFRAMES) | TRANSMISSION OFFSET $\Delta_{SFC}$ (SUBFRAMES) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0,1} |
| 8 | 1000 | 5 | {2,3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0,1,2,3,4,6,8} |
| 14 | 1110 | 10 | {0,1,2,3,4,5,6,8} |
| 15 | 1111 | RESERVED | RESERVED |

210

| SRS CONFIGURATION INDEX $I_{SRS}$ | SRS PERIODICITY $T_{SRS}$ (ms) | SRS SUBFRAME OFFSET $T_{offset}$ |
|---|---|---|
| 0-1 | 2 | $I_{SRS}$ |
| 2-6 | 5 | $I_{SRS}-2$ |
| 7-16 | 10 | $I_{SRS}-7$ |
| 17-36 | 20 | $I_{SRS}-17$ |
| 37-76 | 40 | $I_{SRS}-37$ |
| 77-156 | 80 | $I_{SRS}-77$ |
| 157-316 | 160 | $I_{SRS}-157$ |
| 317-636 | 320 | $I_{SRS}-317$ |
| 637-1023 | RESERVED | RESERVED |

| SRS BANDWIDTH CONFIGURATION | SRS-BANDWIDTH $B_{SRS}=0$ | | SRS-BANDWIDTH $B_{SRS}=1$ | | SRS-BANDWIDTH $B_{SRS}=2$ | | SRS-BANDWIDTH $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

FIG.7

| SRS BANDWIDTH CONFIGURATION $C_{SRS}$ | SRS-BANDWIDTH $B_{SRS}=0$ | | SRS-BANDWIDTH $B_{SRS}=1$ | | SRS-BANDWIDTH $B_{SRS}=2$ | | SRS-BANDWIDTH $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 96 | 1 | 48 | 2 | 24 | 2 | 4 | 6 |
| 1 | 96 | 1 | 32 | 3 | 16 | 2 | 4 | 4 |
| 2 | 80 | 1 | 40 | 2 | 20 | 2 | 4 | 5 |
| 3 | 72 | 1 | 24 | 3 | 12 | 2 | 4 | 3 |
| 4 | 64 | 1 | 32 | 2 | 16 | 2 | 4 | 4 |
| 5 | 60 | 1 | 20 | 3 | 4 | 5 | 4 | 1 |
| 6 | 48 | 1 | 24 | 2 | 12 | 2 | 4 | 3 |
| 7 | 48 | 1 | 16 | 3 | 8 | 2 | 4 | 2 |

FIG.8

| SRS BANDWIDTH CONFIGURATION | SRS-BANDWIDTH $B_{SRS}=0$ | | SRS-BANDWIDTH $B_{SRS}=1$ | | SRS-BANDWIDTH $B_{SRS}=2$ | | SRS-BANDWIDTH $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 72 | 1 | 24 | 3 | 12 | 2 | 4 | 3 |
| 1 | 64 | 1 | 32 | 2 | 16 | 2 | 4 | 4 |
| 2 | 60 | 1 | 20 | 3 | 4 | 5 | 4 | 1 |
| 3 | 48 | 1 | 24 | 2 | 12 | 2 | 4 | 3 |
| 4 | 48 | 1 | 16 | 3 | 8 | 2 | 4 | 2 |
| 5 | 40 | 1 | 20 | 2 | 4 | 5 | 4 | 1 |
| 6 | 36 | 1 | 12 | 3 | 4 | 3 | 4 | 1 |
| 7 | 32 | 1 | 16 | 2 | 8 | 2 | 4 | 2 |

FIG.9

| SRS BANDWIDTH CONFIGURATION | SRS-BANDWIDTH $B_{SRS}=0$ | | SRS-BANDWIDTH $B_{SRS}=1$ | | SRS-BANDWIDTH $B_{SRS}=2$ | | SRS-BANDWIDTH $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

FIG.10

| SRS BANDWIDTH CONFIGURATION | SRS-BANDWIDTH $B_{SRS}=0$ | | SRS-BANDWIDTH $B_{SRS}=1$ | | SRS-BANDWIDTH $B_{SRS}=2$ | | SRS-BANDWIDTH $B_{SRS}=3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 0 | 36 | 1 | 12 | 3 | 4 | 3 | 4 | 1 |
| 1 | 32 | 1 | 16 | 2 | 8 | 2 | 4 | 2 |
| 2 | 24 | 1 | 4 | 6 | 4 | 1 | 4 | 1 |
| 3 | 20 | 1 | 4 | 5 | 4 | 1 | 4 | 1 |
| 4 | 16 | 1 | 4 | 4 | 4 | 1 | 4 | 1 |
| 5 | 12 | 1 | 4 | 3 | 4 | 1 | 4 | 1 |
| 6 | 8 | 1 | 4 | 2 | 4 | 1 | 4 | 1 |
| 7 | 4 | 1 | 4 | 1 | 4 | 1 | 4 | 1 |

FIG.12

| STATE (BINARY) | ASRS ANTENNA CONFIGURATION | ASRS TRANSMISSION BW(RB) |
|---|---|---|
| 0 (000) | NO APERIODIC SRS ACTIVATION (NO APERIODIC SRS ACTIVATION) | |
| 1 (001) | ONE OF ANTENNA CONFIGURATIONS {1TX, 2TX, 4TX} | ONE OF BANDWIDTHS $\{m_{SRS,0}, m_{SRS,1}, m_{SRS,2}\}$ |
| 2 (010) | ONE OF ANTENNA CONFIGURATIONS {1TX, 2TX, 4TX} | ONE OF BANDWIDTHS $\{m_{SRS,0}, m_{SRS,1}, m_{SRS,2}\}$ |
| 3 (011) | ONE OF ANTENNA CONFIGURATIONS {1TX, 2TX, 4TX} | ONE OF BANDWIDTHS $\{m_{SRS,0}, m_{SRS,1}, m_{SRS,2}\}$ |
| 4 (100) | ONE OF ANTENNA CONFIGURATIONS {1TX, 2TX, 4TX} | ONE OF BANDWIDTHS $\{m_{SRS,0}, m_{SRS,1}, m_{SRS,2}\}$ |
| 5 (101) | ONE OF ANTENNA CONFIGURATIONS {1TX, 2TX, 4TX} | ONE OF BANDWIDTHS $\{m_{SRS,0}, m_{SRS,1}, m_{SRS,2}\}$ |
| 6 (110) | ONE OF ANTENNA CONFIGURATIONS {1TX, 2TX, 4TX} | ONE OF BANDWIDTHS $\{m_{SRS,0}, m_{SRS,1}, m_{SRS,2}\}$ |
| 7 (111) | PERIODIC SRS HOLDING (PERIODIC SRS HOLDING) | |

FIG.22

| ASRS ANTENNA CONFIGURATION | ASRS TRANSMISSION BW(RB) |
|---|---|
| 1TX | $m_{SRS,0}$ |
| 2TX | $m_{SRS,1}$ |
| 4TX | $m_{SRS,2}$ |

FIG.23

| ASRS ANTENNA CONFIGURATION | TOTAL ASRS ALLOCATION BW(RB) |
|---|---|
| 1TX | $m_{SRS,0}$ |
| 2TX | $m_{SRS,1} \times \lceil N_1/2 \rceil$ |
| 4TX | $m_{SRS,0} - m_{SRS,1} \times \lceil N_1/2 \rceil$ |

2310 (2TX row), 2320 (4TX row)

FIG.24

| ASRS ANTENNA CONFIGURATION | TOTAL ASRS ALLOCATION BW(RB) |
|---|---|
| 1TX | $m_{SRS,0}$ |
| 2TX | $m_{SRS,0} - m_{SRS,1} \times \lceil N_1/2 \rceil$ |
| 4TX | $m_{SRS,1} \lceil N_1/2 \rceil$ |

METHOD AND DEVICE FOR TRANSMITTING AND RECEIVING APERIODIC REFERENCE SIGNAL

CROSS-REFERENCE TO RELATED APPLICATION

This application is the National Stage Entry of International Application No. PCT/KR2011/008327, filed on Nov. 3, 2011, and claims priority to and the benefit of Korean Patent Application Nos. 10-2010-0110073, filed on Nov. 5, 2010 and 10-2010-0110075, filed on Nov. 5, 2010, all of which are incorporated by reference as if fully set forth herein.

BACKGROUND

Field

The present invention relates to a wireless communication system, and more particularly to a method and apparatus for transmitting and receiving an aperiodic reference signal using implicit information, which can rapidly and effectively instruct an aperiodic transmission of a reference signal in order to measure or presume a state of resource in an Orthogonal Frequency Division Multiple Access (OFDMA) wireless communication system while being capable of preventing the aperiodic reference from colliding with a periodic reference signal.

DISCUSSION OF THE BACKGROUND

With the progress of communication systems, consumers such as companies and individuals have used a wide variety of wireless terminals.

In current mobile communication systems such as a $3^{rd}$ Generation Partnership Project (3GPP), a Long Term Evolution (LTE), an LTE Advanced (LTE-A), and the like, as a high-speed and high-capacity communication system capable of transmitting and receiving various data such as images and wireless data beyond voice-based services, it is required to develop a technology which is capable of transmitting a large amount of data comparable with a wired communication network. In addition, an error detection method capable of improving system performance by minimizing information loss and increasing a transmission efficiency of a system, has been a prerequisite for the communication system.

Meanwhile, in various communication systems, currently, various signals have been used in order to provide information on a communication environment, and the like, to another device through an uplink or a downlink. For example, reference signals have been used as an example of signals.

For example, in a system using the LTE, among the mobile communication schemes, a Sounding Reference Signal (SRS) is transmitted to a base station as a channel reference (a reference signal for channel measurement or channel presumption) instructing a channel state of a User Equipment (hereinafter, referred to as UE or terminal) during an uplink transmission. On the other hand, a Cell-specific Reference Signal (CRS) which is a reference signal, is transmitted to the base station each sub-frame in order to identify channel information during a downlink.

Generally, the reference signals are periodically generated by a transmission device for the reference signals, i.e. the UE in a case of an uplink reference signal and the base station in a case of a downlink reference signal, and transmitted to a reception device for the reference signals.

However, by reason of a flexibility of the recent communication system, a discussion on an aperiodic transmission of a channel presumption reference signal has proceeded. A detailed scheme of the aperiodic transmission of the channel presumption reference signal has not been decided yet. In the current communication system concerning this circumstance, it is necessary for a detail scheme of aperiodically transmitting a channel presumption reference signal.

SUMMARY

Accordingly, an aspect of the present invention is to provide a technology of aperiodically transmitting and receiving a reference signal, in which configuration information is transmitted and received through a physical channel including instruction information.

Another aspect of the present invention is to provide a technology of aperiodically transmitting a reference signal in order to measure or presume a channel state of a UE, in a communication system.

A purpose of an aperiodic SRS transmission is to obtain uplink channel information in rapid time. Therefore, the SRS transmission has to be able to perform a dynamic sounding resource allocation. For the purpose, the aspect of the present invention enables all or a part of configuration information with relation to the aperiodic SRS transmission to be rapidly transmitted through a physical level, so as to control the aperiodic transmission of the SRS.

Further, according to the aspect of the present invention, a holding of a periodic reference signal is instructed in order to prevent an aperiodic reference signal from colliding with the periodic reference signal, and a set of parameters relating to the aperiodic reference signal can be set.

Still another aspect of the present invention is to provide a technology of transmitting and receiving an aperiodic reference signal based on implicit information calculation in order to more rapidly transmit configuration information to control the transmission and reception of a reference signal for an aperiodic channel measurement to a UE.

Yet still another aspect of the present invention is to provide a technology of transmitting and receiving an aperiodic reference signal through a multiple antenna uplink allocation, in which configuration information is configured to control a transmission and reception of a reference signal.

In accordance with an aspect of the present invention, there is provided a method of receiving an aperiodic reference signal. The method includes the steps of: allowing a reference signal receiving device to determine a radio resource area that can be calculated by environmental information from a first reference signal transmission device, and to transmit an aperiodic reference signal to the first reference signal transmission device by including, in a DCI format 4, first instruction information of a 2-bit or 3-bit size which instructs the aperiodic reference signal to be transmitted in the radio resource area; transmitting the aperiodic reference signal by including, in a DCI format 4, second instruction information of a 2-bit size or 3-bit size which instructs a second reference signal transmission device, to which a periodic reference signal is to be transmitted in the radio resource area, to hold the transmission of the periodic reference signal in the radio resource area; and receiving the aperiodic reference signal from the first reference signal transmission device in the radio resource area.

In accordance with another aspect of the present invention, there is provided a method of transmitting an aperiodic reference signal. The method includes the steps of: allowing a reference signal transmission device to receive a radio control signal of a DCI format 4 which includes instruction information of 2 bits or 3 bits for instructing the reference signal transmission device to transmit a reference signal, from a reference signal receiving device; calculating information on a radio resource area in which the aperiodic reference signal is transmitted, from first instruction information and environmental information where the instruction information is first instruction information for instructing the aperiodic reference signal to be transmitted; and holding a periodic reference signal transmission where the instruction information is second instruction information for instructing a periodic reference signal transmission to be held.

In accordance with still another of the present invention, there is provided an apparatus for receiving an aperiodic reference signal. The apparatus includes: a controller for allowing a first reference signal transmission device to determine a radio resource area calculated by environmental information, and to determine a second reference signal device for transmitting a periodic reference signal in the radio resource area; a coding unit for generating a radio control signal for a DCI format 4 including at least one of first instruction information for instructing an aperiodic reference signal to be transmitted in the radio resource area and second instruction information for instructing a transmission of a periodic reference signal which is transmitted in the radio resource area, to be held; and a transmission and reception unit for transmitting the radio control signal to at least one of the first reference signal transmission device and the second reference signal transmission device, and receiving the aperiodic reference signal in the radio resource area from the first reference signal transmission device, wherein the first instruction information and the second instruction information have a size of 2 bits or 3 bits.

In accordance with still another aspect of the present invention, there is provided an apparatus for transmitting an aperiodic reference signal. The apparatus includes: a transmission and reception unit for receiving a radio control signal for a DCI format 4 which includes instruction information of 2 bits or 3 bits for instructing a reference signal to be transmitted, from a reference signal receiving device, and transmitting a reference signal to the reference signal receiving device; a controller for calculating information on a radio resource area in which the aperiodic reference signal is transmitted, from first instruction information and environmental information where the instruction information is the first instruction information for instructing the aperiodic reference signal to be transmitted; and a reference signal generating unit for generating the aperiodic reference signal by using the first instruction information and the environmental information.

In accordance with still another aspect of the present invention, there is provided a method of receiving an aperiodic reference signal. The method includes: allowing a reference signal receiving device to determine a radio resource area calculated by environmental information of a reference signal transmission device; transmitting instruction information for transmitting an aperiodic reference signal to be transmitted in the radio resource area, to the reference signal transmission device; and receiving the aperiodic reference signal from the reference signal transmission device in the radio resource area.

In accordance with still another aspect of the present invention, there is provided a method of transmitting an aperiodic reference signal. The method includes: allowing a reference signal transmission device to receive instruction information for instructing an aperiodic reference signal to be transmitted; calculating information on a radio resource area in which the aperiodic reference signal is transmitted, by using environmental information; and transmitting an aperiodic reference signal to the reference signal receiving device by using the radio resource area information and the instruction information.

In accordance with still another aspect of the present invention, there is provided an apparatus for receiving an aperiodic reference signal. The apparatus includes: a controller for determining a radio resource area calculated by environmental information of a reference signal transmission device; a coding unit for generating a radio control signal including instruction information for instructing an aperiodic reference signal to be transmitted in the radio resource area: and a transmission and reception unit for transmitting the radio control signal to the reference signal transmission device and for receiving the aperiodic reference signal from the reference signal transmission device in the radio resource area.

In accordance with still another aspect of the present invention, there is provided an apparatus for transmitting an aperiodic reference signal. The method includes: a transmission and reception unit for receiving instruction information for instructing an aperiodic reference signal to be transmitted, from a reference signal receiving device and for transmitting an aperiodic reference signal; a controller for calculating a radio resource area in which the aperiodic reference signal is transmitted, by using environmental information; and a reference signal generating unit for an aperiodic reference signal by using the instruction information, wherein the transmission and reception unit transmits an aperiodic reference signal to the reference signal receiving device by using information calculated by the controller.

BRIEF DESCRIPTION OF THE DRAWINGS

FIGS. 2 and 3 are tables showing configuration information on an available SRS sub-frame according to an embodiment of the present specification.

FIG. 4 is a table showing configuration information on an SRS bandwidth.

FIGS. 7 to 10 are tables showing SRS bandwidth configurations and SRS bandwidths corresponding to the number of uplink resource blocks according to an embodiment of the present invention.

FIG. 12 is a table showing a configuration of A-SRS transmission parameter sets corresponding to instruction information of 3 bits according to an embodiment of the present specification.

FIG. 22 is a table showing an A-SRS antenna configuration corresponding to an A-SRS transmission bandwidth according to an embodiment of the present specification, in which the A-SRS antenna configuration is implicitly used as the A-SRS transmission bandwidth.

FIG. 23 is a table showing an A-SRS antenna configuration corresponding to a first allocation bandwidth including an A-SRS transmission bandwidth according to an embodiment of the present specification, in which the A-SRS antenna configuration is implicitly used as the allocation bandwidth.

FIG. 24 is a table showing an A-SRS antenna configuration corresponding to a second allocation bandwidth including an A-SRS transmission bandwidth according to an embodiment of the present specification, in which the A-SRS antenna configuration is implicitly used as the allocation bandwidth.

FIG. 27 is a view illustrating an A-SRS frequency resource which a UE or a base station calculates by applying Equations 2 and 3 in a case that $C_{SRS}$ of Table 6 and FIG. 12 are 1, according to an embodiment of the present specification.

DETAILED DESCRIPTION OF THE ILLUSTRATED EMBODIMENTS

Figure 1:
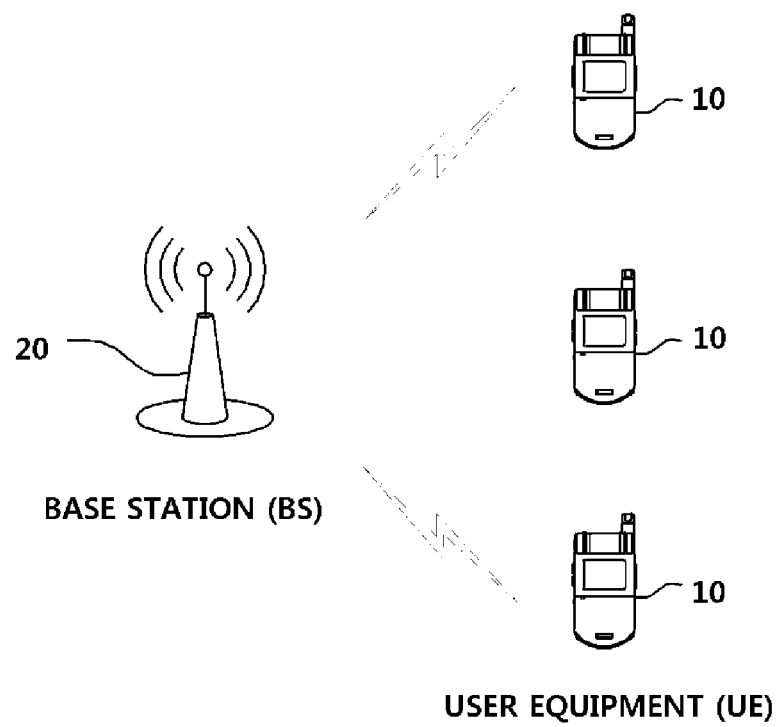
FIG. 1 is a view schematically showing a wireless communication system to which exemplary embodiments of the present specification are applied.

Hereinafter, exemplary embodiments of the present invention will be described in detail with reference to the accompanying drawings. It should be noted that in assigning reference numerals to elements in the drawings, the same elements will be designated by the same reference numerals although they are shown in different drawings. Also, in describing the present invention, a detailed description of publicly-known functions or configurations related to the present invention will be omitted when it is determined that the detailed description thereof may unnecessarily obscure the subject matter of the present invention.

It will be understood that, although the terms first, second, A, B, (a), (b), etc. may be used herein to describe structural elements of the present invention, these terms are only used to distinguish one element from another. The essence, order or sequence of these elements should not be limited by these terms. Also, it will be understood that, in description of "connected", "combined" or "attached" of one element to/with another element, although it is descried that one element is directly connected, combined, or attached to another element, a third element may also be "connected", "combined" or "attached" between the element and said another element.

FIG. 1 shows a wireless communication system to which exemplary embodiments of the present invention are applied.

The wireless communication system is widely arranged in order to provide various communication services, such as voice, packet data, etc.

Referring to FIG. 1, the wireless communication system includes a User Equipment (UE) 10 and a Base Station (BS) 20. The UE 10 and BS 20 have a technology of generating a reference signal for an extended channel presumption, which is applied thereto, as described later, and will be described in detail with reference to FIGS. 3 to 31.

In this specification, the UE 10 has a comprehensive concept implying a user terminal in wireless communication. Accordingly, the UEs should be interpreted as having the concept of including a Mobile Station (MS), a User Terminal (UT), a Subscriber Station (SS), a wireless device, and the like in Global System for Mobile Communications (GMS) as well as User Equipments (UEs) in Wideband Code Division Multiple Access (WCDMA), Long Term Evolution (LTE), High Speed Packet Access (HSPA), etc.

The BS 20 or a cell usually refers to all devices, functions, or a specific area communicating with the UE 10, and may be called different terms, such as a Node-B, an evolved Node-B (eNB), a Base Transceiver System (BTS), an Access Point (AP), and a relay node.

In this specification, the UE 10 or cell should be interpreted as a comprehensive meaning implying an area on which a Base Station Controller (BSC) of the CDMA, a Node-B of the WCDMA, etc. are covered. Also, it is understood that the UE 10 or cell comprehends all of various coverage areas such as a mega-cell, a macro-cell, a micro-cell, a pico-cell, a femto-cell and a relay node communication range, etc.

In this specification, the UE 10 and the BS 20, which are two transmission and reception subjects used to implement a technology or a technical idea described in this specification, are used as a comprehensive meaning, and are not limited by a particularly designated term or word.

There is no limitation to multiple access schemes which are applied to a wireless communication system. It is possible to use various multiple access schemes such as a Code Division Multiple Access (CDMA), a Time Division Multiple Access (TDMA), a Frequency Division Multiple Access (FDMA), an Orthogonal Frequency Division Multiple Access (OFDMA), an OFDM-FDMA, an OFDM-TDMA, an OFDM-CDMA, etc.

An uplink transmission and a downlink transmission can be achieved by a Time Division Duplex (TDD) scheme which performs the transmissions through a different time from each other, or by a Frequency Division Duplex (FDD) scheme which performs the transmissions through a different frequency from each other.

An embodiment of the present invention may be applied to an allocation of resources to both the field of asynchronous wireless communications which have gone through GSM, WCDMA and HSPA, and evolve into Long Term Evolution (LTE) and Long Term Evolution-Advanced (LTE-A), and the field of synchronous wireless communications which evolve into Code Division Multiple Access (CDMA), CDMA-2000 and Ultra Mobile Broadband (UMB). The present invention should not be interpreted as being limited to or restricted by a particular wireless communication field, but should be interpreted as including all technical fields to which the spirit of the present invention can be applied The wireless communication system, to which exemplary embodiments of the present invention are applied, may support an uplink and/or downlink Hybrid Automatic Repeat request (HARQ), and may use a Channel Quality Indicator (CQI) for link adaptation. Also, multiple access schemes for downlink transmission and uplink transmission may be different from each other. For example, Orthogonal Frequency Division Multiple Access (OFDMA) may be used for downlink transmission, and Single Carrier-Frequency Division Multiple Access (SC-FDMA) may be used for uplink transmission.

Levels of radio interface protocol between the UE and a network can be classified into a first level (L1), a second level (L2) and a third level (L3), based on three lower rank levels of an Open System Interconnection (OSI) as widely known in communication systems. A physical level involved in the first level provides an information transfer service using a physical channel.

In a communication system using a Long Term Evolution (LTE) and LTE-Advanced, which is one of the current wireless communication schemes, a Demodulation Reference Signal (DMRS) and a Sounding Reference Signal (SRS) are defined.

More particularly, with relation to the downlink, three types of Reference Signals (RS) are defined, which include a Cell-specific Reference Signal (CRS), a Multicast/Broadcast over Single Frequency Network Reference Signal (MB-SFN-RS), and an User Equipment-specific Reference Signal (UE-specific RS).

In the wireless communication system, the UE transmits a reference signal for an uplink channel measurement or presumption, which is a kind of reference signal, to a single base station in order to transfer uplink channel information to the base station. An example of the reference signal for the channel presumption refers to the SRS which is used in the LTE and LTE-A schemes, and has such a function as that of a pilot channel for an uplink channel.

Hereinafter, a process and a method of controlling an aperiodic transmission of a reference signal will be described in this specification. The reference signal means a signal transmitted between the UE and BS. A channel presumption reference signal and a sound reference signal as examples of the reference signal will be firstly described. However, it should be interpreted that the present invention is not limited to the SRS or the reference signal for the channel presumption or the channel measurement and is a concept including all kinds of reference signals used for the uplink and downlink.

Figure 3:
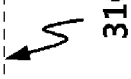

FIGS. 2 and 3 are tables illustrating configuration information of an SRS sub-frame which can be used by an embodiment of the present invention.

A sub-frame for a periodic SRS transmission is determined as a srs-SubframeConfig, as indicated by a reference numeral 210 in FIG. 2. The srs-SubframeConfig of 4-bits 210 is a cell-specific parameter, which is transmitted from a higher layer and can be transmitted as an SRS to a last symbol of a sub-frame to satisfy an Equation 1.

$$\lfloor n_s/2 \rfloor \bmod T_{SFC} \in \Delta_{SFC}, 0 \leq n_s < 20, \qquad \text{Equation 1}$$

In the Equation 1, $T_{SFC}$ is a sub-frame configuration period and $\Delta_{SFC}$ is an offset, which are defined as cell-specific parameters or may be preset values according to the srs-SubframeConfig. The SRS can be transmitted to the last symbol of $n_s$ satisfying the values. The $n_s$ is an index of a slot.

FIG. 2 shows a table of setting a sub-frame of an SRS which is defined in the LTE, in which each srs-Subframe-Configuration is defined by 4 bits. In the table, a transmission period, and an offset to an actual transmission sub-frame of each case is prescribed.

For example, if a value of the srs-SubframeConfiguration is eight (1000 in binary). The SRS is transmitted through second and third sub-frames each period of five sub-frames ($T_{SFC}$ is five, and $\Delta_{SFC}$ is {2, 3}). In this case, the SRS may be transmitted from the last symbol of each sub-frame. For example, where one sub-frame has fourteen symbols (in a case of Normal Cyclic Prefix), an SRS is transmitted from a fourteenth symbol. Where the sub-frame has twelve symbols (in a case of Extended Cyclic Prefix), an SRS is transmitted from a twelfth symbol. Of course, in the present specification, a location at which the SRS is transmitted is not limited to the description.

According to the setting of the SRS, the SRS can be periodically transmitted by each frame period or each transmission period of respective cells (base stations).

On the other hand, the BS notifies each UE of a transmission period and an offset of the SRS through an SRS configuration index (10 bits) 310 which is a UE-specific parameter and is shown in FIG. 3. The transmission period is one value of {2, 5, 10, 20, 40, 80, 160, 320}, and the offset has a number of cases equal to the size each transmission period. For example, if an $I_{SRS}$ is twenty, the transmission period is twenty ms, and the offset is equal to a value of three ms which is obtained by subtracting seventeen from a value of the $I_{SRS}$.

FIG. 4 is a view showing configuration information on an SRS bandwidth, which shows an SRS bandwidth configuration (3-bit) 410 and an SRS bandwidth configuration (2-bit) 420. The SRS bandwidth configuration $C_{SRS}$ is a cell-specific parameter, the same value of which is transferred to all UEs in a cell. On the contrary, the SRS bandwidth $B_{SRS}$ is a UE-specific parameter, different values of which can be respectively allocated to each UE. The UEs in the cell selects one of four SRS bandwidths determined by $C_{SRS}$, and decides a size of the SRS bandwidth to be transferred, through the $B_{SRS}$ which is the UE-specific parameter. The $C_{SRS}$ and $B_{SRS}$ are parameters transferred from a higher level, the values of which are different according to a system bandwidth. FIG. 4 is a view illustrating an example of a case in which a resource block (RB) indicating the system bandwidth is in a range larger than 40 and equal to or smaller than 60 (40<RB≤60). In FIG. 4, if the $C_{SRS}$ is two, and the $B_{SRS}$ is two, the UE has a value of $m_{SRS,2}$=4, $N_2$=5. The value indicates that the SRS transfer bandwidth ($m_{SRS,2}$) is 4RB. An $N_2$ is used as a value for a next SRS transfer. In other words, it is possible to configure information ($N_2$) on whether a frequency band and a range ($m_{SRS,2}$) of a corresponding frequency through which the SRS can be transmitted can start at a certain point, by using the value of $C_{SRS}$ and the value of $B_{SRS}$. For example, if the $C_{SRS}$ is two, and the $B_{SRS}$ also is two, it means that the SRS is wholly transmitted to four RBs ($m_{SRS,2}$=4).

Figure 5:
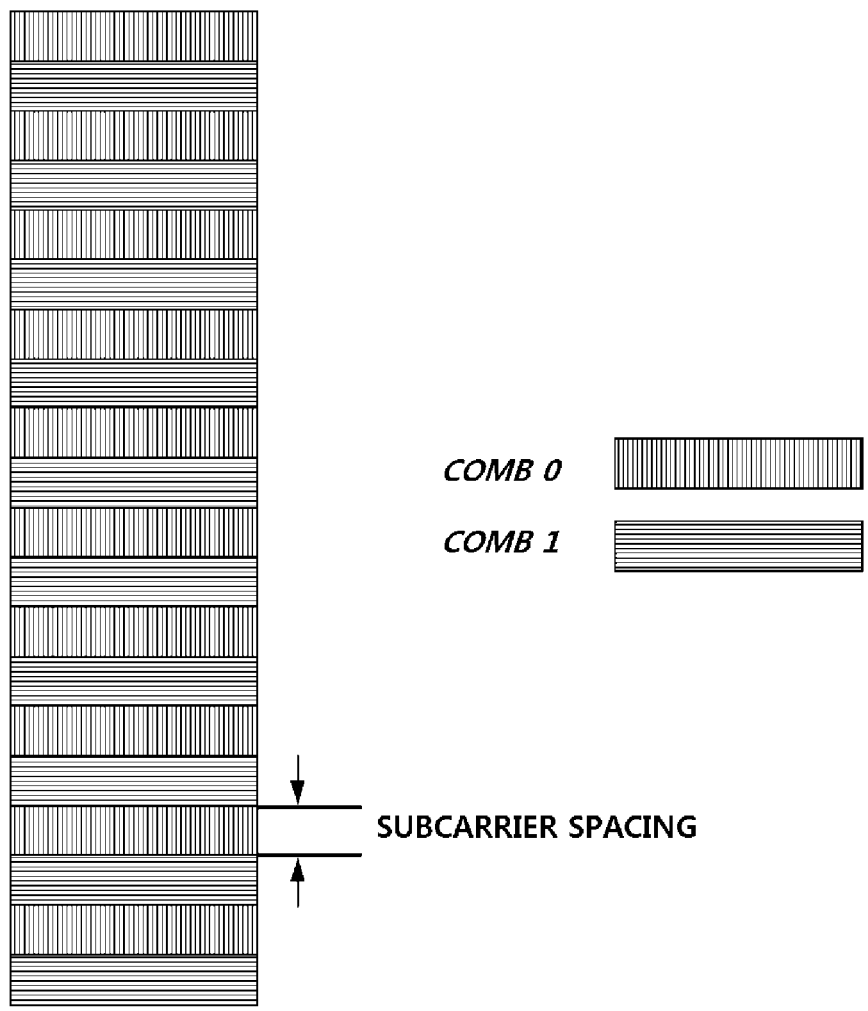
FIGS. 5 and 6 are views illustrating an example of information to be configured with relation to a transmission of an SRS in the present specification.
Figure 6:
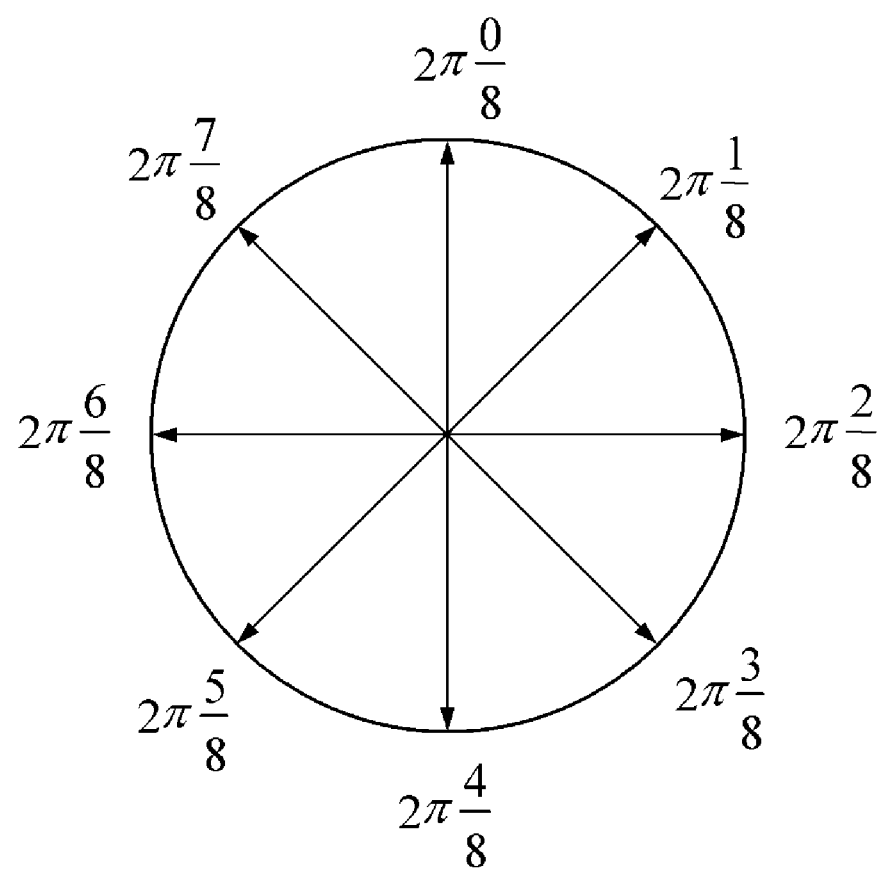

FIGS. 5 and 6 are views illustrating examples of information capable of being configured with relation to the transmission of the SRS in the present specification. It means that a comb means is configured to divide and transmit a frequency bandwidth regarding the transmission of the SRS. In FIG. 5, a comb parameter means information instructing that the SRS is transmitted through an odd or even subcarrier. For example, a comb0 refers to an even subcarrier, and a comb1 refers to an odd subcarrier. By using the comb parameter, it is possible to distinguish two UEs indicating the identical SRS resources on a frequency, through a frequency position and the SRS bandwidth.

FIG. 6 shows eight total cyclic shifts. In order to instruct a cyclic shift, information of 3 bits can be transferred.

FIGS. 7 to 10 shows values $m_{SRS,b}$ and $N_b$ determined by the SRS bandwidth configuration and the SRS bandwidth corresponding to the number of uplink resource blocks according to the embodiment of the present invention. Here, b is an SRS bandwidth index, and $m_{SRS,b}$ indicates a size in a resource block unit of the SRS transfer bandwidth. $N_b$ is a value necessary for a following transmission in a periodic SRS.

FIG. 7 shows values $m_{SRS,b}$ and $N_b$ determined by the SRS bandwidth configuration $C_{SRS}$ and the SRS bandwidth $B_{SRS}$ where the number of resource blocks $N_{RB}^{UL}$ which is the uplink bandwidth, is in a range of 80 to 110 (80<$N_{RB}^{UL}$≤110) according to the embodiment of the present invention.

FIG. 8 shows values $m_{SRS,b}$ and $N_b$ determined by the SRS bandwidth configuration $C_{SRS}$ and the SRS bandwidth $B_{SRS}$ where the number of resource blocks $N_{RB}^{UL}$ which is the uplink bandwidth, is in a range of 60 to 80 (60<$N_{RB}^{UL}$≤80) according to the embodiment of the present invention.

FIG. 9 shows values $m_{SRS,b}$ and $N_b$ determined by the SRS bandwidth configuration $C_{SRS}$ and the SRS bandwidth $B_{SRS}$ where the number of resource blocks $N_{RB}^{UL}$ which is the uplink bandwidth, is in a range of 40 to 60 (40<$N_{RB}^{UL}$≤60) according to the embodiment of the present invention.

FIG. 10 shows values $m_{SRS,b}$ and $N_b$ determined by the SRS bandwidth configuration $C_{SRS}$ and the SRS bandwidth $B_{SRS}$ where the number of resource blocks $N_{RB}^{UL}$ which is the uplink bandwidth, is in a range of 6 to 40 (6≤$N_{RB}^{UL}$≤40) according to the embodiment of the present invention.

The information of FIGS. 7 to 10 is used as a reference in a process of transmitting a periodic SRS, and also can be used in a process of transmitting an aperiodic SRS. The information can be used in the embodiment of the present invention.

In order to control a transmission of a reference signal, an entire bandwidth of a corresponding cell and a transmission band for the reference signal are determined according to the number of users capable of transmitting the reference signal. In the aforementioned description, FIG. 4 or FIGS. 7 to 10 show the configuration information for the periodic transmission as an example of the transmission of the reference signal. In a transmission of an aperiodic reference signal, control information which is added to the configuration information for the periodic transmission is needed in order to use some UEs in the transmission of the aperiodic reference signal (A-SRS or ASRS) in which the reference signal is temporarily and widely transmitted. The added control information can be provided through a physical channel for a rapid A-SRS transmission. Information of 2 to 3 bits as an example, is added to a Downlink Control Information Format 4 (DCIF 4), so as to provide control information for a control of the A-SRS. For example, where the base station transfers '00' or '000' to a UE, the UE does not perform the A-SRS transmission. When the base station transfers values excepting those to the UE, the UE can transmit the A-SRS in a predetermined manner.

It is necessary to prevent the transmission of the aperiodic reference signal from colliding against the transmission of the periodic reference signal. For example, a UE transmitting the periodic SRS transmits the SRS so as to restrict a transmission bandwidth which another UE transmitting the aperiodic SRS is capable of using, or a collision between the periodic SRS and the aperiodic SRS can cause a reduction of a reliability of a channel presumption. Accordingly, in the present specification, a configuration set of an aperiodic reference parameter will be described, in which the aperiodic reference parameter set is configured to prevent a UE transmitting the aperiodic reference signal from colliding with a UE transmitting the periodic reference signal.

In order to transmit the SRS, a variety of information such as an area of a resource to transmit the SRS, time information on a time at which the SRS is transmitted, etc. are necessarily configured. Also, in order to transmit the aperiodic SRS, information on the resource and time is necessarily configured. Since it is necessary to identify a rapid sounding at a certain point of time during the transmission of the aperiodic SRS, a more rapid transmission and reception of information through a physical channel may be necessary rather than transmission and reception of information by means of a Radio Resource Control (RRC).

The physical channel can include a transmission and reception of information relating to an uplink and a downlink. In an embodiment of the present specification, a set of an aperiodic reference parameter included in 2 to 3 bits due to a limitation of information carried with a physical channel will be described, which is configured to control a collision of UEs. Further, in another embodiment of the present specification, information relating to an aperiodic reference signal included in 2 to 3 bits due to limitation of information carried with a physical channel will be described. Of course, in the application of an embodiment of the present specification, the present invention can be applied to a larger range of information, i.e. larger than 4 bits. Each embodiment of the present invention will be described with relation to a usable minimum size of bit.

As described above, an example of a physical channel including 2 to 3 bits will be described with relation to a DCI format 4 for an Uplink Multiple Input Multiple Output (Uplink-MIMO). 2 bits or 3 bits can be newly added to the DCI format 4 in order to transmit an aperiodic SRS. In this case, the 2 bits can provide four-states, and the 3 bits can provide eight-states. The states to be provided can be used for the aperiodic SRS.

According to an embodiment of the present specification, one-state among these states can be used for instruction of no aperiodic SRS activation, and another one-state can be used for instruction of a periodic SRS holding. In a case of the 2 bits, two-states can be used, and in a case of the 3 bits, six-states can be used. Accordingly, RRC-configured aperiodic SRS parameter set can be distinguished or used as information indicating a parameter set, by using these states. The phrase "periodic SRS holding" means that although it is scheduled to transmit the periodic SRS, the transmission of the periodic SRS is not carried out.

On the other hand, the number of antennas for use in a transmission of the A-SRS can be configured as follows.

In a first mode (in mode 1), a Physical Uplink Shared Control Channel (PUSCH) is transmitted by using one antenna. The total number of the antennas to be used in the transmission of the A-SRS may be one, two, or four (single antenna PUSCH transmission). On the other hand, in a second mode (in mode 2), the PUSCH is transmitted by using Multiple-input/Multiple-out (MIMO), in which when the PUSCH uses two antennas, one or two antennas can be used for transmission of the A-SRS (MIMO PUSCH transmission). Further, where the PUSCH uses two antennas, one or four antennas can be used for a transmission of the A-SRS. The number of antennas can be arranged as follows.

In mode 1(single antenna PUSCH transmission): 1, 2, or 4

In mode 2(MIMO PUSCH transmission)
When PUSCH uses two antennas: 1 or 2
When PUSCH uses four antennas: 1 or 4

Under the conditions, the base station transfers information on the number of antennas, and a position and a bandwidth of a frequency band which are used when each UE transmits A-SRS, to each UE through a transmission of 2-bit to 3-bit signals, or allows each UE to presume the information. The present specification includes a process in which the base station instructs a UE transmitting the periodic SRS as well as that information to temporarily stop transmitting of the periodic SRS in order to avoid a collision with a UE transmitting the A-SRS.

Figure 11:
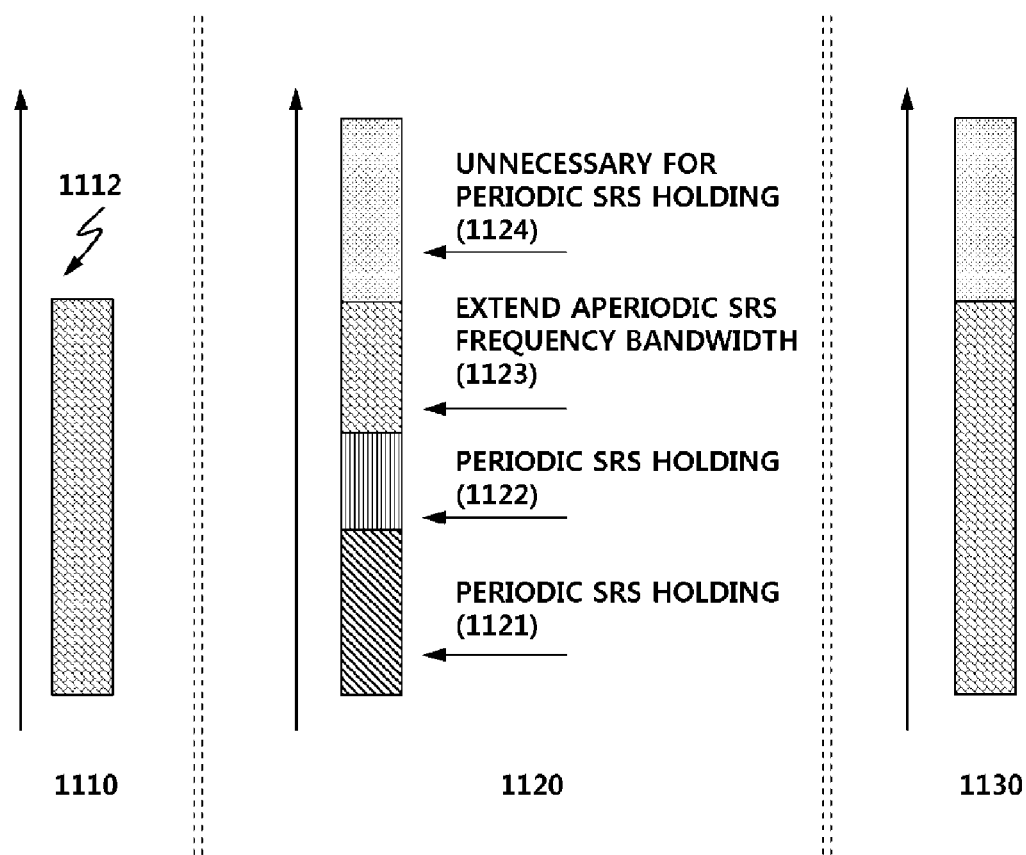
FIG. 11 is a view illustrating a possibility of collision which can be generated in an A-SRS transmission frequency band.

FIG. 11 is a view showing a possibility of a collision which can be generated with relation to the A-SRS transmission in a frequency band. 1110 indicates a case in which the A-SRS is required. A vertical axis of 1110 is a frequency band, and a frequency band in which a transmission of the A-SRS is necessary is indicated by 1112.

However, in a frequency band of 1112 for the transmission of the A-SRS, the transmission of a plurality of the periodic SRS can be predicted the same as 1120. That is, 1120 shows a condition in which a frequency for the periodic SRS is reserved. Accordingly, it is necessary to hold the transmission of the periodic SRS in order to transmit the A-SRS like 1112 through the reserved frequency of 1120. Therefore, in the frequency bands 1121 and 1122, the UE which transmits the periodic SRS is instructed to hold the transmission of the periodic SRS, and in the frequency band 1123, the UE extends a frequency area in order to transmit the A-SRS. Since 1124 is not a frequency band for the transmission of the A-SRS, it is not necessary to hold the transmission of the periodic SRS. When the base station instructs the UE to transmit an absence or presence of the periodic SRS holding, and the frequency configuration information necessary for the transmission of the A-SRS, the UE can transmit the A-SRS to a necessary frequency band like 1130.

Accordingly, in an embodiment of the present specification, a 2 to 3 bit signaling method of configuring an RRC-configuration A-SRS parameter set which may be included in DCI format 4 or instructed to be included in DCI format 4 has been proposed. As shown in FIG. 11, the signaling may include information in a 2 to 3 bit unit which instructs the periodic SRS holding in order to control a collision which may be generated when the UE for the transmission of the periodic SRS shares resources with the UE for the transmission of the A-SRS.

Hereinafter, a configuration of a parameter set for an aperiodic reference signal which a base station transmits will be described Elements of the parameter set can use instruction information of 3 bits or 2 bits in order to instruct a UE to transmit an A-SRS. The base station can transmit the information to the UE through a physical channel. In other words, the base station can transmit a radio control signal of a DCI format 4 including the instruction information to the UE.

FIG. 12 is a view illustrating a configuration of a parameter set for a transmission of an A-SRS according to an embodiment of the present specification, in which the parameter set is able to use instruction information of 3 bits. A UE can identify information on an A-SRS antenna configuration necessary for a transmission of the A-SRS and information on an A-SRS transmission bandwidth by using instruction information of 3 bits as shown in FIG. 12. Accordingly, the antenna configuration is matched with the A-SRS transmission bandwidth according to a value of each state. Of course, the base shares information on each match with the UE previously. The sharing of the information can be performed through a high-rank signaling and through a physical level. An RRC signaling is used as an example of the high-rank signaling. Hereinafter, the RRC signaling will be described.

Accordingly, when the base station transmits a 3 bit state, the UE can identify which antenna configuration corresponds to the 3 bit state. Further, the UE can identify through which size of a frequency bandwidth an A-SRS is transmitted.

When the configuration of the parameter set of FIG. 12 is configured and applied as signaling information, various configurations of parameter sets can be obtained as follows. The base station and the UE can previously determine which parameter set configuration is used. Of course, the base station can provide the UE with the parameter set configuration. On the other hand, the base station may select and provide one of preset parameter set configurations to the UE. The providing of information can be achieved through the RRC signaling.

Table 1 indicates a parameter set configuration corresponding to a Case-A, among the parameter set configurations for a transmission of an A-SRS according to an embodiment of the present specification, so that the UE can use a 3 bit state.

TABLE 1

| State (Binary) | ASRS antenna configuration | ASRS Transmission BW(RB) |
|---|---|---|
| 0 (000) | No Aperiodic SRS activation | |
| 1 (001) | 1TX | $m_{srs,\,0}$ |
| 2 (010) | 2TX | $m_{srs,\,1}$ |

TABLE 1-continued

| State (Binary) | ASRS antenna configuration | ASRS Transmission BW(RB) |
|---|---|---|
| 3 (011) | 4TX | $m_{srs,2}$ |
| 4 (100) | 1TX | $m_{srs,1}$ |
| 5 (101) | 2TX | $m_{srs,0}$ |
| 5 (110) | 4TX | $m_{srs,1}$ |
| 7 (111) | Periodic SRS holding | |

Table 2 indicates a parameter set configuration corresponding to a Case-B, among the parameter set configurations for a transmission of an A-SRS according to an embodiment of the present specification, so that the UE can use a 3 bit state.

TABLE 2

| State (Binary) | ASRS antenna configuration | ASRS Transmission BW(RB) |
|---|---|---|
| 0 (000) | No Aperiodic SRS activation | |
| 1 (001) | 1TX | $m_{srs,0}$ |
| 2 (010) | 1TX | $m_{srs,1}$ |
| 3 (011) | 1TX | $m_{srs,2}$ |
| 4 (100) | 2TX | $m_{srs,0}$ |
| 5 (101) | 2TX | $m_{srs,1}$ |
| 5 (110) | 4TX | $m_{srs,2}$ |
| 7 (111) | Periodic SRS holding | |

Table 3 indicates a parameter set configuration corresponding to a Case-C, among the parameter set configurations for a transmission of an A-SRS according to an embodiment of the present specification, so that the UE can use a 3 bit state.

TABLE 3

| State (Binary) | ASRS antenna configuration | ASRS Transmission BW(RB) |
|---|---|---|
| 0 (000) | No Aperiodic SRS activation | |
| 1 (001) | 1TX | $m_{srs,0}$ |
| 2 (010) | 1TX | $m_{srs,1}$ |
| 3 (011) | 1TX | $m_{srs,2}$ |
| 4 (100) | 2TX | $m_{srs,1}$ |
| 5 (101) | 4TX | $m_{srs,1}$ |
| 5 (110) | 4TX | $m_{srs,2}$ |
| 7 (111) | Periodic SRS holding | |

Table 4 indicates a parameter set configuration corresponding to a Case-D, among the parameter set configurations for a transmission of an A-SRS according to an embodiment of the present specification, so that the UE can use a 3 bit state.

TABLE 4

| State (Binary) | ASRS antenna configuration | ASRS Transmission BW(RB) |
|---|---|---|
| 0 (000) | No Aperiodic SRS activation | |
| 1 (001) | 1TX | $m_{srs,0}$ |
| 2 (010) | 1TX | $m_{srs,1}$ |
| 3 (011) | 1TX | $m_{srs,2}$ |
| 4 (100) | 2TX | $m_{srs,0}$ |
| 5 (101) | 2TX | $m_{srs,1}$ |
| 5 (110) | 4TX | $m_{srs,1}$ |
| 7 (111) | Periodic SRS holding | |

Table 5 indicates a parameter set configuration corresponding to a Case-E, among the parameter set configurations for a transmission of an A-SRS according to an embodiment of the present specification, so that the UE can use a 3 bit state.

TABLE 5

| State (Binary) | ASRS antenna configuration | ASRS Transmission BW(RB) |
|---|---|---|
| 0 (000) | No Aperiodic SRS activation | |
| 1 (001) | 1TX | $m_{srs,0}$ |
| 2 (010) | 2TX | $m_{srs,1}$ |
| 3 (011) | 4TX | $m_{srs,2}$ |
| 4 (100) | 1TX | $m_{srs,1}$ |
| 5 (101) | 2TX | $m_{srs,2}$ |
| 5 (110) | 4TX | $m_{srs,2}$ |
| 7 (111) | Periodic SRS holding | |

The tables 1 to 5 indicate examples of RRC A-SRS parameter sets of 3 bits, to which the configuration of the A-SRS parameter set of FIG. 12 is applied. A 3 bit signaling includes an aperiodic SRS antenna configuration and an aperiodic SRS bandwidth among the parameters necessary for the transmission of the aperiodic SRS. In addition, the 3 bit signaling includes a periodic SRS holding to hold a transmission of the periodic SRS. Here, the A-SRS bands $\{m_{srs,0}, m_{srs,1}, m_{srs,2}\}$ are values for use in the transmission of the SRS shown in FIGS. 7 to 10, and become a unit of an A-SRS band. The base station can actively allocate an A-SRS antenna configuration and an A-SRS bandwidth according to an environment of the UE. The Table 1 will be described as an example. When the base station transmits 2 (010 or state 2) as a signal to the UE, the UE uses two antennas for a transmission of an A-SRS, each transmission bandwidth of which becomes $m_{srs,1}$. At this time, the $m_{srs,1}$ is m is determined by an uplink system band of the UE and a SRS bandwidth configuration ($C_{SRS}$) which is a cell-specific parameter, as shown in FIGS. 7 to 10. A signal 7 (111 or state 7) instructs the UE to stop transmitting of the A-SRS at a certain time point. This is to control a collision between a UE transmitting a periodic SRS and another UE transmitting an A-SRS when they share a resource with each other. The signal 7 gives priority to the UE for the transmission of the A-SRS at a time of collision.

In the case-A to case-E indicated in the Tables 1 to 5, where a state is '0' (000), no aperiodic SRS activation is indicated. Where a state is '7' (111), a periodic SRS holding is indicated. The states having '1' (001) to '6' (110) allow the UE to obtain an A-SRS antenna configuration and a transmission bandwidth through which the A-SRS is transmitted, according to each of the case-A and case-B in the Tables 1 to 5.

Figure 13:
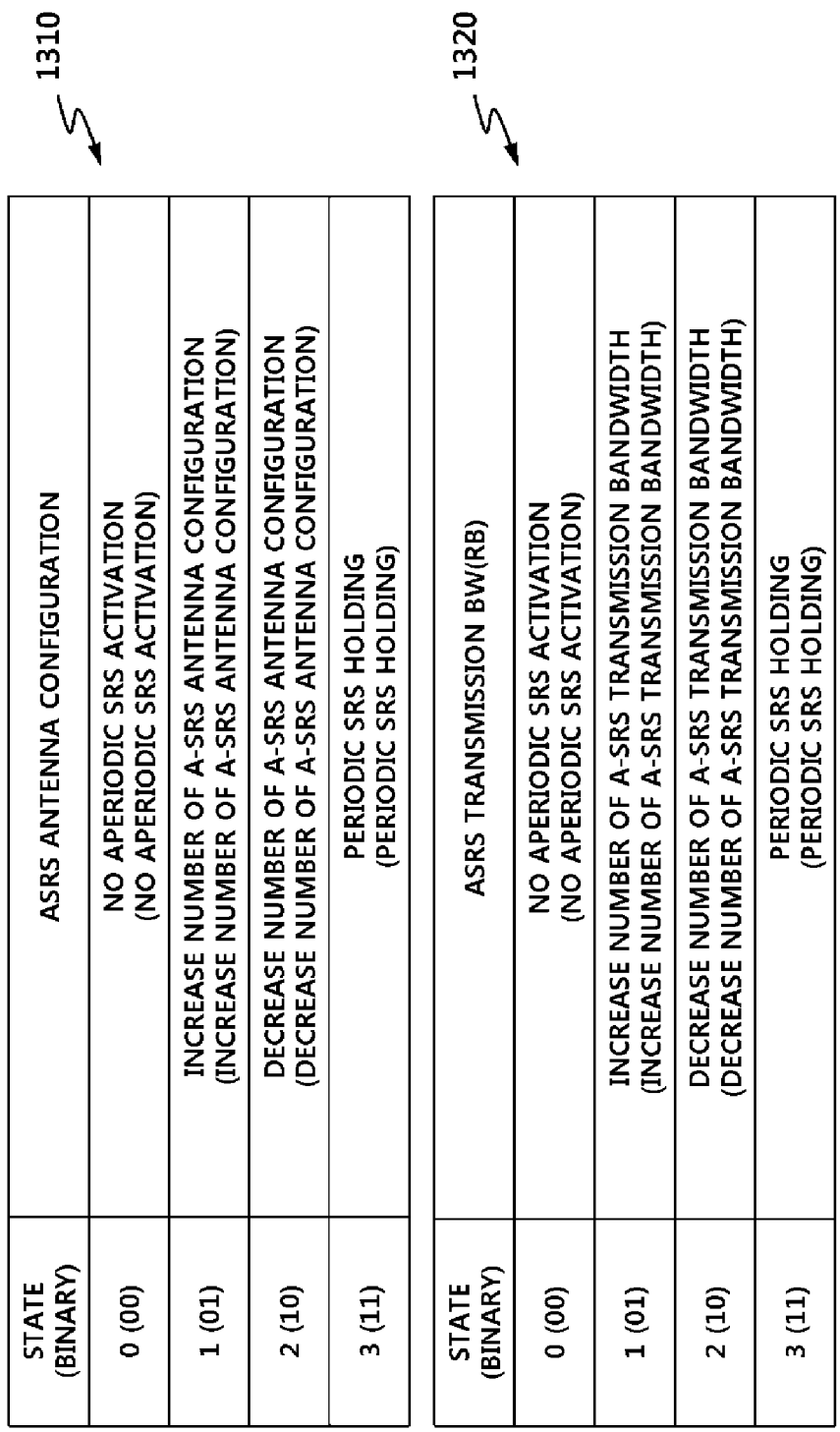
FIG. 13 is a table showing a configuration of A-SRS transmission parameter sets corresponding to instruction information of 2 bits according to an embodiment of the present specification.

FIG. 13 is a view illustrating a configuration of an A-SRS parameter set according to an embodiment of the present specification, in which a state of 2 bits can be used. In FIGS. 13, 1310 and 1320 indicate examples of the A-SRS parameter sets of 2 bits.

Relating to the state of 2 bits, the A-SRS parameter set can be distinguished into two kinds of information in a different way from the state of 3 bits of FIG. 12. Accordingly, in FIG. 13, the state of 2 bits is configured to indicate a changed value by reference of environmental information such as set information which the UE previously obtains, with the transmission of the periodic SRS, in a different way from the state of 3 bits in FIG. 12. The 2 bit signaling instructs the UE to increase or decrease the number of the A-SRS antenna configuration with respect to the periodic SRS indicated by 1310, or to increase or decrease the A-SRS transmission bandwidth indicated by 1320.

In FIG. 13, for example, in a case that the antenna configuration of the UE for the transmission of the periodic SRS is 2TX and a bandwidth is $m_{srs,1}$, when receiving '1' (01 or state 1) as a 2-bit signaling of 1310 from the base station, the UE increase an A-SRS antenna configuration from 2TX to 4TX. Likewise, when receiving '2' (10 or state 2), the UE can decrease the A-SRS antenna configuration from 2TX to 1TX.

Similarly, in a case of applying a set of 1320, when receiving '1' (01 or state 1) as a 2 bit signaling of 1320 from the base station, the UE increases the A-SRS transmission band from $m_{srs,1}$ to $m_{srs,0}$. When receiving '2' (10 or state 2), the UE decreases the A-SRS transmission band from $m_{srs,1}$ to $m_{srs,2}$. Also, the 2 bit signaling includes a state 3 capable of stopping the periodic SRS transmission, similarly to the 3 bit signaling.

As shown in FIGS. 12 and 13, when the UE identifies the A-SRS transmission bandwidth and the A-SRS antenna configuration by using the 2 bit or 3 bit signaling, comb information which is necessary for the transmission of the A-SRS, is required. The UE is enabled to presume the comb information by using the A-SRS transmission bandwidth as described above.

Figure 14:
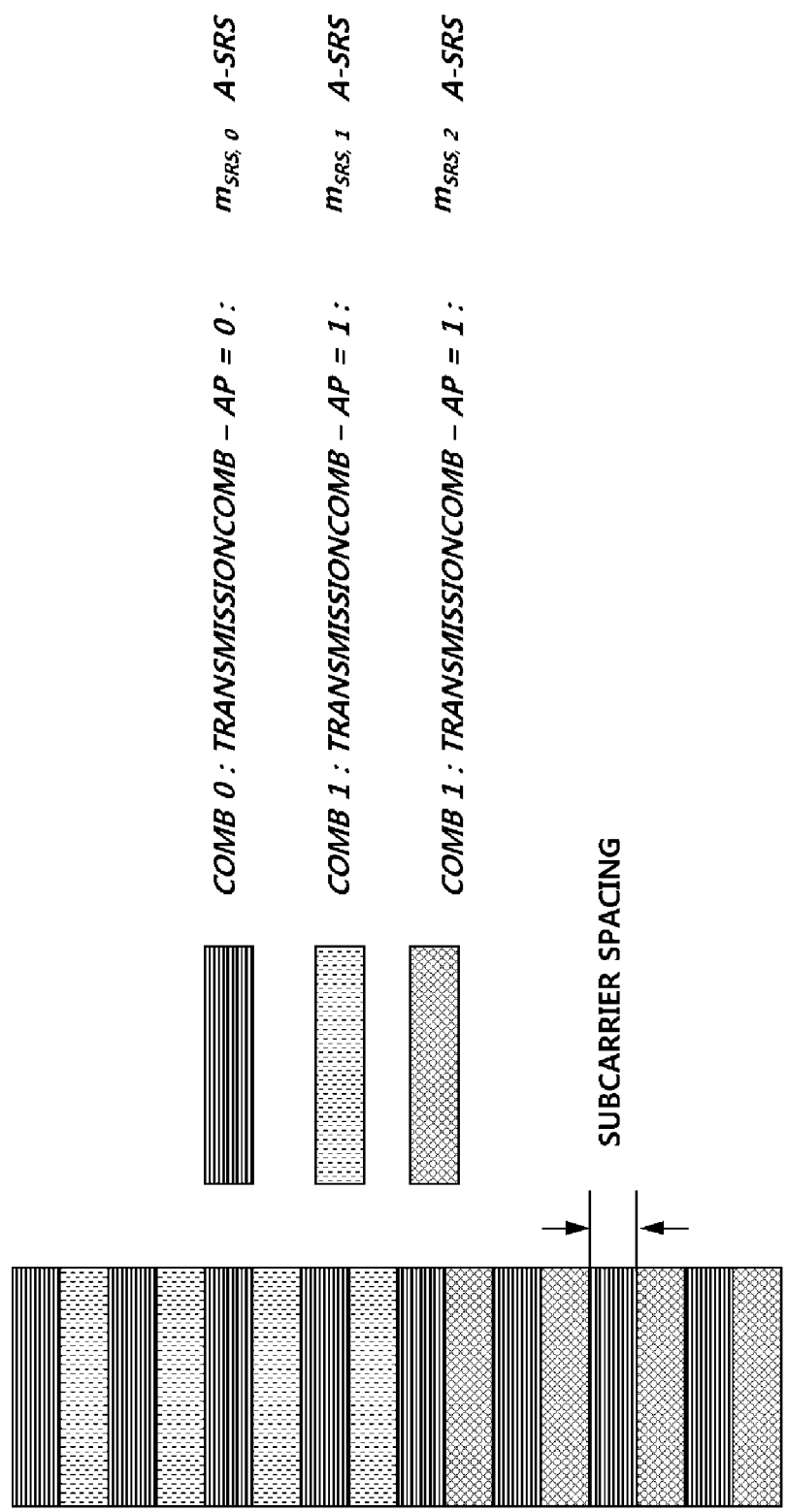
FIG. 14 is a view illustrating an implicit configuration of comb information according to an embodiment of the present specification.

FIG. 14 is a view illustrating a process of an implicit configuration of comb information according to an embodiment of the present specification. The implicit configuration means that certain information is not provided from the exterior but information can be identified by presuming other information. In other words, the implicit configuration means that other information is extracted from a previously defined bandwidth or that third information is extracted from information on two different environments.

As shown in FIG. 5, a frequency area is divided into a Comb 0 and a Comb 1. Each UE can transmit a sounding reference signal from any one Comb when the A-SRS is transmitted, in which the configuration information is configured as a value of a comb (transmissionComp-ap) which is one of the SRS configuration parameters. Also, the configuration information can be implicitly configured according to the A-SRS transmission bandwidth so as not to require a separate signaling.

In FIG. 14, the A-SRS which is transmitted from each UE in a cell is divided into two groups according to a size of a transmission band, and the different comb value (transmissionComb-ap) is allocated to each group. As shown in FIG. 14, where the A-SRS transmission band of the UE in the cell is $m_{srs,0}$, $m_{srs,1}$ and $m_{srs,2}$, the $m_{srs,0}$ is designated as a group 1, and the $m_{srs,1}$ and $m_{srs,2}$ are designated as a group 2. Then, a transmissionComb-ap=0, and a transmissionComb-ap=1 are respectively allocated to each group. If the $m_{srs,0}$ transmitting the A-SRS to the entire system band and the $m_{srs,1}$ and $m_{srs,2}$ transmitting the A-SRS to some bands are distinguished by the transmissionComp-ap, the UE can presume the transmissionComp-ap through the A-SRS transmission band allocation.

According to another embodiment of the present specification, the comb value can be configured through an antenna configuration. For example, the UEs are divided into two groups according to the antenna configuration which is transmitted from each UE in the cell. A different comb value is allocated to each group. For example, if the antenna configurations of the UEs in the cell are 1TX, 2TX, and 4TX, the 1TX is designated as a group 1, and the 2TX and 4TX are designated as a group 2. The transmissionComb-ap=0 is allocated to the group 1, and the transmissionComb-ap=1 is allocated to the group 2. If the 1TX which is the antenna configuration transmitting the A-SRS to the entire system band, and the 2TX and 4TX which are the antenna configurations transmitting the A-SRS to some bands are distinguished by the transmissionComb-ap, the UE can presume the transmissionComb-ap by using the A-SRS antenna configuration. As a result, it is possible to determine which comb is able to transmit the A-SRS.

In FIG. 14, in order to implicitly presume the comb value using information presumed from instruction information received in a form of signals, a transmission bandwidth is used as a first embodiment, and an antenna configuration is used as a second embodiment. Which group each bandwidth or antenna configuration is included in and which comb value each bandwidth or antenna configuration has can be varied and applied in various forms according to the implementation processes.

Figure 15:
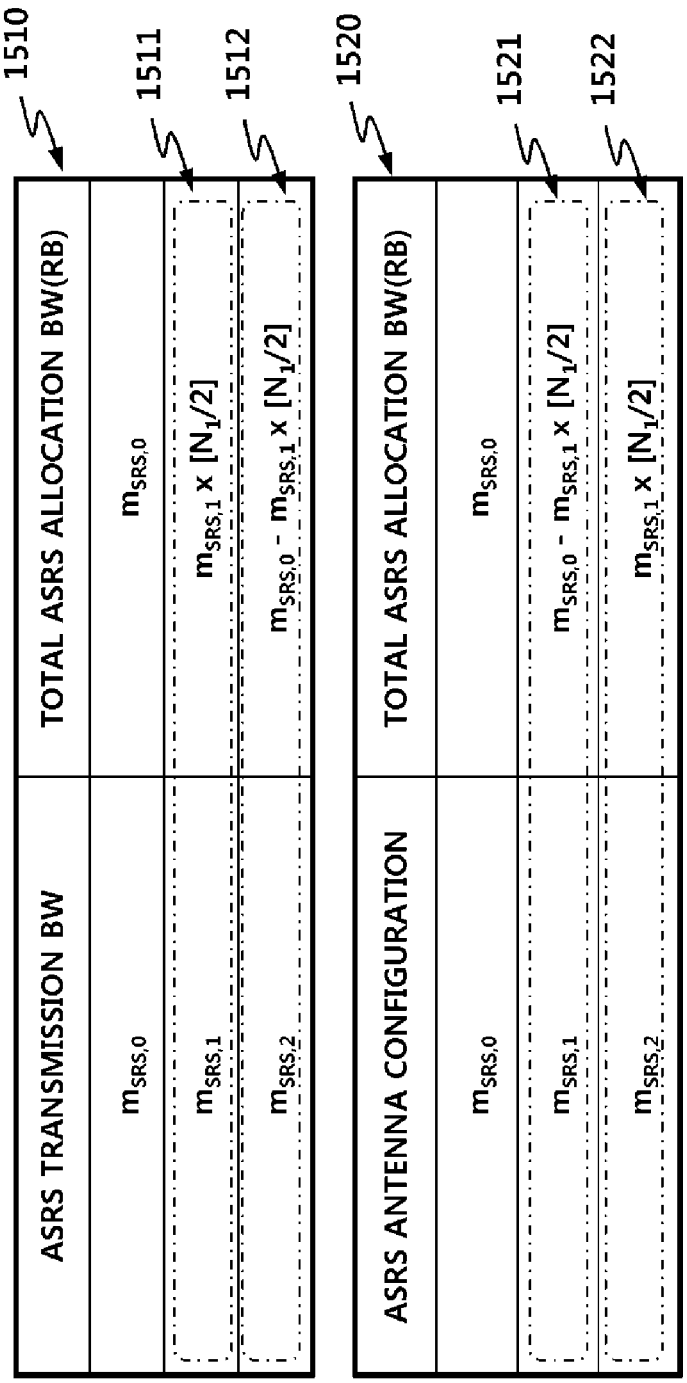
FIG. 15 is a view illustrating a configuration of an A-SRS allocation bandwidth corresponding to an A-SRS transmission bandwidth of a UE in a cell according to an embodiment of the present specification, in which the UE can implicitly determine the A-SRS allocation bandwidth.

FIG. 15 is a view illustrating a configuration of information which allows a UE to implicitly determine an A-SRS allocation band corresponding to an A-SRS transmission band of the UE in a cell according to an embodiment of the present invention. In FIG. 15, 1510 and 1520 show processes in that the UE calculates a total A-SRS allocation bandwidth using A-SRS transmission bandwidth which the UE directly presumes from or through instruction information received through 2 bit or 3 bit signaling, similarly to those of FIGS. 12 and 13. The A-SRS allocation bandwidth means an A-SRS frequency bandwidth through which the UE transmits the A-SRS, and the A-SRS allocation bandwidth refers to a frequency bandwidth through which the UE transmits the A-SRS. The UE can transmit the A-SRS in proportion to the A-SRS transmission bandwidth in the A-SRS allocation bandwidth. In FIG. 15, 1510 and 1520 show a mapping rule in which the A-SRS allocation bandwidth is calculated through a transmission bandwidth. The base station previously transmits information on whether it uses 1510 or 1520 to the UE through an RRC signal.

In a case of 1510, when the transmission bandwidth is $m_{SRS,0}$, a corresponding transmission bandwidth is used as an allocation bandwidth itself. When the transmission bandwidth is $m_{SRS,1}$, or $m_{SRS,2}$, it is possible to use an allocation band calculated by using $m_{SRS,0}$, and $m_{SRS,1}$. For example, in FIG. 7, where the value of SRS bandwidth configuration $C_{SRS}$ is 1, and the transmission allocation bandwidth is $m_{SRS,1}$, the A-SRS allocation bandwidth has 64 RB equal to 32 multiplied by 2 by means of 1511 because $m_{SRS,1}$ is 32 and $N_1$ is 3. On the other hand, where the transmission allocation bandwidth is $m_{SRS,2}$, the A-SRS allocation bandwidth has 32 RB obtained by subtracting 64 RB, which is a result of 1511, from $m_{SRS,0}$, (96 RB) by means of 1512.

Likewise, in a case of applying 1520, when the transmission bandwidth is $m_{SRS,0}$, a corresponding transmission bandwidth is used as an allocation bandwidth itself. When the transmission bandwidth is $m_{SRS,1}$, or $m_{SRS,2}$, it is possible to use an allocation band calculated by using $m_{SRS,0}$, and $m_{SRS,1}$. For example, in FIG. 7, where the SRS bandwidth configuration is 1, and the transmission allocation bandwidth is $m_{SRS,1}$, the A-SRS allocation bandwidth has 32 RB obtained by subtracting 64 RB from $m_{SRS,0}$, (96 RB) by means of 1521 because $m_{SRS,1}$ is 32 and $N_1$ is 3. On the other hand, where the transmission allocation bandwidth is $m_{SRS,2}$, the A-SRS allocation bandwidth has 32 RB by means of 1522.

In a case of applying 1510 of FIG. 15, the A-SRS allocation bandwidth (RB, the number of resource blocks) can be mapped on the A-SRS transmission bandwidth as indicated in Table 6.

TABLE 6

| SRS bandwidth configuration $C_{SRS}$ | | $m_{SRS,0}$ | $m_{SRS,1}$ | $m_{SRS,2}$ |
|---|---|---|---|---|
| $80 < N_{RB}^{UL} \leq 110$ | 0 | 96 | 48 | 48 |
| | 1 | 96 | 64 | 32 |
| | 2 | 80 | 40 | 40 |
| | 3 | 72 | 48 | 24 |
| | 4 | 64 | 32 | 32 |
| | 5 | 60 | 40 | 20 |
| | 6 | 48 | 24 | 24 |
| | 7 | 48 | 32 | 16 |
| $60 < N_{RB}^{UL} \leq 80$ | 0 | 72 | 48 | 24 |
| | 1 | 64 | 32 | 32 |
| | 2 | 60 | 40 | 20 |
| | 3 | 48 | 24 | 24 |
| | 4 | 48 | 32 | 16 |
| | 5 | 40 | 20 | 20 |
| | 6 | 36 | 24 | 12 |
| | 7 | 32 | 16 | 16 |
| $40 < N_{RB}^{UL} \leq 60$ | 0 | 48 | 24 | 24 |
| | 1 | 48 | 32 | 16 |
| | 2 | 40 | 20 | 20 |
| | 3 | 36 | 24 | 12 |
| | 4 | 32 | 16 | 16 |
| | 5 | 24 | 12 | 12 |
| | 6 | 20 | 12 | 8 |
| | 7 | 16 | 8 | 8 |
| $6 < N_{RB}^{UL} \leq 40$ | 0 | 36 | 24 | 12 |
| | 1 | 32 | 16 | 16 |
| | 2 | 24 | 12 | 12 |
| | 3 | 20 | 12 | 8 |
| | 4 | 16 | 8 | 8 |
| | 5 | 12 | 8 | 4 |
| | 6 | 8 | 4 | 4 |
| | 7 | 4 | 4 | 0 |

In a case of applying 1520 in FIG. 15, the A-SRS allocation bandwidth (RB, the number of Resource Blocks) can be mapped on the A-SRS transmission bandwidth as indicated in Table 7.

TABLE 7

| SRS bandwidth configuration $C_{SRS}$ | | $m_{SRS,0}$ | $m_{SRS,1}$ | $m_{SRS,2}$ |
|---|---|---|---|---|
| $80 < N_{RB}^{UL} \leq 110$ | 0 | 96 | 48 | 48 |
| | 1 | 96 | 32 | 64 |
| | 2 | 80 | 40 | 40 |
| | 3 | 72 | 24 | 48 |
| | 4 | 64 | 32 | 32 |
| | 5 | 60 | 20 | 40 |
| | 6 | 48 | 24 | 24 |
| | 7 | 48 | 16 | 32 |
| $60 < N_{RB}^{UL} \leq 80$ | 0 | 72 | 24 | 48 |
| | 1 | 64 | 32 | 32 |
| | 2 | 60 | 20 | 40 |
| | 3 | 48 | 24 | 24 |
| | 4 | 48 | 16 | 32 |
| | 5 | 40 | 20 | 20 |
| | 6 | 36 | 12 | 24 |
| | 7 | 32 | 16 | 16 |
| $40 < N_{RB}^{UL} \leq 60$ | 0 | 48 | 24 | 24 |
| | 1 | 48 | 16 | 32 |
| | 2 | 40 | 20 | 20 |
| | 3 | 36 | 12 | 24 |
| | 4 | 32 | 16 | 16 |
| | 5 | 24 | 12 | 12 |
| | 6 | 20 | 8 | 12 |
| | 7 | 16 | 8 | 8 |

TABLE 7-continued

| SRS bandwidth configuration $C_{SRS}$ | | $m_{SRS,0}$ | $m_{SRS,1}$ | $m_{SRS,2}$ |
|---|---|---|---|---|
| $6 < N_{RB}^{UL} \leq 40$ | 0 | 36 | 12 | 24 |
| | 1 | 32 | 16 | 16 |
| | 2 | 24 | 12 | 12 |
| | 3 | 20 | 8 | 12 |
| | 4 | 16 | 8 | 8 |
| | 5 | 12 | 4 | 8 |
| | 6 | 8 | 4 | 4 |
| | 7 | 4 | 0 | 4 |

Since the allocation bandwidth is equal to or larger than the transmission bandwidth, it is necessary to determine which part of the allocation bandwidth the transmission bandwidth is.

As indicated in Tables 6 and 7, and shown in FIG. 15, when obtaining information on the allocation bandwidth through which the A-SRS is transmitted, the UE can find out the number of frequency positions through which the A-SRS is transmitted, i.e. information on the frequency positions capable of transmitting the A-SRS.

In other words, when the transmission bandwidth of the UE in the cell is $m_{SRS,0}$, or $m_{SRS,1}$ and $m_{SRS,2}$, the A-SRS allocation band corresponding to the transmission bandwidth is the same as that indicated in Tables 6 and 7, and shown in FIG. 15. Where the allocation bandwidth is different from the transmission bandwidth ($m_{SRS,1}$, $m_{SRS,1}$, $m_{SRS,2}$), start positions ($F_{freq\_position}^{m_{SRS,1}}$, $F_{freq\_position}^{m_{SRS,2}}$) according to the transmission bandwidth must be firstly found out to obtain a frequency start position. One of positions in the allocation band, at each of which the A-SRS can be transmitted, from a start position according to the transmission bandwidth becomes the frequency position. At this time, the number of the frequency positions at which the A-SRS is transmitted is equal to a value obtained by dividing the A-SRS allocation bandwidth by the transmission bandwidth.

Accordingly, it is necessary to calculate the start positions ($F_{freq\_position}^{m_{SRS,1}}$, $F_{freq\_position}^{m_{SRS,2}}$) according to the transmission bandwidth, and to determine which start position of the transmission band each UE transmits the A-SRS through, based on the corresponding start position. If the number of candidates for the frequency positions is $N_{freq\_position}$, the number of candidates for the frequency positions according to each transmission bandwidth in FIG. 15 and Table 6, can be obtained by Equation 2.

$$\text{if } m_{SRS,0}, \; N_{freq\_position}^{m_{SRS,0}} = \frac{m_{SRS,0}}{m_{SRS,0}} \qquad \text{Equation 2}$$

$$\text{if } m_{SRS,1}, \; N_{freq\_position}^{m_{SRS,1}} = \frac{\left(m_{SRS,1} \times \left\lceil \frac{N_1}{2} \right\rceil\right)}{m_{SRS,1}}$$

$$\text{if } m_{SRS,2}, \; N_{freq\_position}^{m_{SRS,3}} = \frac{\left(m_{SRS,0} - m_{SRS,1} \times \left\lceil \frac{N_1}{2} \right\rceil\right)}{m_{SRS,2}}$$

In Equation 2, the number of candidates for the frequency positions is calculated, based on $m_{SRS,0}$, $m_{SRS,1}$, and $m_{SRS,2}$ which are the A-SRS transmission bandwidths in 1510 of FIG. 15.

If the A-SRS transmission bandwidth of the UE is $m_{SRS,0}$, the allocation bandwidth also becomes $m_{SRS,0}$. Therefore, the number of frequency position at the start position is 1, and the A-SRS is transmitted at a position of '0'.

However, where the A-SRS transmission bandwidths of the UE are $m_{SRS,1}$, and $m_{SRS,2}$, the A-SRS allocation bandwidth is larger than or equal to the transmission bandwidth. Therefore, the number of frequency position can be calculated by Equation 2. In this case, the number of frequency positions more than 1 can be obtained.

Where the number of candidates at the start position according to the A-SRS transmission bandwidth is more than 2, a sub-frame ID is applied in order to calculate the start position ($F_{freq\_position}^{m_{SRS,1}}$, $F_{freq\_position}^{m_{SRS,2}}$) according to the A-SRS transmission band. Also, a UE Identification (UE_ID) is applied according to a corresponding A-SRS transmission frequency band, so that a frequency position of each UE which transmits the A-SRS can be calculated as indicated by Equation 3. The sub-frame ID includes a sub-frame ID of a sub-frame functioning as a trigger in the base station, a sub-frame ID of a second sub-frame which can be obtained from the trigger sub-frame, a sub-frame ID of a sub-frame which is defined to transmit the A-SRS, and a sub-frame ID of a second sub-frame which can be obtained from the transmission sub-frame. On the other hand, the UE_IDs are respectively assigned as a unique value to the UEs.

Accordingly, the base station previously calculates a frequency position and a bandwidth for a transmission of the A-SRS by using information on the corresponding UE and a sub-frame relating to the transmission, so as to trigger the A-SRS. Of course, it is possible not to calculate the frequency position and the bandwidth before triggering, and but to trigger the A-SRS.

Equation 3

In a case of $M_{SRS,1}$ start position according to transmission bandwidth:

$$F_{freq\_position}^{m_{SRS,1}} = (\text{subframe\_ID}) \bmod N_1$$

frequency position of each UE:

$$m_{SRS,1} \cdot ((F_{freq\_position}^{m_{SRS,1}} + (UE\_ID)) \bmod N_{freq\_position}^{m_{SRS,1}}) \bmod N_1)$$

In a case of $m_{SRS,2}$ start position according to transmission bandwidth:

$$F_{freq\_position}^{m_{SRS,2}} = (F_{freq\_position}^{m_{SRS,2}} + N_{freq\_position}^{m_{SRS,1}}) \bmod N_1$$

frequency position of each UE:

$$m_{SRS,2} \cdot ((F_{freq\_position}^{m_{SRS,2}} \cdot N_2 + (UE\_ID)) \bmod N_{freq\_position}^{m_{SRS,2}}) \bmod (N_1 \cdot N_2))$$

The Equations 2 and 3 show process of calculating the number of frequency positions according to each transmission bandwidth (Equation 2), and calculating the frequency position of the UE. Frequency areas through which the A-SRS is transmitted and which are defined by applying the Equations 2 and 3, are shown in FIG. 16.

Figure 16:
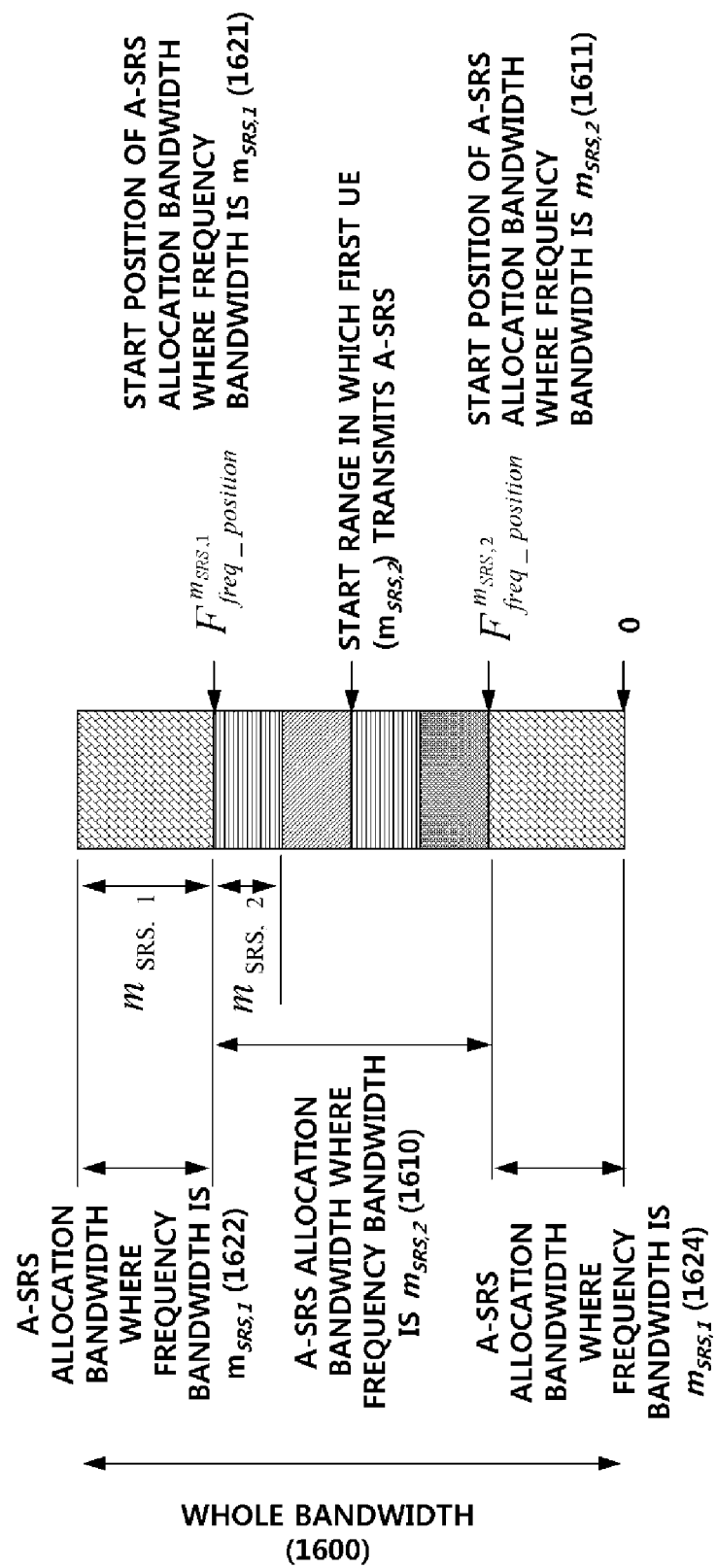
FIG. 16 is a view illustrating an allocation of a frequency area through which an A-SRS is transmitted, according to an embodiment of the present specification.

FIG. 16 is a view illustrating an allocation of the frequency areas according to an embodiment of the present specification.

In FIG. 16, where a transmission bandwidth of the entire bandwidth 1600 is $m_{SRS,1}$, the A-SRS allocation bandwidth is equal to a sum of the A-SRS allocation bandwidths 1622 and 1624. Where a transmission bandwidth of the entire bandwidth 1600 is $m_{SRS,1}$, the Equation 3 is used to calculate a position at which the A-SRS allocation bandwidth starts. The frequency positions according to an antenna configuration are calculated by dividing the entire band by an $N_1$ to have the frequency positions of 0 to $N_1-1$. As a result, where a transmission bandwidth is $m_{SRS,1}$, the calculated frequency position of the A-SRS allocation bandwidth is $F_{freq\_position}^{m_{SRS,1}}$ 1621. Where a transmission bandwidth is $m_{SRS,2}$, the calculated frequency position of the A-SRS allocation bandwidth is $F_{freq\_position}^{m_{SRS,2}}$ 1611. In FIG. 16, in a case that a transmission bandwidth is $m_{SRS,1}$, when the entire allocation bandwidth is imposed at the frequency position 1621 of the allocation bandwidth, the entire allocation bandwidth passes the A-SRS allocation bandwidth 1622 and passes over a range of the entire bandwidth. Accordingly, a range of the A-SRS allocation bandwidth 1624 is allocated so that the frequency position starts again from 0. The range of the A-SRS allocation position can be calculated through a sub-frame ID. The frequency positions which each UE has at the start positions 1611 and 1621 can be calculated by applying the Equation 3.

In Equation 3, in both cases that the transmission bandwidths respectively are $m_{SRS,1}$, and $m_{SRS,2}$, the frequency positions can be adjusted through the sub-frame ID and do not overlap each other.

In another embodiment of the present specification, the allocation bandwidth and, a value of the frequency position of each allocation bandwidth can be configured through the antenna configuration information. The transmission bandwidth and the antenna configuration information are configured by the UE through the instruction information of FIGS. 12 and 13. Therefore, the allocation bandwidth and the value of the frequency position of each allocation bandwidth can be the instruction information which can be configured by using the antenna configuration information as well as the transmission bandwidth which are indicated by the instruction information.

Figure 17:
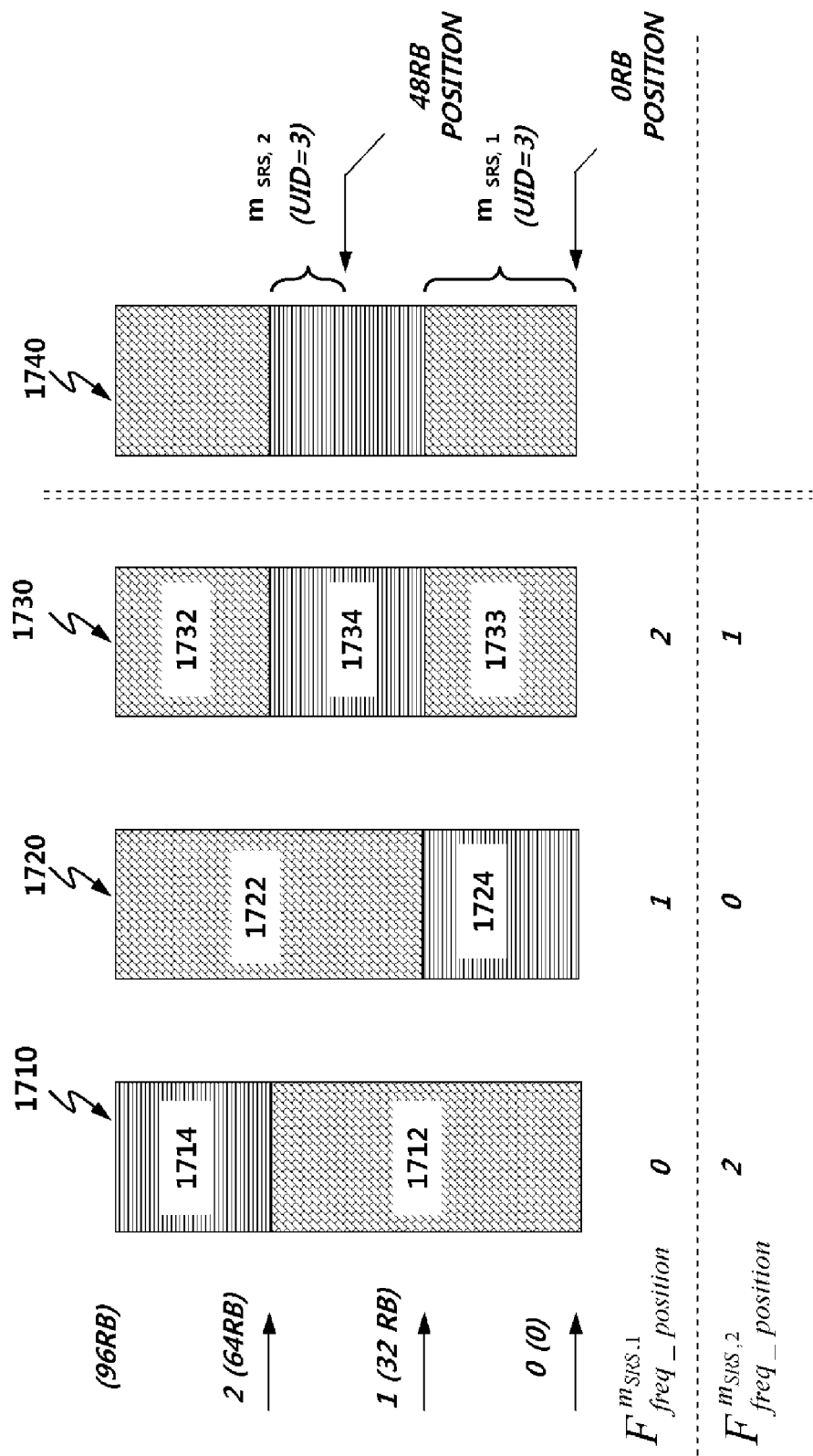
FIG. 17 is a view illustrating an A-SRS frequency resource which a UE or a base station calculates by applying Equations 2 and 3 in a case that 1510 of FIG. 15 and $C_{SRS}$ of Table 6 are 1, according to an embodiment of the present specification.

FIG. 17 is a view illustrating an A-SRS frequency resource calculated in a UE or a base station by applying the Equations 2 and 3 where the $C_{SRS}$ of Table 6 and the total A-SRS allocation bandwidth 1510 of FIG. 15 is 1, according to an embodiment of the present specification.

For convenience of description, it is assumed that a sub-frame ID is 5, and a UE ID is 3.

In a case that the bandwidth is $80 < N_{RB}^{UL} \leq 110$, and the $C_{SRS}$ which is the SRS bandwidth configuration information is 1, if the configuration information of FIG. 7 and 1510 of FIG. 15 are used, as indicated in Table 6, the A-SRS allocation bandwidth is 96 when the transmission bandwidth is $m_{SRS,0}$, the A-SRS allocation bandwidth is 64 when the transmission bandwidth is $m_{SRS,0}$, and the A-SRS allocation bandwidth is 32 when the transmission bandwidth is $m_{SRS,2}$. In this case, available A-SRS allocation band can be calculated as shown by 1710, 1720, and 1730 in FIG. 17.

All frequency positions ($F_{freq\_position}^{m_{SRS,1}}$, $F_{freq\_position}^{m_{SRS,2}}$) of the available A-SRS allocation bandwidth are divided into sections of $N_1$. In a case of FIG. 17, the frequency positions are divided into three sections. If 96RB is divided by 3, each section has 32RB. An available frequency position (frequency position according to the A-SRS allocation bandwidth, $F_{freq\_position}^{m_{SRS,1}}$, $F_{freq\_position}^{m_{SRS,2}}$) of each A-SRS allocation bandwidth is divided into 0, 1, and 2.

In a case of 1710 in which a value of a frequency position $F_{freq\_position}^{m_{SRS,1}}$ according to a transmission bandwidth is 0, it will be understood that the A-SRS allocation bandwidth 1712 in which the transmission bandwidth is $m_{SRS,1}$ starts at a portion where the frequency position is 0. On the other hand, it will be understood that if the Equation 3 is applied, it is possible to calculate a frequency position $F_{freq\_position}^{m_{SRS,2}}$ of the A-SRS allocation bandwidth 1714 in which the transmission bandwidth is $m_{SRS,2}$, and the value of the frequency position is 2 (64RB).

Likewise, in a case of 1720, where the transmission bandwidth is $m_{SRS,1}$, the A-SRS allocation bandwidth 1722 starts from 1 (32RB). Where the transmission bandwidth is $m_{SRS,2}$, the A-SRS allocation bandwidth 1724 starts from 0. Further, in a case of 1730, where the transmission bandwidth is $m_{SRS,1}$, the A-SRS allocation bandwidths 1732 and 1733 start from 2 (64RB). Where the transmission bandwidth is $m_{SRS,2}$, the A-SRS allocation bandwidth 1734 starts from 1. In the case of 1730 in which the transmission bandwidth is $m_{SRS,1}$, a range of the transmission bandwidth passes over a range of the total bandwidth. Accordingly, the allocation bandwidth 1733 starts again from 0.

In a case that the sub-frame ID is 5, and the UE ID is 3, similarly to 1730, the start position of the A-SRS allocation bandwidth in which the transmission bandwidth is $m_{SRS,1}$ is 2, and the start position of the A-SRS allocation bandwidth in which the transmission bandwidth is $m_{SRS,2}$ is 1. That is, the A-SRS in which the transmission bandwidth is $m_{SRS,1}$ is transmitted by 32RB corresponding to $m_{SRS,1}$ in an area of 1732 or 1733. The A-SRS in which the transmission bandwidth is $m_{SRS,2}$ is transmitted by 16RB corresponding to $m_{SRS,2}$ in an area of 1734.

As described above, although the A-SRS allocation bandwidth in which the transmission bandwidth is $m_{SRS,1}$ is 64RB, the A-SRS transmission bandwidth through which the UE transmits the A-SRS actually is 32RB. Therefore, an A-SRS transmission position of the corresponding UE has to be found in 1732 or 1733. In Equation 3, where the transmission bandwidth is $m_{SRS,1}$, a value of the start position becomes 0 when a frequency position of each UE is applied to the Equation 3. Accordingly, a UE in which the transmission bandwidth is configured to be $m_{SRS,1}$, transmits an A-SRS of 32RB at a position of 0.

On the other hand, although the A-SRS allocation bandwidth in which the transmission bandwidth is $m_{SRS,2}$ is 32RB, the A-SRS transmission bandwidth through which the UE transmits the A-SRS actually is 16RB. Therefore, an A-SRS transmission position of the corresponding UE has to be found in the area 1734. In Equation 3, where the transmission bandwidth is $m_{SRS,2}$, a value of the start position becomes 48 when a frequency position of each UE is applied to the Equation 3. Accordingly, a UE in which the transmission bandwidth is configured to be $m_{SRS,2}$, transmits an A-SRS of 16RB at a position of 48RB (between 32RB and 64RB).

Equation 4 as indicated below shows a calculating result obtained by applying the Equations 2 and 3 to the case of FIG. 17 when 1510 of FIG. 15 and $C_{SRS}$ of Table 6 are 1.

Subframe_ID = 5, UE_ID = 3    Equation 4

$N_1 = 3, N_2 = 2$ $m_{SRS,0} = 96, m_{SRS,1} = 32, m_{SRS,2} = 16$

In a case of $m_{SRS,0}$: $N_{freq\_position}^{m_{SRS,0}} = \frac{m_{SRS,0}}{m_{SRS,0}} = 1$ In a case of $m_{SRS,1}$:

$N_{freq\_position}^{m_{SRS,1}} = (m_{SRS,1} \times \lceil N_1/2 \rceil)/m_{SRS,1} = 2$ In a case of $m_{SRS,2}$:

$N_{freq\_position}^{m_{SRS,2}} = (m_{SRS,0} - m_{SRS,1} \times \lceil N_1/2 \rceil)/m_{SRS,2} = 2$ -continued In a case of $m_{SRS,1}$:

$F_{freq\_position}^{m_{SRS,1}} = (\text{subframe\_ID})\text{mod}N_1 = 2$ $m_{SRS,1} \cdot$ $\left(\left(F_{freq\_position}^{m_{SRS,1}} + (\text{UE\_ID})\text{mod}N_{freq\_position}^{m_{SRS,1}}\right)\text{mod}N_1\right) = 0$ In a case of $m_{SRS,2}$:

$F_{freq\_position}^{m_{SRS,2}} = \left(F_{freq\_position}^{m_{SRS,1}} + N_{freq\_position}^{m_{SRS,1}}\right)\text{mod}N_1 = 1$ $m_{SRS,2} \cdot \left(\left(F_{freq\_position}^{m_{SRS,2}} \cdot N_2 + (\text{UE\_ID})\text{mod}N_{freq\_position}^{m_{SRS,2}}\right)\right.$ $\left.\text{mod}(N_1 \cdot N_2)\right) = 48$ As described above, according to the embodiment of the present specification, it is possible to prevent the A-SRS UE from colliding with the periodic SRS UE. Further, in order to provide the UE which transmits the A-SRS, with configuration information for a transmission of the A-SRS, 3 bit signaling as shown in FIG. 12 and indicated in Tables 1, 2, 3, 4 and 5 or 2 bit signaling as shown in FIG. 13 can be performed. Where instruction information which the UE receives is 3 bits, the UE receives the instruction information through the RRC signaling, etc. The UE can calculate the A-SRS antenna configuration and the A-SRS transmission bandwidth which are previously stored, as shown in FIG. 12 and as indicated in Tables 1, 2, 3, 4 and 5. On the other hand, where instruction information which the UE receives is 2 bits, the UE receives the instruction information through the RRC signaling, etc. The UE identifies a variation of the A-SRS parameter (increase or decrease) which is previously stored, as shown in FIG. 13, and adjusts or changes the periodic SRS antenna configuration and the periodic SRS transmission bandwidth so as to calculate an A-SRS antenna configuration and an A-SRS transmission bandwidth adapted to a transmission of the A-SRS.

The UE can calculate the comb value shown in FIG. 14, the A-SRS allocation bandwidth shown in FIG. 15, and the A-SRS frequency position shown in FIG. 16 by using the A-SRS antenna configuration and the A-SRS transmission bandwidth calculated from the transmitted instruction information. This means that the UE can calculate information necessary for the A-SRS transmission by using implicit information. As shown in FIG. 12 or 13, the UE can sufficiently indicate the A-SRS transmission parameter set through the 2 bit or 3 bit signaling. In addition, it is possible to stop the UE from transmitting the periodic SRS, thereby preventing collision of the periodic SRS with the A-SRS which is generated during the transmission of the periodic SRS. The UE uses information which it previously stored or receives through another RRC signaling, as information on other parameters for the transmission of the A-SRS, for example, information relating to a cyclic shift.

Hereinafter, a method and apparatus for transmitting an aperiodic reference signal using information on an implicit radio resource area according to the embodiments of the present specification will be described in detail, in which a collision between reference signals can be prevented. The information on the implicit radio resource area includes environmental information such as an A-SRS transmission bandwidth which is mapping on instruction information, an antenna configuration, or information on a periodic SRS, etc., as shown in FIGS. 12 and 13. The UE can calculate the A-SRS allocation bandwidth (shown in FIG. 15) and a start position in the bandwidth (shown in FIGS. 16 and 17) by using the information. Further, the UE determines which comb it transmits the A-SRS at, by using the environmental information, as shown in FIG. 14. The base station and the UE share the environmental information through the RRC signaling or in a state of previously storing it. In order to prevent the collision between the reference signals, the instruction information includes information which instructs the periodic reference signal holding.

Figure 18:
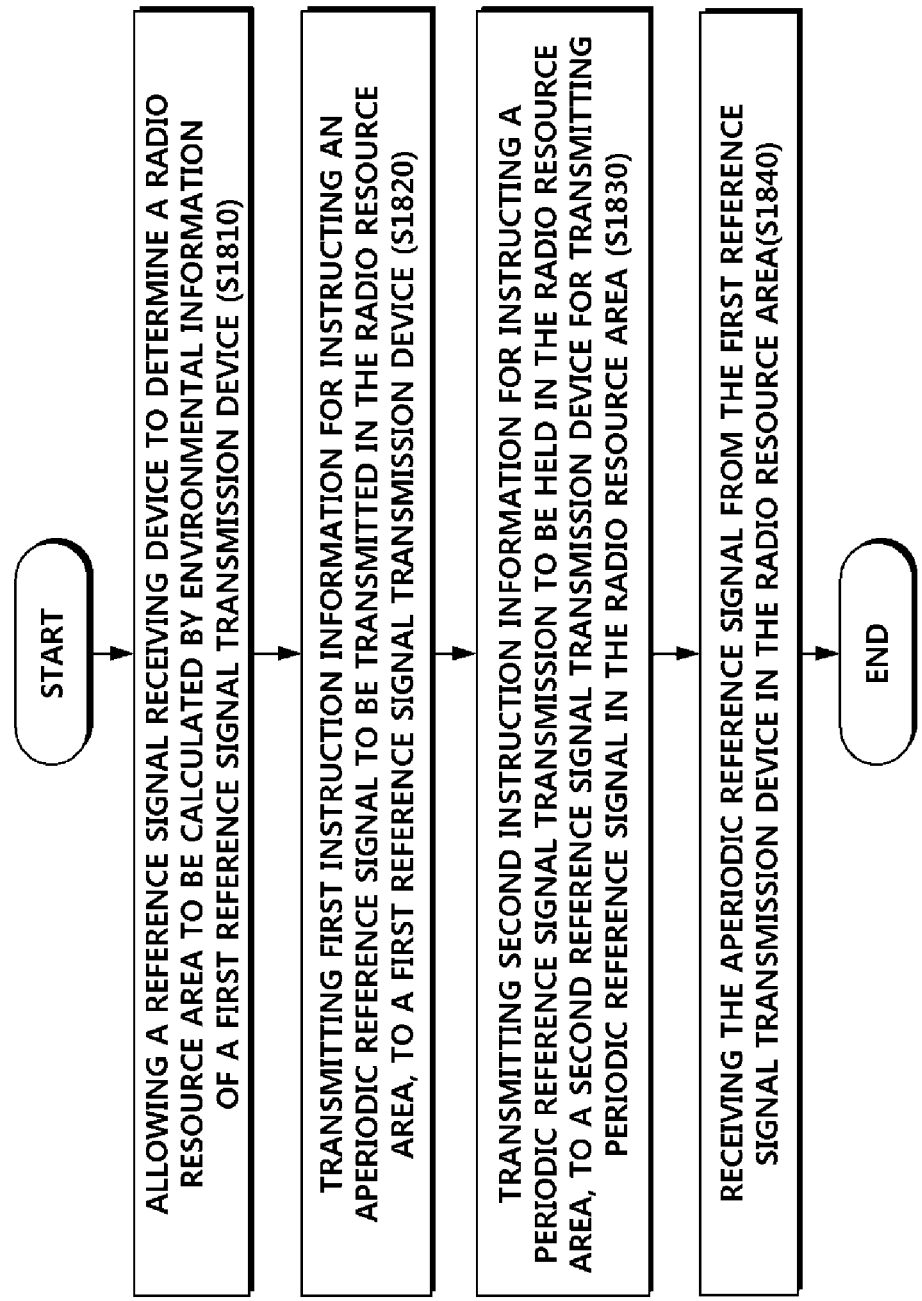
FIG. 18 is a flowchart illustrating a process of receiving an aperiodic reference signal by using information on an implicit radio resource area in a reference signal receiving device according to an embodiment of the present invention, in which the reference signal receiving device prevents a collision between reference signals.

FIG. 18 is a block diagram illustrating a sequence of a process of receiving an aperiodic reference signal using information on an implicit radio resource area according to an embodiment of the present specification, in which a device for receiving a reference signal can prevent a collision between the reference signals.

The reference signal receiving device may be a base station or a device capable of providing a function of receiving the reference signal and while being combined with the base station.

The reference signal receiving device determines whether the radio resource area is calculated using environmental information of a first reference signal transmission device in step S1810. The reference signal receiving device transmits first instruction information for a transmission of an aperiodic reference signal from the radio resource area to the reference signal transmission device in step S1820. The environmental information includes an A-SRS antenna configuration or an A-SRS transmission bandwidth which is mapped or calculated through the first instruction information, as an example, as shown in FIGS. 12 and 13. That is, the first reference signal transmission device can determine, through the first instruction information, the antenna configuration and the transmission bandwidth used to transmit the aperiodic reference signal. As shown in FIGS. 14, 15, 16 and 17, the information on the radio resource area to which the A-SRS is transmitted can be calculated by using the environmental information and the transmission bandwidth which are previously stored or received through the RRC. More particularly, at least one of start information or comb information of the bandwidth can be calculated by using the A-SRS transmission bandwidth information.

Further, the radio resource area transmits second instruction information which enables a second reference signal transmission device to hold the periodic reference signal transmission in the radio resource area, to the second reference signal transmission device which transmits the periodic reference signal in step S1830. This is to hold a transmission of the periodic reference signal in order to prevent a collision of the periodic reference signal with an aperiodic reference signal to be transmitted from the radio resource area. Then, the radio resource area receives the aperiodic reference signal from the first reference signal transmission device in step S1840. In steps S1820 and S1830, the first instruction information and the second instruction information are included in a radio control signal, and in turn transmitted to the first and second reference signal transmission device. Further, the first instruction information is included in a first radio control signal, and the second instruction information is included in a second radio control signal. The first and second radio control signals may be respectively or simultaneously transmitted.

More particularly, the first and second instruction information have a size of 2 bits or 3 bits and are involved in a DCI format 4. The DCI format 4 is carried with a radio control signal and transmitted. That is, the first or second instruction information is included in the radio control signal of the DCI format 4 and transmitted.

On the other hand, a case that an allocation bandwidth through which the aperiodic reference signal is transmitted can be calculated by using the A-SRS transmission bandwidth is illustrated as an example, as shown in FIG. 15. As shown in FIGS. 16, 17 and indicated by Equations 2 and 3, a reference position (a start position) of the bandwidth through which the transmission device transmits the A-SRS in the allocation bandwidth can be calculated by using information calculated at a time point when the A-SRS is transmitted and information calculated by the reference signal transmission device. The reference signal transmission device calculates this information by using the environmental information and the reference signal receiving device, for example a base station, predicts the starting position and transmits instruction information.

Before performing step S1810, the reference receiving device can transmit the environmental information to the reference transmission device through the RRC. The environmental information transmitted through the RRC can be continuously used without a separate change. Where the base station intends to change the environmental information, the environmental information can be transmitted again through the RRC.

Figure 19:
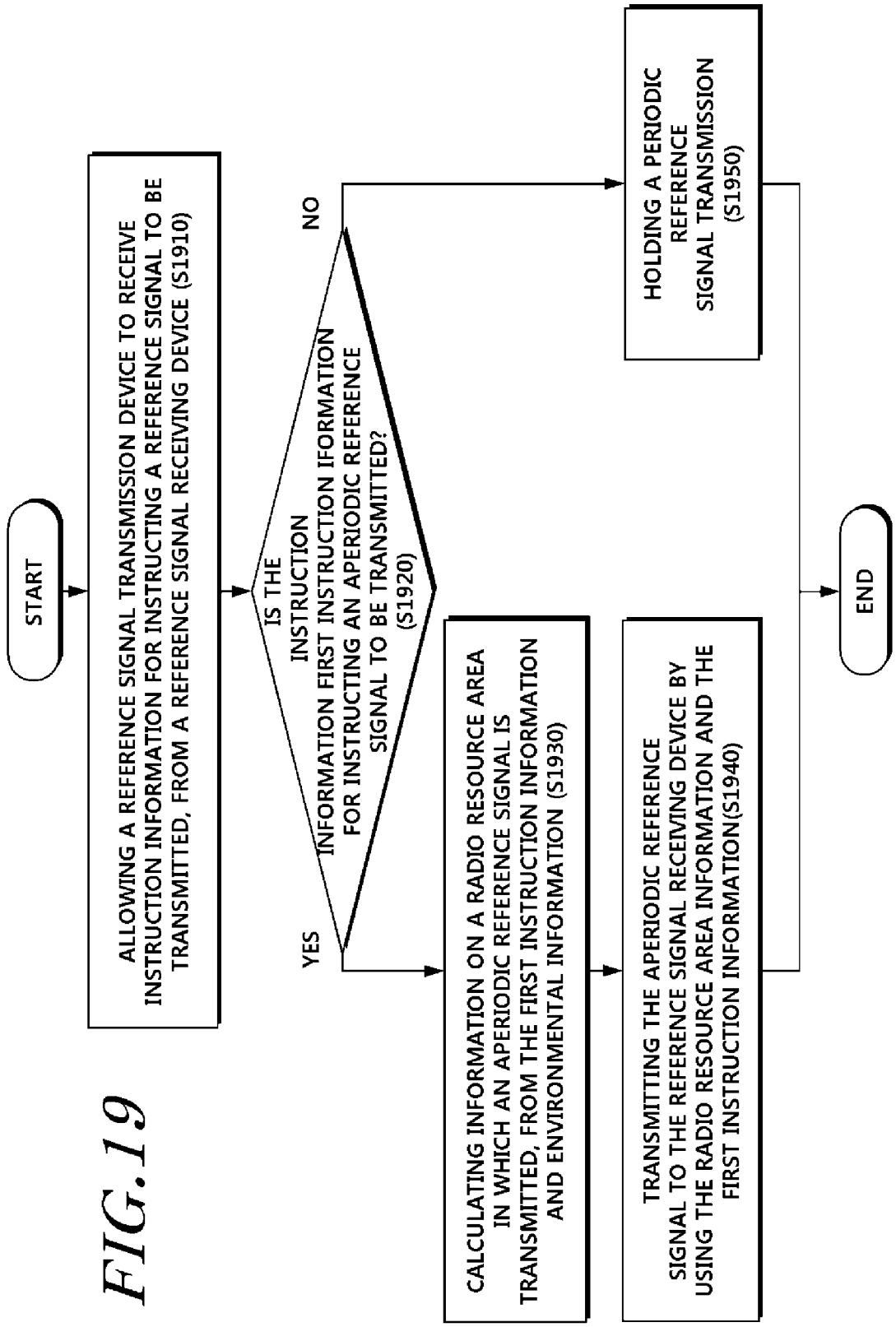
FIG. 19 is a flowchart illustrating a process of transmitting an aperiodic reference signal by using information on an implicit radio resource area in a reference signal transmission device according to an embodiment of the present specification, in which the reference signal transmission device prevents a collision between reference signals.

FIG. 19 is a flowchart illustrating a process of transmitting an aperiodic reference signal by using information on an implicit radio resource area in a reference signal transmission device according to an embodiment of the present specification, in which the reference signal transmission device prevents a collision between reference signals.

The reference signal transmission device may be a UE or a device combined with the UE to provide a function of a reference signal transmission.

The reference signal transmission device receives instruction information for instructing a transmission of a reference signal from the reference signal receiving device in step S1910. More particularly, the instruction information has a size of 2 bits or 3 bits, which is included in the DCI format 4. The reference signal transmission device receives a radio control signal including the DCI format 4. That is, the radio control signal carrying the DCI format 4 includes the instruction information and is received in the reference signal transmission device. At this time, the instruction information may be first instruction information for instructing a transmission of an aperiodic reference signal, or second instruction information for instructing a transmission of a periodic reference signal to be held.

Accordingly, where the instruction information may be the first instruction information for instructing the transmission of the aperiodic reference signal, information on the radio resource area to which the aperiodic reference signal is transmitted is output from the first instruction information and environmental information in step S1930. The aperiodic reference signal is transmitted to the reference signal receiving device by using the radio resource area information and the first instruction information in step S1940. On the other hand, where the instruction information may be the second instruction information, the transmission of the periodic reference signal is stopped and held in step S1950. This is to hold the transmission of the periodic reference signal in order to prevent the collision of the periodic reference signal with the aperiodic reference signal which is transmitted to the radio resource area.

The process of calculating the radio resource area information will be described in more detail. As shown in FIG. 12 or 13, it is possible to calculate at least one of an antenna configuration required for a transmission of the aperiodic reference signal and a transmission bandwidth required for a transmission of an aperiodic reference signal, which are mapped on the first instruction information. At this time, as shown in FIGS. 12 and 13, an A-SRS antenna configuration or an A-SRS transmission bandwidth, each of which is mapped or calculated through the first instruction information, may be an example of the environmental information. That is, the reference signal transmission device can determine which one of the antenna configuration and the transmission bandwidth is used to transmit the aperiodic reference signal, by using the first instruction information. As shown in FIGS. 14, 15, 16 and 17, the information on the radio resource area to which the A-SRS is transmitted can be calculated by using the environmental information and the transmission bandwidth which are stored or received through the RRC in the reference signal transmission device. More particularly, the reference signal transmission device can calculate at least one of bandwidth start position information and comb information by using the A-SRS transmission bandwidth information.

As shown in FIG. 15, in a case of calculating an allocation bandwidth, through which the aperiodic reference signal is transmitted, by using the A-SRS transmission bandwidth, a start position of the bandwidth in the allocation bandwidth through which the reference signal transmission device transmits the aperiodic reference signal can be calculated by using information calculated at a time point of transmitting the aperiodic reference signal and information calculated by the reference signal transmission device, as shown in FIGS. 16 and 17, and calculated by Equations 2 and 3. The reference signal transmission device can calculate information by using the environmental information.

Before performing the step S1910, the reference signal transmission device can receive the environmental information from the reference signal receiving device through the RRC. The environmental information received through the RRC can be continuously used without a separate change. Where the base station, i.e. a reference signal receiving device, intends to change the environmental information, the reference signal transmission device can receive the environmental information through the RRC again.

The reference signal transmission device transmits an aperiodic reference signal at a first time point, and a periodic reference signal at a second time point. Accordingly, any one of the first instruction information and the second instruction information can be included in the radio control signal. However, where the reference signal transmission device transmits the aperiodic reference signal, another UE in the same cell can hold the transmission of the periodic reference signal. Therefore, the second instruction information on the UE (the reference signal transmission device) may be included in the radio control signal together. That is, the first instruction information and the second instruction information on a plurality of reference signal transmission devices (UEs) in the cell are included in one radio control signal, and may be received by the first and second reference signal transmission devices. Further, the first radio control signal includes the first instruction information, and the second radio control signal includes the second instruction information. In addition, the first radio control signal and the second radio control signal may be respectively or simultaneously received by the reference signal transmission device.

Figure 20:
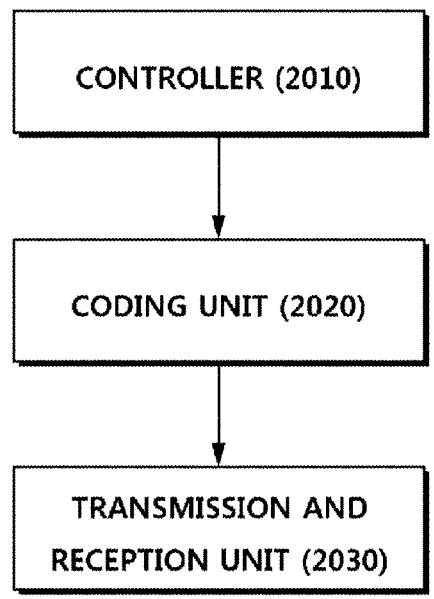
FIG. 20 is a block diagram illustrating a configuration of a reference signal receiving device according to an embodiment of the present specification.

FIG. 20 is a block diagram illustrating a configuration of a reference signal receiving device according to an embodiment of the present specification.

The reference signal receiving device includes a controller 2010, a coding unit 2020, and a transmission and reception unit 2030. More particularly, the controller 2010 determines a radio resource area to be calculated by the environmental information of the first reference transmission device. Also, the controller 2010 determines the second reference signal transmission device to transmit a periodic reference signal from the radio resource area. That is, the controller 2010 distinguishes a device transmitting the periodic reference signal from the area from which the aperiodic reference signal is transmitted, in order to prevent a collision generated in the process of transmitting the reference signal.

The coding unit 2020 generates a radio control signal including first instruction information for instructing the transmission of the aperiodic reference signal in the radio resource area. Further, the coding unit 2020 generates a radio control signal including second instruction information for instructing the transmission of the periodic reference signal to be held in the radio resource area. The transmission and reception unit 2030 transmits the radio control signal to at least one of the first and second reference signal transmission devices. This is to hold the transmission of the periodic reference signal which may collide with the aperiodic reference signal to be transmitted from the radio resource area. Then, the radio resource area receives the aperiodic reference signal from the first reference signal transmission device.

At this time, as shown in FIGS. 12 and 13, an A-SRS antenna configuration information or an A-SRS transmission bandwidth information, each of which is mapped or calculated through first instruction information, may be an example of environmental information. That is, the first reference signal transmission device determines the antenna configuration information and the transmission bandwidth information, which are used to transmit the aperiodic reference signal, through the first instruction information. As shown in FIGS. 14, 15, 16 and 17, the radio resource area information from which the A-SRS is transmitted can be calculated by using the environmental information and the transmission bandwidth information which are previously stored or received through the RRC. More particularly, at least one of start information and comb information of the bandwidth can be calculated by using the A-SRS transmission bandwidth information.

The first instruction information and the second instruction information are included in one radio control signal, and can be transmitted to the first and second reference signal transmission devices. Further, the first radio control signal includes the first instruction information, and the second radio control signal includes the second instruction information. The first and second control signals can be respectively or simultaneously transmitted. More particularly, the first instruction information and the second instruction information have a size of 2 bits or 3 bits. This information is included in a DCI format 4. The DCI format 4 is included in the radio control signal and transmitted. In other words, the first or second instruction information is included in the radio control signal of the DCI format 4 and transmitted.

As shown in FIG. 15, on the other hand, in a case of calculating allocation bandwidth information through which the aperiodic reference signal is transmitted by the A-SRS transmission bandwidth, a reference point (for example start position) at which the reference signal transmission device transmits the aperiodic reference signal in the allocation bandwidth can be calculated by using information calculated at a time point of transmitting the aperiodic reference signal and information calculated by the reference signal transmission device, as shown in FIGS. 16 and 17, and calculated by Equations 2 and 3. The reference signal transmission device can calculate the information by environmental information, while the reference signal receiving device, i.e. a base station, predicts the calculation and transmits instruction information.

Further, the transmission and reception device 2030 can transmit the environmental information to the reference signal transmission device through the RRC. The environmental information transmitted through the RRC can be continuously used without a separate change. Where the base station intends to change the environmental information, the transmission and reception device 2030 can transmit the environmental information through the RRC again.

Figure 21:
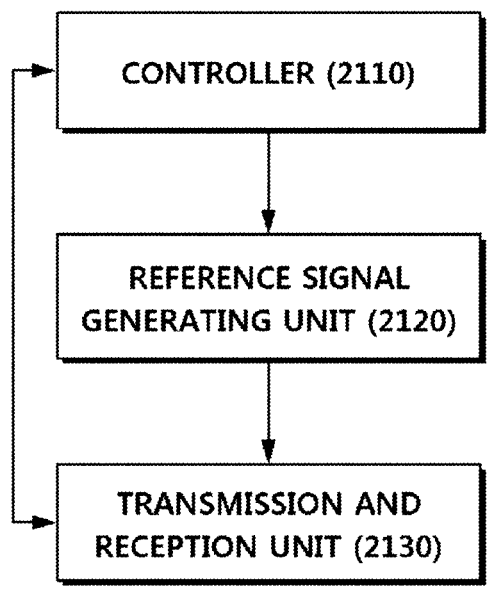
FIG. 21 is a block diagram illustrating a configuration of a reference signal transmission device according to an embodiment of the present specification.

FIG. 21 is a block diagram illustrating a configuration of a reference signal transmission device according to an embodiment of the present specification.

The reference signal transmission device may be a UE or a device combined with a UE to provide a function of transmitting the reference signal.

The reference signal transmission device includes a controller 2110, a reference signal generating unit 2120, and a transmission and reception unit 2130. More particularly, the reference signal transmission device 2130 receives instruction information for instructing a transmission of a reference signal from the reference signal receiving device, and transmits a reference signal. Where the instruction information is first instruction information for instructing a transmission of an aperiodic reference signal, the controller 2110 calculates information on a radio resource area, from which the aperiodic reference signal is transmitted, from the first instruction information and the environmental information. Where the instruction information is second instruction information for instructing a transmission of the periodic reference signal to be held, the transmission and reception unit 2130 holds the transmission of the periodic reference signal. Further, the reference signal generating unit 2120 generates the aperiodic reference signal by using the first instruction information and the environmental information.

More particularly, the instruction information has a size of 2 bits or 3 bits. This information is included in a DCI format 4. The DCI format 4 is included in a radio control signal and received. That is, the radio control signal of the DCI format 4 includes the first or second instruction information and is received. At this time, the instruction information may be the first instruction information for instructing a transmission of the aperiodic reference signal or the second instruction information for instructing the transmission of the periodic reference signal to be held.

Further, the controller 2110 calculates at least one of antenna configuration information required for the transmission of the aperiodic reference signal and a transmission bandwidth required for the transmission of the aperiodic reference signal, which are mapped on the first instruction information. As shown in FIGS. 12 and 13, the controller 2110 can calculate at least one of antenna configuration information required for the transmission of the aperiodic reference signal and a transmission bandwidth required for the transmission of the aperiodic reference signal, which are mapped on the first instruction information. At this time, A-SRS antenna configuration information or A-SRS transmission bandwidth information, which is mapped through the first instruction information, may be an example of environmental information. That is, the reference signal transmission device can determine the antenna configuration information and the transmission bandwidth information, which are used for the transmission of the aperiodic reference signal, through the first instruction information. As shown in FIGS. 14, 15, 16 and 17, it is possible to calculate the radio resource area, from which the A-SRS is transmitted, by using the environmental information and the transmission bandwidth information which are previously stored or received through the RRC. More particularly, at least one of start information and comb information of the bandwidth can be calculated by using the A-SRS transmission bandwidth information.

The start information is a reference position at which the reference signal transmission device transmits the aperiodic reference signal. The controller 2110 calculates the start information by using information which is calculated at a time point of transmitting the aperiodic reference signal and information which is calculated by the first reference signal transmission device. In a case of calculating information on an allocation bandwidth through which the aperiodic reference signal is transmitted, by using the A-SRS transmission bandwidth, as shown in FIG. 15, a reference position (for example start position) of the bandwidth, through which the reference signal transmission device transmits the aperiodic reference signal in the allocation bandwidth, can be calculated by using information which is calculated at a time point when the aperiodic reference signal is transmitted and information which is calculated by the reference signal transmission device, as shown in FIGS. 16 and 17, and calculated by Equations 2 and 3. The reference signal transmission device can calculate this information by using environmental information.

The transmission and reception unit 2130 can receive the environmental information through the RRC from the reference signal receiving device. The environmental information received through the RRC can be continuously used without a separate change. Where the base station (reference signal receiving device) intends to change the environmental information, the transmission and reception unit 2130 may receive the environmental information through the RRC again.

The reference signal transmission device transmits the aperiodic reference signal at a first time point, and the periodic reference signal at a second time point. Accordingly, any one of the first instruction information and the second instruction information may be included in a radio control signal. However, where the reference signal transmission device transmits the aperiodic reference signal, another UE in the same cell is capable of holding the transmission of the periodic reference signal. Therefore, the radio control signal may include second instruction information for the UE (reference signal transmission device) together. That is, one radio control signal has the first instruction information and the second instruction information for a plurality of reference signal transmission devices (UE) in the cell, and may be received by the first and second reference signal transmission devices. Further, the first radio control signal has the first instruction information, and the second radio control signal has the second instruction information. The first and second radio control signals may be respectively or simultaneously received.

The environmental information described above with reference to FIGS. 18 to 21 also includes information for a periodic SRS transmission (see FIGS. 2 to 4, and 7 to 10).

The present specification provides a configuration parameter set configured in a small range (3-state or 7-state) of information configured by 2 to 3 bits, in order for the configuration parameter set to directly instruct a transmission bandwidth antenna configuration or to presume and calculate the antenna configuration by combining with different information. The configuration parameter set includes parameters, such as cyclicshift-ap, transmissionComb-ap, srs-Bandwidth-ap, freqDomainPosition-ap and srsantenna-config-ap, which are configured in order to transmit the aperiodic reference signal. Further, the configuration parameter set includes information for holding a transmission of a periodic reference signal, so as to prevent collisions of the periodic and aperiodic reference signals between plural UEs.

An RRC-configured A-SRS parameter set may be configured to implicitly calculate all parameters such as cyclic-shift-ap, transmissionComb-ap, srs-Bandwidth-ap, freqDomainPosition-ap, and srsantennaconfig-ap, which are able to be configured to transmit the aperiodic reference signal, by using information of the configuration parameter set and the environmental information which is received through the RRC or previously stored.

Hereinafter, a method of including information relating to the aperiodic reference signal in a size of 2 to 3 bits in order to overcome a limitation of information to be carried with a physical channel according to another embodiment of the present specification will be described.

As described above, a piece of information (1-state) among a variety of information relating to the aperiodic reference signal is used to instruct that the aperiodic reference signal is not transmitted. Three pieces of information (3-state) or seven pieces of information (7-state) can be used to distinguish an RRC-configured A-SRS parameter set or as information to instruct the parameter set.

Examples of the parameters to be configured to transmit the aperiodic reference signal are the cyclicshift-ap, the transmissionComb-ap, the srs-Bandwidth-ap, the freqDomainPosition-ap, the srsnatennaconfig-ap, and the like. It is necessary for the parameters to be efficiently combined with one another so that each parameter meets a transmission environment, in order to configure the configuration parameter set including three pieces of information (3-state) or seven pieces of information (7-state). In a second embodiment of the present specification, a method of efficiently allocating A-SRS resources through the DCI format 4 by using an optimum A-SRS configuration parameter set including the A-SRS transmission antenna configuration information and the periodic SRS transmission parameter, etc. will be described. That is, a radio control signal of the DCI format 4 including information on the A-SRS configuration parameter set is transmitted and received between the base station and the UE.

FIGS. 7 to 10 show values $m_{SRS,b}$ and $N_b$ which are determined by the reference signal bandwidth configuration and the SRS bandwidth corresponding to the number of uplink resource blocks according to an embodiment of the present specification.

As shown in FIGS. 2 to 10, a variety of information is necessary for a transmission of the SRS. Accordingly, there is a limit to an amount of information carried with a physical channel which is configured to transmit all information for the transmission of the A-SRS. Therefore, considering the A-SRS parameters, it is impossible to express all parameters in a form of three piece of information (3-state) or seven piece of information (7-state). In the present specification, some parameters are implicitly allocated to meet a condition of the UE. A method of transmitting parameters as well as the implicit allocated information which are carried with the physical channel (a method of transmitting the parameters including the implicit allocated information using 3-state to 7-state: explicit) will be described.

Firstly, the implicit allocation of the number of multiple antenna transmissions and the A-SRS parameter according to an embodiment of the present specification will be described.

When the A-SRS is transmitted through multiple antennas, transmission power of each antenna is influenced by the number of the transmission antennas. Accordingly, if uplink channel information is obtained through a sounding signal, it is preferable to determine the number of antennas for the A-SRS transmission in consideration of the transmission power of each antenna. The allocation of a transmission bandwidth to each antenna according to the A-SRS transmission antenna considering the transmission power of each antenna is illustrated as shown in FIG. 22. When the number of antennas for the A-SRS transmission is 1, 2 or 4, the transmission bandwidths of the antennas respectively correspond to each of $m_{SRS,0}$, $m_{SRS,1}$, and $m_{SRS,2}$. Here, $m_{SRS,k}$ means a SRS transmission bandwidth according to k which is a value of the SRS bandwidth parameter shown in FIGS. 7 to 10. According to an embodiment of the present specification, it is considered that the transmission power decreases when the number of A-SRS transmission antennas increases. That is, where the number of antennas is 1 (1TX), the bandwidth is increased considering high transmission power. Where the number of antennas is 2 (2TX) or 4 (4TX), the bandwidth is decreased.

FIG. 22 is a table showing an A-SRS antenna configuration corresponding to an A-SRS transmission bandwidth according to an embodiment of the present specification, in which the A-SRS antenna configuration is implicitly used as the A-SRS transmission bandwidth.

In FIG. 22, a value, i.e. total A-SRS allocation BW, used as the A-SRS bandwidth according to the A-SRS antenna configuration, i.e. 1TX, 2TX, or 4TX is matched with $m_{SRS,0}$, $m_{SRS,1}$, or $m_{SRS,2}$. For example, in a case of transmitting the A-SRS using one antenna, the A-SRS transmission bandwidth can be identified through the $m_{SRS,0}$. This means that the value of $m_{SRS,0}$ corresponding to the value $C_{SRS}$ of each SRS bandwidth configuration is used as the A-SRS bandwidth as shown in FIGS. 7 to 10. For example, where the value $C_{SRS}$ of the SRS bandwidth configuration is 1 in FIG. 7, one antenna is configured and corresponds to the $m_{SRS,0}$. As a result, the A-SRS bandwidth becomes 96 resource blocks (RB). In a case that two antennas are configured, it corresponds to $m_{SRS,1}$, and the A-SRS bandwidth becomes 32 RB. Also, where four antennas are configured, it corresponds to $m_{SRS,2}$, and the A-SRS bandwidth becomes 16 RB.

The base station can refer to the bandwidth adapted to the A-SRS transmission of the corresponding UE and the antenna configuration information of the corresponding UE. The UE also can configure the A-SRS bandwidth using the information of a previous process, for example an RRC configuration process, when predetermined A-SRS trigger information is received through a physical channel.

When the configuration of FIG. 22 is applied, the A-SRS bandwidth, i.e. number of Resource Blocks, can be mapped to the number of antennas as indicated in Table 8 below.

TABLE 8

| SRS bandwidth configuration $C_{SRS}$ | | 1TX A-SRS bandwidth | 2TX A-SRS bandwidth | 4TX A-SRS bandwidth |
| --- | --- | --- | --- | --- |
| $80 <$ | 0 | 96 | 48 | 24 |
| $N_{RB}^{UL} \leq$ | 1 | 96 | 32 | 16 |
| 110 | 2 | 80 | 40 | 20 |
| | 3 | 72 | 24 | 12 |
| | 4 | 64 | 32 | 16 |

TABLE 8-continued

| SRS bandwidth configuration $C_{SRS}$ | | 1TX A-SRS bandwidth | 2TX A-SRS bandwidth | 4TX A-SRS bandwidth |
|---|---|---|---|---|
| | 5 | 60 | 20 | 4 |
| | 6 | 48 | 24 | 12 |
| | 7 | 48 | 16 | 8 |
| $60 < N_{RB}^{UL} \le 80$ | 0 | 72 | 24 | 12 |
| | 1 | 64 | 32 | 16 |
| | 2 | 60 | 20 | 4 |
| | 3 | 48 | 24 | 12 |
| | 4 | 48 | 16 | 8 |
| | 5 | 40 | 20 | 4 |
| | 6 | 36 | 12 | 4 |
| | 7 | 32 | 16 | 8 |
| $40 < N_{RB}^{UL} \le 60$ | 0 | 48 | 24 | 12 |
| | 1 | 48 | 16 | 8 |
| | 2 | 40 | 20 | 4 |
| | 3 | 36 | 12 | 4 |
| | 4 | 32 | 16 | 8 |
| | 5 | 24 | 4 | 4 |
| | 6 | 20 | 4 | 4 |
| | 7 | 16 | 4 | 4 |
| $6 < N_{RB}^{UL} \le 40$ | 0 | 36 | 12 | 4 |
| | 1 | 32 | 16 | 8 |
| | 2 | 24 | 4 | 4 |
| | 3 | 20 | 4 | 4 |
| | 4 | 16 | 4 | 4 |
| | 5 | 12 | 4 | 4 |
| | 6 | 8 | 4 | 4 |
| | 7 | 4 | 4 | 4 |

FIG. 22 shows the A-SRS transmission bandwidth according to the antenna configuration. The transmission bandwidth having a range equal to or larger than the A-SRS transmission bandwidth can be configured as the A-SRS allocation bandwidth. Referring to FIGS. 7 to 10, 23 and 24, it is known that the A-SRS allocation bandwidth is mapped to correspond to each antenna configuration as indicated by Tables 9 and 10. FIGS. 23 and 24 illustrate a method of calculating the A-SRS allocation bandwidth. The UE selects and transmits the A-SRS transmission bandwidth according to 2TX/4TX in the A-SRS allocation bandwidth calculated as indicated in FIGS. 23 and 24.

FIG. 23 is a table showing an A-SRS antenna configuration corresponding to a first allocation bandwidth including an A-SRS transmission bandwidth according to an embodiment of the present specification, in which the A-SRS antenna configuration is implicitly used as the allocation bandwidth. In FIG. 23, in a case of using one antenna (1TX), a size of the A-SRS bandwidth is $m_{SRS,0}$. But, in a case of using two or four antennas (2TX or 4TX), the allocation bandwidths calculated by using the $m_{SRS,0}$ and $m_{SRS,1}$ indicated by 2310 and 2320 can be used. For example, as shown in FIG. 7, where the value $C_{SRS}$ of the SRS bandwidth configuration is 1 and two antennas 2TX are used, the $m_{SRS,1}$ is 32 and $N_1$ is 3. Accordingly, in a case of using the two antennas 2TX as indicated by 1210, the A-SRS allocation bandwidth is 64 RB which is obtained by multiplying 32 by 2. On the other hand, in a case that the number of antennas is four, i.e. 4TX, the A-SRS allocation bandwidth becomes 32 RB obtained by subtracting the value of 64 RB as calculated by 2310 from the $m_{SRS,1}$ which has 96 RB as indicated by 1220.

In a case of applying the Equation in FIG. 23, the A-SRS allocation bandwidth, i.e. number of resource blocks, can be mapped to the number of antennas as indicated in Table 9.

TABLE 9

| SRS bandwidth configuration $C_{SRS}$ | | 1TX A-SRS allocation bandwidth | 2TX A-SRS allocation bandwidth | 4TX A-SRS allocation bandwidth |
|---|---|---|---|---|
| $80 < N_{RB}^{UL} \le 110$ | 0 | 96 | 48 | 48 |
| | 1 | 96 | 64 | 32 |
| | 2 | 80 | 40 | 40 |
| | 3 | 72 | 48 | 24 |
| | 4 | 64 | 32 | 32 |
| | 5 | 60 | 40 | 20 |
| | 6 | 48 | 24 | 24 |
| | 7 | 48 | 32 | 16 |
| $60 < N_{RB}^{UL} \le 80$ | 0 | 72 | 48 | 24 |
| | 1 | 64 | 32 | 32 |
| | 2 | 60 | 40 | 20 |
| | 3 | 48 | 24 | 24 |
| | 4 | 48 | 32 | 16 |
| | 5 | 40 | 20 | 20 |
| | 6 | 36 | 24 | 12 |
| | 7 | 32 | 16 | 16 |
| $40 < N_{RB}^{UL} \le 60$ | 0 | 48 | 24 | 24 |
| | 1 | 48 | 32 | 16 |
| | 2 | 40 | 20 | 20 |
| | 3 | 36 | 24 | 12 |
| | 4 | 32 | 16 | 16 |
| | 5 | 24 | 12 | 12 |
| | 6 | 20 | 12 | 8 |
| | 7 | 16 | 8 | 8 |
| $6 < N_{RB}^{UL} \le 40$ | 0 | 36 | 24 | 12 |
| | 1 | 32 | 16 | 16 |
| | 2 | 24 | 12 | 12 |
| | 3 | 20 | 12 | 8 |
| | 4 | 16 | 8 | 8 |
| | 5 | 12 | 8 | 4 |
| | 6 | 8 | 4 | 4 |
| | 7 | 4 | 4 | 0 |

FIG. 24 is a table showing an A-SRS antenna configuration corresponding to a second allocation bandwidth including an A-SRS transmission bandwidth according to an embodiment of the present specification, in which the A-SRS antenna configuration is implicitly used as the allocation bandwidth. In FIG. 24, in a case of using one antenna (1TX), a size of the A-SRS bandwidth is $m_{SRS,0}$. But, in a case of using two or four antennas (2TX or 4TX), the allocation bandwidths calculated by using the $m_{SRS,0}$ and $m_{SRS,1}$ indicated by 2410 and 2420 can be used. For example, as shown in FIG. 7, where the value $C_{SRS}$ of the SRS bandwidth configuration is 1 and four antennas, i.e. 4TX, are used, the $m_{SRS,1}$ is 32 and $N_1$ is 3. Accordingly, in a case of using the four antennas 4TX as indicated by 2420, the A-SRS allocation bandwidth is 64 RB which is obtained by multiplying 32 by 2. On the other hand, in a case that the number of antennas is two, i.e. 2TX, the A-SRS allocation bandwidth becomes 32 RB obtained by subtracting the value of 64 RB as calculated by 2420 from the $m_{SRS,0}$ which has 96 RB as indicated by 2410.

In a case of applying the Equation in FIG. 24, the A-SRS allocation bandwidth, i.e. number of resource blocks, can be mapped to the number of antennas as indicated in Table 10.

TABLE 10

| SRS bandwidth configuration $C_{SRS}$ | | 1TX A-SRS allocation bandwidth | 2TX A-SRS allocation bandwidth | 4TX A-SRS allocation bandwidth |
|---|---|---|---|---|
| $80 < N_{RB}^{UL} \le 110$ | 0 | 96 | 48 | 48 |
| | 1 | 96 | 32 | 64 |
| | 2 | 80 | 40 | 40 |
| | 3 | 72 | 24 | 48 |

TABLE 10-continued

| SRS bandwidth configuration $C_{SRS}$ | | 1TX A-SRS allocation bandwidth | 2TX A-SRS allocation bandwidth | 4TX A-SRS allocation bandwidth |
|---|---|---|---|---|
| | 4 | 64 | 32 | 32 |
| | 5 | 60 | 20 | 40 |
| | 6 | 48 | 24 | 24 |
| | 7 | 48 | 16 | 32 |
| $60 < N_{RB}^{UL} \le 80$ | 0 | 72 | 24 | 48 |
| | 1 | 64 | 32 | 32 |
| | 2 | 60 | 20 | 40 |
| | 3 | 48 | 24 | 24 |
| | 4 | 48 | 16 | 32 |
| | 5 | 40 | 20 | 20 |
| | 6 | 36 | 12 | 24 |
| | 7 | 32 | 16 | 16 |
| $40 < N_{RB}^{UL} \le 60$ | 0 | 48 | 24 | 24 |
| | 1 | 48 | 16 | 32 |
| | 2 | 40 | 20 | 20 |
| | 3 | 36 | 12 | 24 |
| | 4 | 32 | 16 | 16 |
| | 5 | 24 | 12 | 12 |
| | 6 | 20 | 8 | 12 |
| | 7 | 16 | 8 | 8 |
| $6 < N_{RB}^{UL} \le 40$ | 0 | 36 | 12 | 24 |
| | 1 | 32 | 16 | 16 |
| | 2 | 24 | 12 | 12 |
| | 3 | 20 | 8 | 12 |
| | 4 | 16 | 8 | 8 |
| | 5 | 12 | 4 | 8 |
| | 6 | 8 | 4 | 4 |
| | 7 | 4 | 0 | 4 |

The A-SRS bandwidth of FIG. 22 is mapped on the number of antennas in order to implicitly calculate the allocation bandwidth of FIGS. 23 and 24. Further, under a condition that the base station and the UE share information in advance, it is determined which one of the allocation bandwidths of FIGS. 23 and 24 is applied. The bandwidth information or the allocation bandwidth information among a lot of information for the A-SRS configuration shown in FIGS. 22, 23 and 24 can be shared by means of a high ranking signaling or a physical level as another example. As an example of the high ranking signaling, the bandwidth or the allocation bandwidth information can be shared in a process of configuring the RRC. That is, the base station implicitly provides the bandwidth information to the UE during the RRC configuring process. Hereinafter, the RRC will be described as an example.

The A-SRS bandwidth in FIG. 22 and Table 8 is actual bandwidth information for the A-SRS transmission. The A-SRS allocation bandwidth of FIGS. 23 and 24, and Tables 9 and 10 means information on the bandwidth to be allocated to actually transmit the A-SRS. As a result, it may be further required to determine frequency position information for the A-SRS retransmission in the A-SRS allocation bandwidth of FIGS. 23 and 24, and Tables 9 and 10. The determination process will be described below referring to FIGS. 26 and 27.

Next, a process of implicitly configuring comb information to be configured in the A-SRS transmission will be described.

Figure 25:
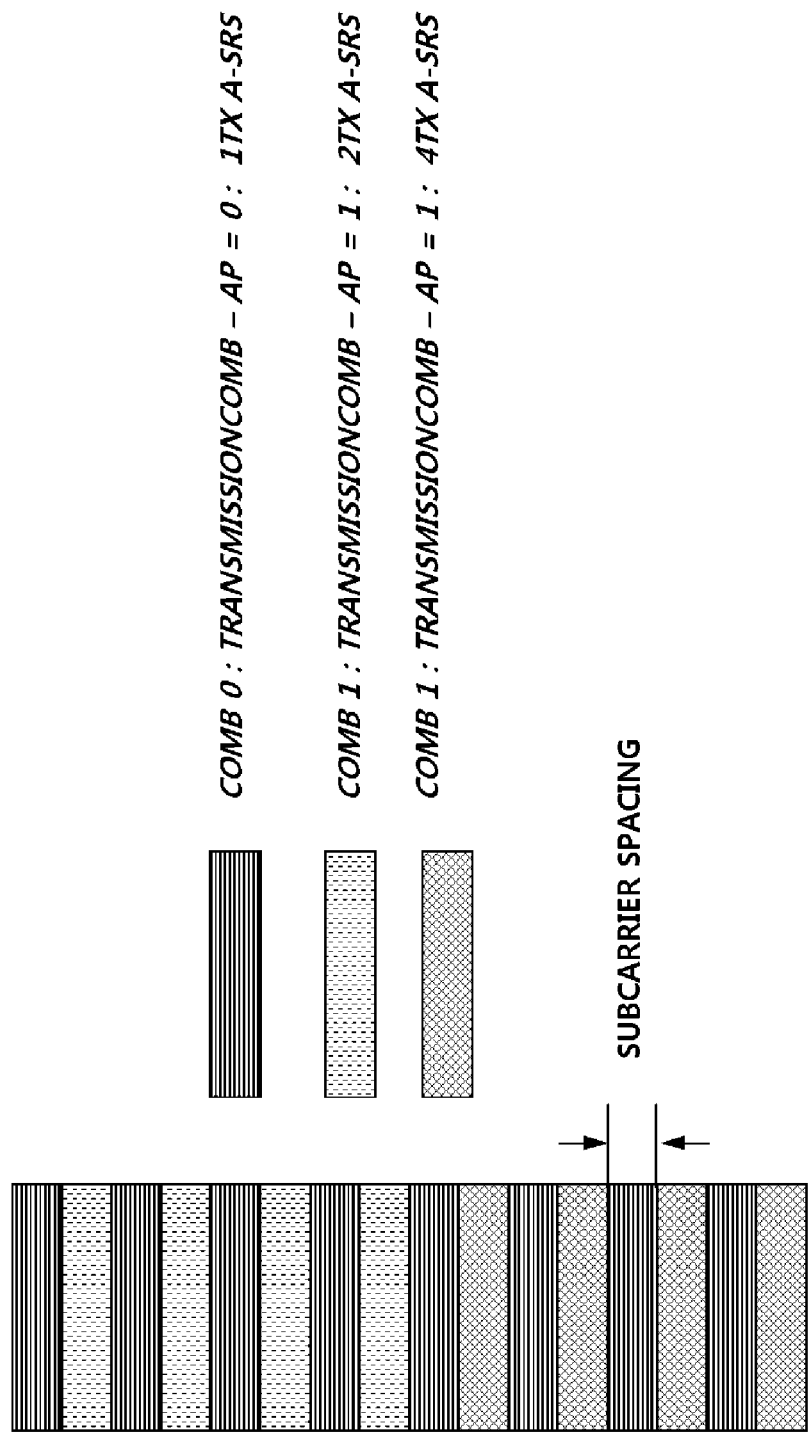
FIG. 25 is a view illustrating a frequency division of each antenna configuration corresponding to a value of transmission Comb-ap according to an embodiment of the present specification.

FIG. 25 is a view illustrating a frequency division of each antenna configuration corresponding to a value of transmissionComb-ap according to an embodiment of the present specification.

As aforementioned with reference to FIG. 5, when the A-SRS is transmitted in the frequency area divided into Comb 0 and Comb 1, each UE can transmit the sounding reference signal in any one comb. The configuration information is configured as the value of the transmissionComb-ap which is one of the SRS configuration parameters. On the other hand, the configuration information is configured to correspond to the number of antennas so that the UE presumes comb information through the number of antennas. Accordingly, the configuration information can be configured so that a separate signaling is unnecessary between the base station and the UE.

For example, the frequency area is divided into two groups according to the antenna configuration which each UE in a cell transmits, and to each of which a different comb value is allocated. As shown in FIG. 25, if antenna configurations of the UE in the cell respectively are 1TX, 2TX, and 4TX, the 1TX is defined as a group 1, and the 2TX and 4TX are defined as a group 2. TransmissionComb-ap=0 is allocated to the group 1, and transmissionComb-ap=1 is allocated to the group 2. When the 1TX which is the antenna configuration for the A-SRS transmission in the entire system bandwidth and the 2TX and 4TX which are the antenna configurations for the A-SRS transmission in a part of the bandwidth are distinguished by the transmissionComb-ap value, the UE presumes the transmissionComb-ap by using a corresponding A-SRS antenna configuration. As a result, the UE can determine which comb the A-SRS is transmitted in. That is, by implicitly matching the comb information with the A-SRS antenna configuration which the UE is capable of using, the UE implicitly calculates the comb information without a separate signaling for instructing the UE to calculate the comb information, and perform the A-SRS transmission by using the comb information. The A-SRS antenna configuration is applied as an example for implicitly calculating the comb information. However, lots of information for classifying a plurality of the UEs which are managed by the corresponding base station into various groups, as well as the A-SRS antenna configuration can be used to implicitly calculate the comb information.

It is described as an example that in a case of 1TX, comb 0, i.e. transmissionComb-ap=0, is applied to the group 1, and in a case of 2TX and 4TX, comb 1, i.e. transmissionComb-ap=1, is applied to the group 2, in FIG. 25. The comb information can be alternately applied to the groups. Although the comb information has three pieces of information, a process of matching the antenna configuration information with the comb information according to the present specification can be applied itself. Of course, interference between the 1TX and 4TX can be generated according to a configuration of a system, an antenna characteristic, and an A-SRS sequence characteristic (referred to as Zadoff-Chu sequence characteristic). However, the present specification is not limited to the characteristic, and includes the matching of the comb according to the antenna configuration and a case that the UE calculates the comb value through the antenna configuration information.

Next, a process of implicitly providing a frequency area in which the A-SRS starts and is transmitted will be described. The sizes of the bandwidth through which the A-SRS is transmitted have been described with reference to FIGS. 22 to 24 and Tables 8 to 10. These are information calculated by applying data of FIGS. 7 to 10.

Table 8 and FIG. 22 show the A-SRS bandwidth which the UE transmits. When obtaining information for the allocation bandwidth through which the UE transmits the A-SRS according to the antenna configuration as shown in Tables 9 and 10, and FIGS. 23 and 24, the UE can find the number of the frequency positions at which the A-SRS can be transmitted.

In other words, when the antenna configurations of the UE in the cell are the 1TX, 2TX and 4TX, the A-SRS allocation bandwidth according to the antenna configuration is the same as that shown in FIGS. 23 and 24. Also, a start position ($F_{freq\_position}^2$, $F_{freq\_position}^4$) according to the antenna configuration must be firstly found in order to obtain a frequency position. One of positions at which the A-SRS is able to be transmitted in a range of the allocation bandwidth from the start position according to the antenna configuration becomes a frequency position. At this time, the number of positions at which the A-SRS can be transmitted is equal to a value of dividing the total A-SRS allocation bandwidth by the transmission bandwidth.

Therefore, it is necessary that the start position ($F_{freq\_position}^2$, $F_{freq\_position}^4$) according to the antenna configuration is calculated and a start position of the A-SRS transmission bandwidth transmitted by each UE is determined on a basis of the corresponding start position. Firstly, if the number of the frequency position candidates is $N_{freq\_position}$, the number of frequency position candidates according to the number of antennas in FIG. 23 and Table 9 can be obtained by Equation 5.

$$\text{In a case of } 1TX: N_{freq\_position}^1 = \frac{m_{SRS,0}}{m_{SRS,0}} \quad \text{Equation 5}$$

$$\text{In a case of } 2TX: N_{freq\_position}^2 = \frac{\left(m_{SRS,1} \times \left\lceil \frac{N_1}{2} \right\rceil\right)}{m_{SRS,1}}$$

$$\text{In a case of } 4TX: N_{freq\_position}^4 = \frac{\left(m_{SRS,0} - m_{SRS,1} \times \left\lceil \frac{N_1}{2} \right\rceil\right)}{m_{SRS,2}}$$

In Equation 5, the frequency positions can be calculated by dividing the bandwidths to be allocated at 1TX, 2TX and 4TX in FIG. 23 by $m_{SRS,0}$, $m_{SRS,1}$, and $m_{SRS,0}$ which are the A-SRS transmission bandwidth.

When the A-SRS antenna configuration of the UE is 1TX, the A-SRS transmission bandwidth becomes $m_{SRS,0}$. Accordingly, the number of the frequency positions at the start position is 1, and the A-SRS is transmitted at a position of '0'.

On the other hand, if the number of the start position candidates according to the antenna configuration is 2 or more, the frequency position at which each UE transmits the A-SRS can be calculated by Equation 6 to which a sub-frame identification (subframe_ID) and a user equipment identification (UE_ID) are applied in order to calculate the frequency position. The sub-frame identification includes an identification of a sub-frame functioning as a trigger in a base station, an identification of a second sub-frame calculated from the trigger sub-frame, an identification of a sub-frame for an A-SRS transmission, and an identification of a second sub-frame calculated from the sub-frame for the A-SRS transmission. The UE identification has been allocated as a unique value to the UE. Accordingly, the base station previously calculates the frequency position and the bandwidth information necessary for the A-SRS transmission by using the information on the corresponding UE and the sub-frame information relating to the transmission, so as to trigger the A-SRS. Of course, before triggering the A-SRS, it is possible to trigger the A-SRS without the calculation of the frequency position and the bandwidth information.

Equation 6
In a case of 2TX
start position according to antenna configuration:

$$F_{freq\_position}^2 = (\text{subframe\_ID}) \bmod N_1$$

frequency position of each UE:

$$m_{SRS,1} \cdot ((F_{freq\_position}^2 + (UE\_ID) \bmod N_{freq\_position}^2) \bmod N_1)$$

In a case of 4TX
start position according to antenna configuration:

$$F_{freq\_position}^2 = (F_{freq\_position}^2 + N_{freq\_position}^2) \bmod N_1$$

frequency position of each UE:

$$m_{SRS,2} \cdot ((F_{freq\_position}^4 \cdot N_1 + (UE\_ID) \bmod N_{freq\_position}^4) \bmod (N_1 \cdot N_2))$$

As known in Equation 6, the start position of the frequency bandwidth through which the A-SRS is transmitted is calculated according to the antenna configuration. The UE using the corresponding antenna configuration calculates the frequency position in the corresponding allocation bandwidth.

Figure 26:
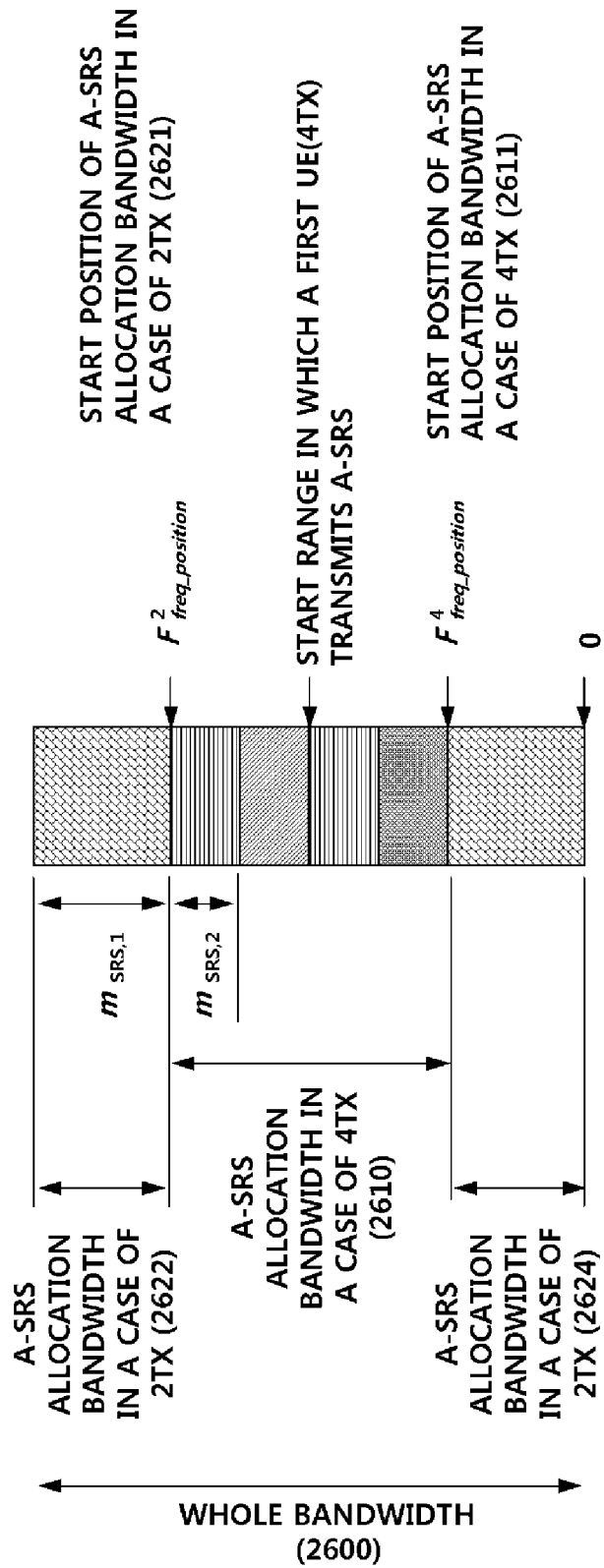
FIG. 26 is a view illustrating a frequency area through which an A-SRS is transmitted according to an embodiment of the present specification.

The frequency area which is calculated by applying Equations 5 and 6 and in which the A-SRS is transmitted is shown in FIG. 26.

In FIG. 26, in a case of 2TX, the A-SRS allocation bandwidth among the total bandwidth 2600 has a size of the sum of allocation bandwidths 2622 and 2644. In a case of 4TX, the A-SRS allocation bandwidth has a size of an allocation bandwidth 2610. In a case of 2TX, the Equation 6 is used to calculate the start position of the A-SRS allocation bandwidth in the total bandwidth 2600. The start position according to the antenna configuration can be calculated by dividing the total bandwidth by $N_1$ into 0, 1, 2, . . . , $N_1$-1. As a result, in a case of 2TX, the calculated A-SRS allocation bandwidth start position is 2621 ($F_{freq\_position}^2$), and in a case of 4TX, 2611 ($F_{freq\_position}^4$). In FIG. 26, in a case of 2TX, when the total allocation bandwidth is given to the allocation bandwidth start position 2621, the total allocation bandwidth passes a portion 2622. At this time, the total allocation bandwidth passes over a range of the total bandwidth. Therefore, the A-SRS allocation bandwidth 2624 can be allocated to the total allocation bandwidth so that the total allocation bandwidth starts at 0 again. The A-SRS allocation bandwidth can be calculated through the sub-frame identification. The frequency position which each UE has at the start positions 2611 and 2621 can be also calculated by applying Equation 6.

In Equation 6, the start positions of 2TX and 4TX are controlled through the sub-frame identification, and the A-SRS allocation bandwidth of 2TX and the A-SRS allocation bandwidth of 4TX do not overlap each other.

Figure 27:
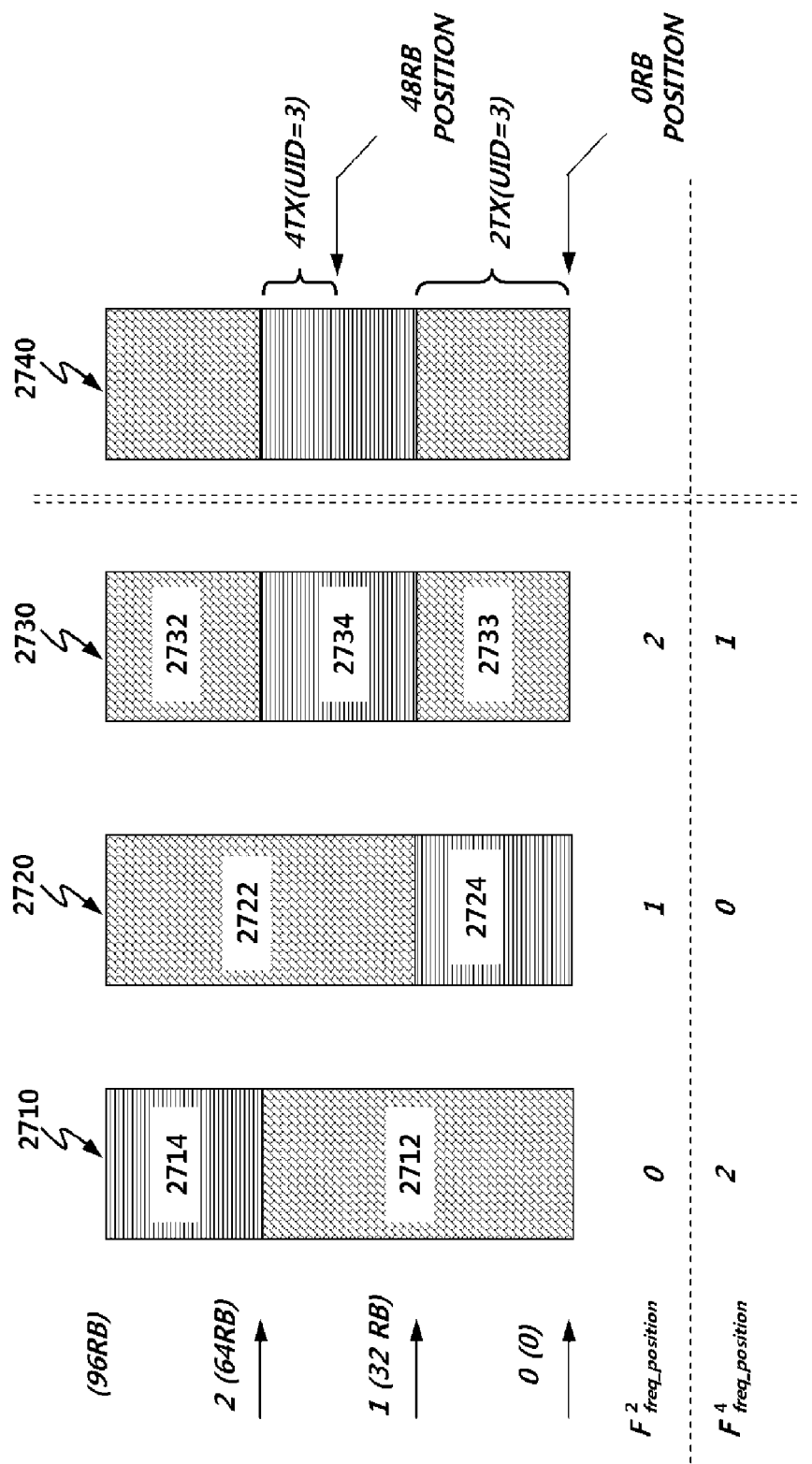

FIG. 27 is a view illustrating an A-SRS frequency resource which a UE or a base station calculates by applying Equations 5 and 6 in a case that $C_{SRS}$ of Table 9 and FIG. 23 are 1, according to an embodiment of the present specification.

For convenience of description, it is assumed that the sub-frame identification is 5, and the UE identification is 3.

Where the bandwidth is within a range of $80 < N_{RB}^{UL} \leq 110$ and the SRS bandwidth configuration information $C_{SRS}$ is 1, by using the configuration information of FIG. 7 and the bandwidth of FIG. 23, in a case of 1TX, the A-SRS allocation bandwidth is 96, in a case of 2TX, the A-SRS allocation bandwidth is 64, and in a case of 4TX, the A-SRS allocation bandwidth is 32, as shown in Table 9. In these cases, the available A-SRS allocation bandwidths are calculated as examples 2710, 2720 and 2730, as shown in FIG. 27.

The frequency position ($F_{freq\_position}^2$, $F_{freq\_position}^4$) of the available A-SRS allocation bandwidth is distinguished into 0, 1 and 2.

In a case of the A-SRS allocation bandwidth 2710 of 2TX, a value of the frequency position $F_{freq\_position}^2$ is 0. It is understood that the A-SRS allocation bandwidth 2712 of 2TX starts at a frequency position of 0. On the other hand, it is also known that the frequency position $F_{freq\_position}^4$ of the A-SRS allocation bandwidth 2714 of 4TX is calculated by applying Equation 6, the value of which is 2 (64RB).

Likewise, in 2720, in a case of 2TX, the A-SRS allocation bandwidth 2722 starts at 1 (32RB), and in a case of 4TX, the A-SRS allocation bandwidth 2724 starts at 0. Further, in 2730, in a case of 2TX, the A-SRS allocation bandwidths 2732 and 2733 start at 2 (64RB), and in a case of 4TX, the A-SRS allocation bandwidth 2734 starts at 1. In the case of 2730, a range of the 2TX passes over the range of the total bandwidth. Therefore, the allocation bandwidth 2733 starts at a position of 0 again.

In a case that the sub-frame identification is 5 and the UE identification is 3, similarly to 2730, the start position (according to the antenna configuration) of the A-SRS allocation bandwidth is 2, and the start position (according to the antenna configuration) of the A-SRS allocation bandwidth is 1. That is, the A-SRS of 2TX is transmitted by 32RB corresponding to $m_{SRS,1}$ in an area of '2732' or '2733', and the A-SRS of 4TX is transmitted by 16RB corresponding to $m_{SRS,2}$ in an area of '2734'.

As described above, although the A-SRS allocation bandwidth of 2TX is 64RB, the A-SRS transmission bandwidth through which the UE of 2TX actually transmits the A-SRS is 32RB. Accordingly, the A-SRS transmission position of the corresponding UE should be found in an area of '2732' or '2733'. When the frequency position of each UE is calculated by Equation 6 in order to find the A-SRS transmission position of the UE, in a case of 2TX, the frequency position is 0. Therefore, the UE configured in 2TX transmits the A-SRS of a 32RB size at the position of 0.

On the other hand, although the A-SRS allocation bandwidth of 4TX is 32RB, the A-SRS transmission bandwidth through which the UE of 4TX actually transmits the A-SRS is 16RB. Accordingly, the A-SRS transmission position of the corresponding UE should be found in an area of '2734'. When the frequency position of each UE is calculated by Equation 6 in order to find the A-SRS transmission position of the UE, the frequency position is 48. Therefore, the UE configured in 4TX transmits the A-SRS of a 16RB size at the position of 48R in a range of 32RB to 64RB.

Equation 7 shows a result calculated by applying Equations 5 and 6 to the condition of FIG. 27 under a condition that $C_{SRS}$ of FIG. 23 and Table 9 is 1.

Subframe_ID = 5, UE_ID = 3      Equation 7

$N_1 = 3, N_2 = 2$ $m_{SRS,0} = 96, m_{SRS,1} = 32, m_{SRS,2} = 16$

In a case of 1TX: $N_{freq\_position}^1 = \frac{m_{SRS,0}}{m_{SRS,0}} = 1$

In a case of 2TX:

$N_{freq\_position}^2 = (m_{SRS,1} \times \lceil N_1/2 \rceil)/m_{SRS,1} = 2$

-continued

In a case of 4TX:

$N_{freq\_position}^4 = (m_{SRS,0} - m_{SRS,1} \times \lceil N_1/2 \rceil)/m_{SRS,2} = 2$ In a case of 2TX:

$F_{freq\_position}^2 = (\text{subframe\_ID}) \bmod N_1 = 2$ $m_{SRS,1} \cdot$ $((F_{freq\_position}^2 + \text{UE\_ID}) \bmod N_{freq\_position}^2) \bmod N_1) = 0$ In a case of 4TX:

$F_{freq\_position}^4 = (F_{freq\_position}^2 + N_{freq\_position}^2) \bmod N_1 = 1$ $m_{SRS,2} \cdot ((F_{freq\_position}^4 \cdot N_2 + \text{UE\_ID}) \bmod N_{freq\_position}^4)$ $\bmod(N_1 \cdot N_2)) = 48$ Further, in a case of 2TX in which the UE (UE_ID is 3) transmits the A-SRS, the start position calculated by Equation 7 is 0, and in a case of 4TX, the start position is 48RB.

Figure 28:
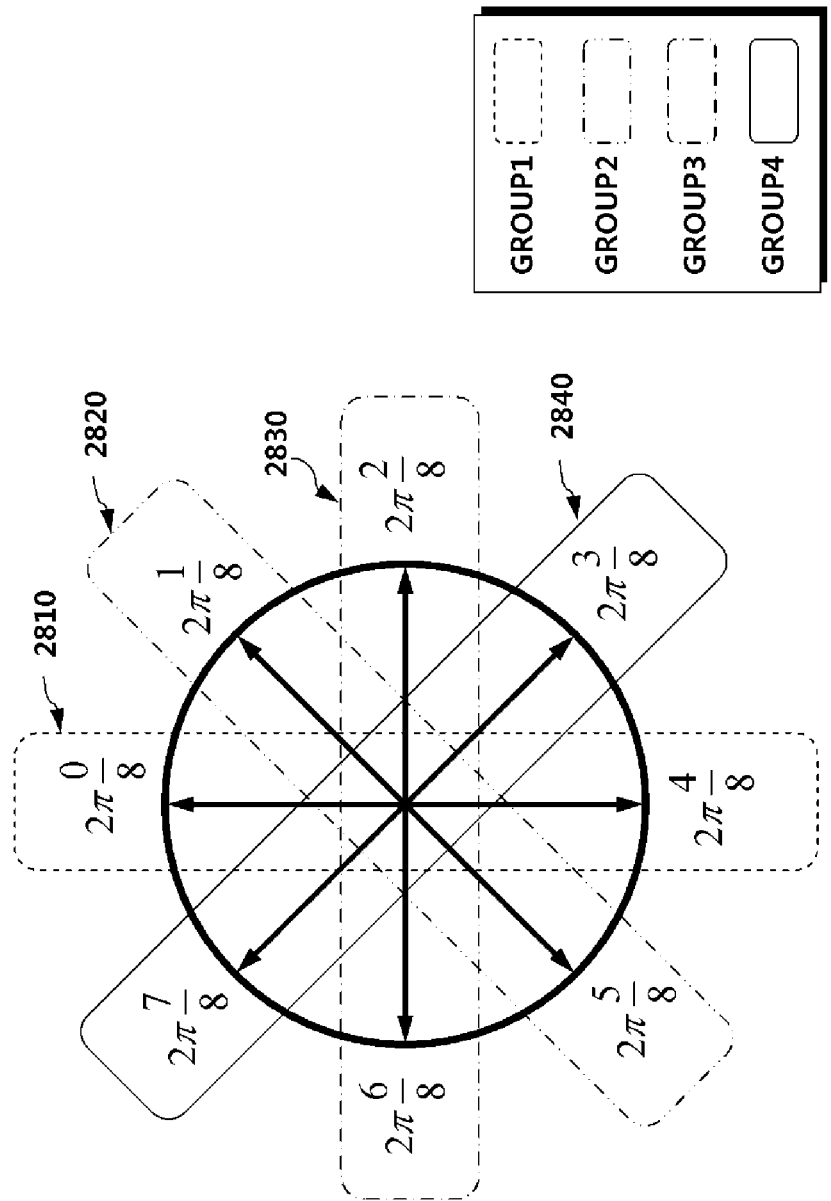
FIGS. 28 and 29 are views illustrating a cyclic shift for an A-SRS transmission according to an embodiment of the present specification.
Figure 29:
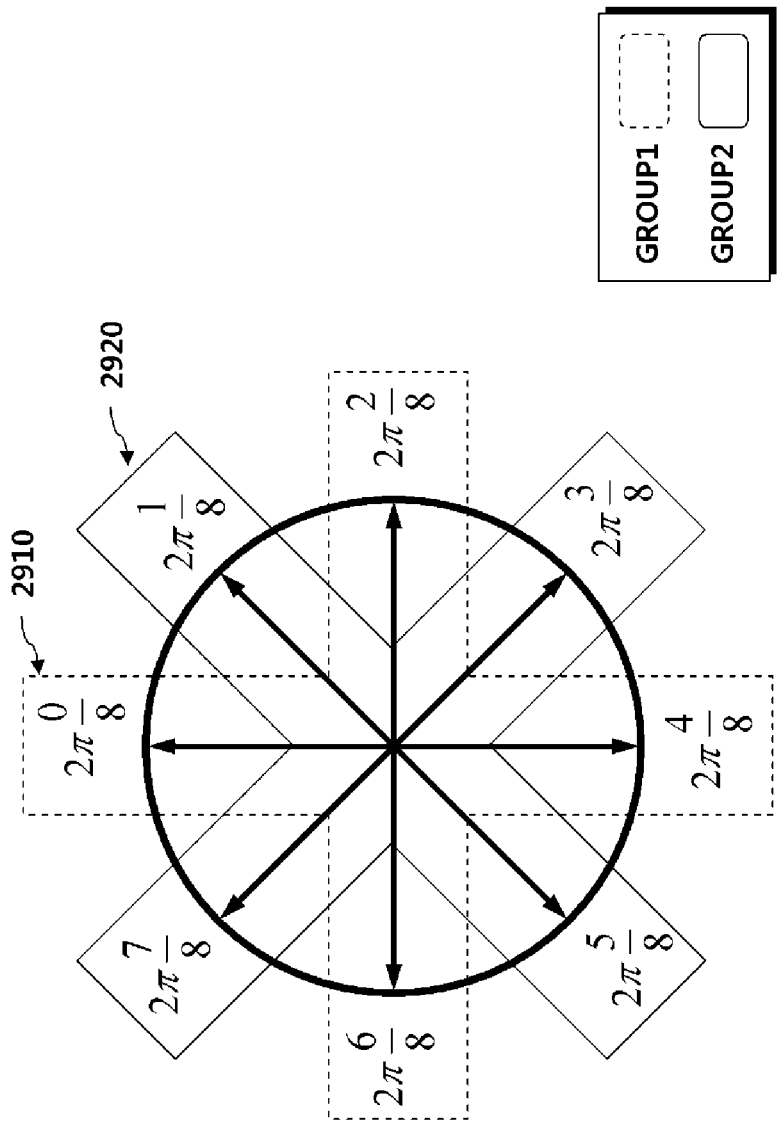

As described above, the base station can implicitly allocate the transmissionComb-ap, srs-Bandwidth-ap, and freq-DomainPosition-ap among the parameters for the A-SRS transmission, to meet the environment of the UE. The implicit allocation to meet the environment can be achieved by the high ranking signaling or the physical level. The A-SRS can be provided to the UE through the RRC as an example of the high ranking signaling. Accordingly, the base station dynamically allocates a cyclicshift-ap to each UE by using 3-state (2 bits) to 7-state (3 bits), so as to control the UEs to use different resources. FIGS. 28 and 29 show a process of allocating the cyclicshift-ap using 2 bits or 3 bits.

FIGS. 28 and 29 are views illustrating a cyclic shift for an A-SRS transmission according to an embodiment of the present specification. As described above, a $n_{SRS}^{CS}$ showing the cyclic shift among the lots of information necessary for the A-SRS transmission can be also provided to the UE. The UE has a value of the cyclic shift which is divided into a total of eight pieces as shown in FIG. 6, to each of which 3 bits are allocated. The cyclic shift α has a value calculated by Equation 8. Accordingly, the base station provides the UE with $n_{SRS}^{CS}$ (3 bits) so that the UE calculates the cyclic shift α.

$$\alpha = 2\pi \frac{n_{SRS}^{cs}}{8}, n_{SRS}^{cs} = 0, 1, 2, 3, 4, 5, 6, 7 \quad \text{Equation 8}$$

However, where there is one antenna, the UE selects one from the values of $n_{SRS}^{CS}$. Where there is a plurality of antennas, a distance among the antennas is required. Therefore, the values of $n_{SRS}^{CS}$ can be classified into several groups. For example, in FIG. 27, when the UE has two antennas, one UE can have four values of $n_{SRS}^{CS}$. A distance between two antennas is defined by π (180°). In FIG. 28, the number of cases which the $n_{SRS}^{CS}$ is capable of having are four cases, which can be classified into groups 1, 2, 3 and 4. The group 1 corresponds to 1710, the group 2 corresponds to 1720, the group 3 corresponds to 1730, and the group 4 corresponds to 1740. In each group, the $n_{SRS}^{CS}$ which the UE (having two antennas) takes is indicated in Table 11. In Table 11, terms "first antenna" and "second antenna" are temporarily designated with relation to two antennas, and "first" and "second" can be alternately used.

TABLE 11

| Group | $n_{SRS}^{CS}$ of first antenna | $n_{SRS}^{CS}$ of second antenna |
|---|---|---|
| 1 | $2\pi\frac{0}{8}$ | $2\pi\frac{4}{8}$ |
| 2 | $2\pi\frac{1}{8}$ | $2\pi\frac{5}{8}$ |
| 3 | $2\pi\frac{2}{8}$ | $2\pi\frac{6}{8}$ |
| 4 | $2\pi\frac{3}{8}$ | $2\pi\frac{7}{8}$ |

When the base station designates and transmits one of the groups 1, 2, 3 and 4 as 2 bit information according to Table 11, the UE applies $n_{SRS}^{CS}$ of the first antenna or the second antenna corresponding to the received group, and calculates the cyclic shift α as indicated in Equation 5.

Likewise, in a case of four antennas, the $n_{SRS}^{CS}$ can be divided into two groups as shown in FIG. 29. One UE has two $n_{SRS}^{CS}$. A distance among the four antennas of the UE is defined by π/2 (90°). In FIG. 29, the number of cases which the $n_{SRS}^{CS}$ can have are two cases, which can be classified into two groups 1 and 2. The group 1 corresponds to 2910, and the group 2 corresponds to 2920. In each group, the $n_{SRS}^{CS}$ which the UE (having four antennas) takes is indicated in Table 12. In Table 12, Terms "first antenna", "second antenna", "third antenna" and "fourth antenna" are temporarily designated with relation to two antennas, and "first", "second", "third" and "fourth" can be alternately used.

TABLE 12

| Group | $n_{SRS}^{CS}$ of first antenna | $n_{SRS}^{CS}$ of second antenna | $n_{SRS}^{CS}$ of third antenna | $n_{SRS}^{CS}$ of fourth antenna |
|---|---|---|---|---|
| 1 | $2\pi\frac{0}{8}$ | $2\pi\frac{2}{8}$ | $2\pi\frac{4}{8}$ | $2\pi\frac{6}{8}$ |
| 2 | $2\pi\frac{1}{8}$ | $2\pi\frac{3}{8}$ | $2\pi\frac{5}{8}$ | $2\pi\frac{7}{8}$ |

That is, in a case of a multiple antenna transmission, as shown in FIGS. 28 and 29, and Table 11 and 12, as the cyclic shifts are classified into several groups, the number of bits of information used for the cyclic shifts can be reduced by using an Equation Information on the cyclic shift groups is 2 bits where N is 2, and 1 bit where N is 4. Therefore, information transmitted and received between the base station and the UE can be reduced. Various configurations of the base station and the UE can determine which cyclic shift value the cyclic shift information of 3 bits is matched with.

As shown in FIGS. 28 and 29, the antennas of each UE are distinguished by the cyclic shift. The antenna configurations of the UE are classified into two or four groups so as to allocate cyclic shift resources according to the 2TX and 4TX. In addition, as a periodic SRS UE and an A-SRS UE share the resources with each other, a piece of information (1-state) can be used in order to instruct the UEs to hold the periodic SRS transmission in preparation for the collision between the UEs. In this case, 2-state or 6-state is used as the cyclicshift-ap.

The configuration of information for the A-SRS transmission by using a physical channel according to an embodiment of the present specification will be described. In cases of involving 2 bit or 3 bit information in the DCI format 4 among the physical channels, the A-SRS configurations are respectively indicated in Tables 13 and 14. Information allocation for each bit physical channel can be achieved in different methods while the information allocation is implemented.

TABLE 13

A-SRS configuration in a case of 2 bits

| 2 bits | A-SRS configuration |
|---|---|
| 0 (00) | No A-SRS activation |
| 1 (01) | Cyclic shift information |
| 2 (10) | Cyclic shift information |
| 3 (11) | Periodic SRS holding |

TABLE 14

A-SRS configuration in a case of 3 bits

| 3 bits | A-SRS configuration |
|---|---|
| 0 (000) | No A-SRS activation |
| 1 (001) | Cyclic shift information |
| 2 (010) | Cyclic shift information |
| 3 (011) | Cyclic shift information |
| 4 (100) | Cyclic shift information |
| 5 (101) | Cyclic shift information |
| 6 (110) | Cyclic shift information |
| 7 (111) | Periodic SRS holding |

The cyclic shift information of Tables 13 and 14 includes the cyclic shift information which is classified in the groups as shown in FIGS. 28 and 29.

On the other hand, it is possible to exclude the periodic SRS holding from the A-SRS configuration, to involve only the No A-SRS activation and the cyclic shift information in the A-SRS configuration. This is indicated in Tables 15 and 16.

TABLE 15

A-SRS configuration in a case of 2 bits

| 2 bits | A-SRS configuration |
|---|---|
| 0 (00) | No A-SRS activation |
| 1 (01) | Cyclic shift information |
| 2 (10) | Cyclic shift information |
| 3 (11) | Cyclic shift information |

TABLE 16

A-SRS configuration in a case of 3 bits

| 3 bits | A-SRS configuration |
|---|---|
| 0 (000) | No A-SRS activation |
| 1 (001) | Cyclic shift information |
| 2 (010) | Cyclic shift information |
| 3 (011) | Cyclic shift information |
| 4 (100) | Cyclic shift information |
| 5 (101) | Cyclic shift information |
| 6 (110) | Cyclic shift information |
| 7 (111) | Cyclic shift information |

Hereinafter, a method and apparatus for transmitting and receiving an aperiodic reference signal using an implicit radio resource area will be described according to an embodiment of the present specification. The implicit radio resource area includes environmental information such as an A-SRS transmission bandwidth, an A-SRS allocation bandwidth, a reference position (start position) in a bandwidth, and antenna configurations (1TX, 2TX and 4TX). A UE can determine the radio resource area using the environmental information. Of course, a base station previously determines the radio resource area which the UE is able to determine, and receives an A-SRS relating to the radio resource area. Also, the base station can match comb information relating to the A-SRS transmission with the environmental information such as the antenna configuration (1TX, 2TX and 4TX) as shown in FIG. 25. The UE can determine which comb the A-SRS is transmitted in by using the environmental information. Further, instruction information includes cyclic shift information relating to a generation of the A-SRS. The cyclic shift information can include information on groups as shown in FIGS. 28 and 29.

In addition, the base and UE can share the environmental information with each other through an RRC signaling.

Of course, configurations of Tables 13 and 14 can be changed in various forms. For example, the cyclic shift information except for the SRS holding is allocated to all of 1 to 3-states, or 1 to 7-states. The A-SRS configuration can be restructured so as to allocate more information. This can be identified through Tables 15 and 16. Which information to be included in addition to information indicated in Tables 15 and 16 can be included, and which information to be instructed can be determined according to a network configuration, an appointment between the base station and the UE, or based on information transmitted through a high ranking level such as the RRC or information previously configured by operations of the base station and the UE.

Figure 30:
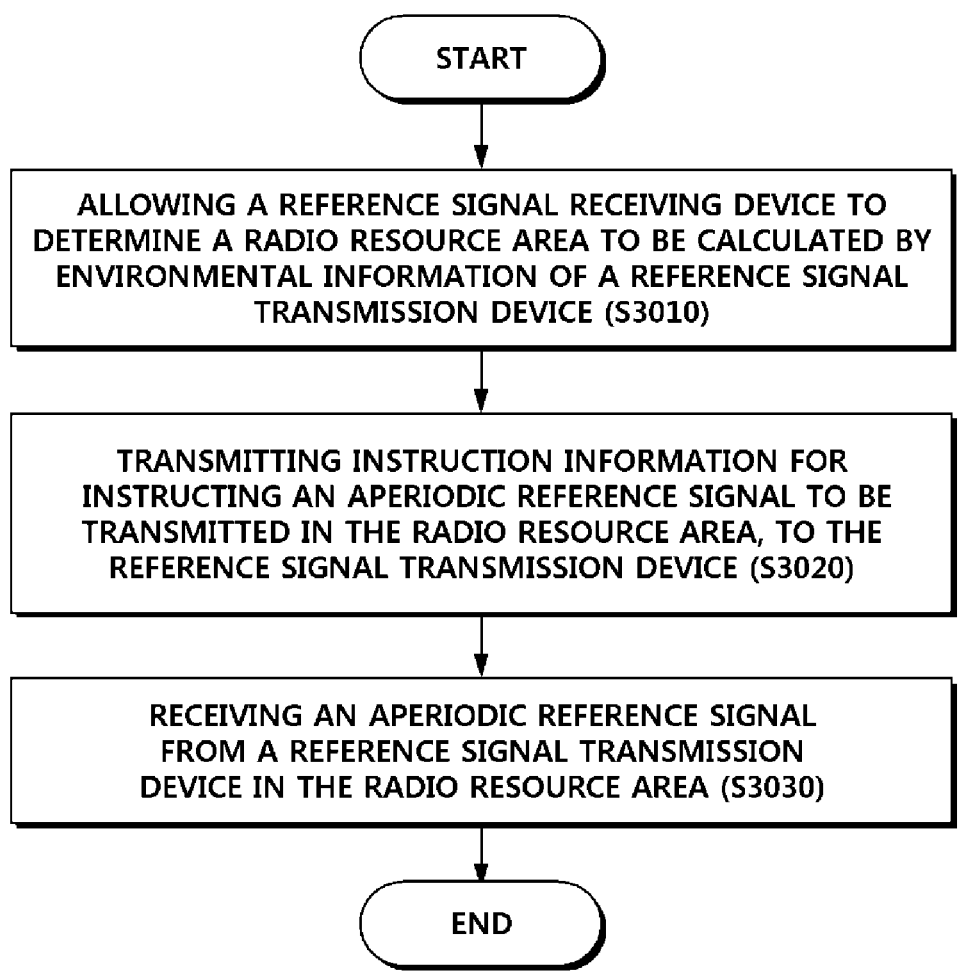
FIG. 30 is a flowchart illustrating a process of receiving an aperiodic reference signal by using implicit radio resource area information in a reference receiving device according to an embodiment of the present specification.

FIG. 30 is a flowchart illustrating a process of receiving an aperiodic reference signal by using implicit radio resource area information in a reference signal receiving device according to an embodiment of the present specification.

The reference signal receiving device may be a base station, or a device which provides a function of receiving the reference signal and is combined with the base station.

The reference signal receiving device determines a radio resource area to be calculated by environmental information of the reference signal transmission device in step S3010. At this time, an antenna configuration may be an example of the environmental information. That is, the reference signal receiving device can calculate the radio resource area by using the antenna configuration which the reference signal transmission device uses in order to transmit the aperiodic reference signal. More particularly, the reference signal receiving device can calculate at least one of bandwidth information, start information of a bandwidth, and comb information by using the antenna configuration.

On the other hand, in a case of calculating information on an allocation bandwidth through which the aperiodic reference signal is transmitted, by using the antenna configuration as shown in FIGS. 23 and 24, a reference position, for example a start position, of the bandwidth through which the reference signal transmission device transmits the aperiodic reference signal in the allocation bandwidth, can be calculated by using information calculated by the reference signal transmission device and information calculated at a time point of the aperiodic reference signal transmission, as shown in FIGS. 26 and 27, and indicated by Equations 5 and 6. The reference signal transmission device, for example the UE, can calculate the information by using the environmental information. The reference signal receiving device, for example a base station, can predict the environmental information and transmit instruction information.

The instruction information for instructing the aperiodic reference signal to be transmitted in the radio resource area is transmitted to the reference signal transmission device in step S3020. More particularly, the instruction information has a size of 2 bits or 3 bits, which is involved in a DCI format 4. The DCI format 4 is included in the radio control signal and transmitted.

The instruction information may include cyclic shift information necessary for a generation of the aperiodic reference signal. Especially, in the environment of 2TX or 4TX, the instruction information may be cyclic shift group information to be applicable according to the number of antennas of the reference signal transmission device as shown in FIGS. 28 and 29.

The aperiodic reference signal is received from the reference signal transmission device in the radio resource area in step S3030.

Before performing step S3010, the reference signal receiving device can transmit the environmental information to the reference signal transmission device through the RRC. The environmental information to be transmitted through the RRC can be continuously used without a separate change. When the base station intends to change the environmental information, the reference signal receiving device may transmit the environment information through the RRC.

Figure 31:
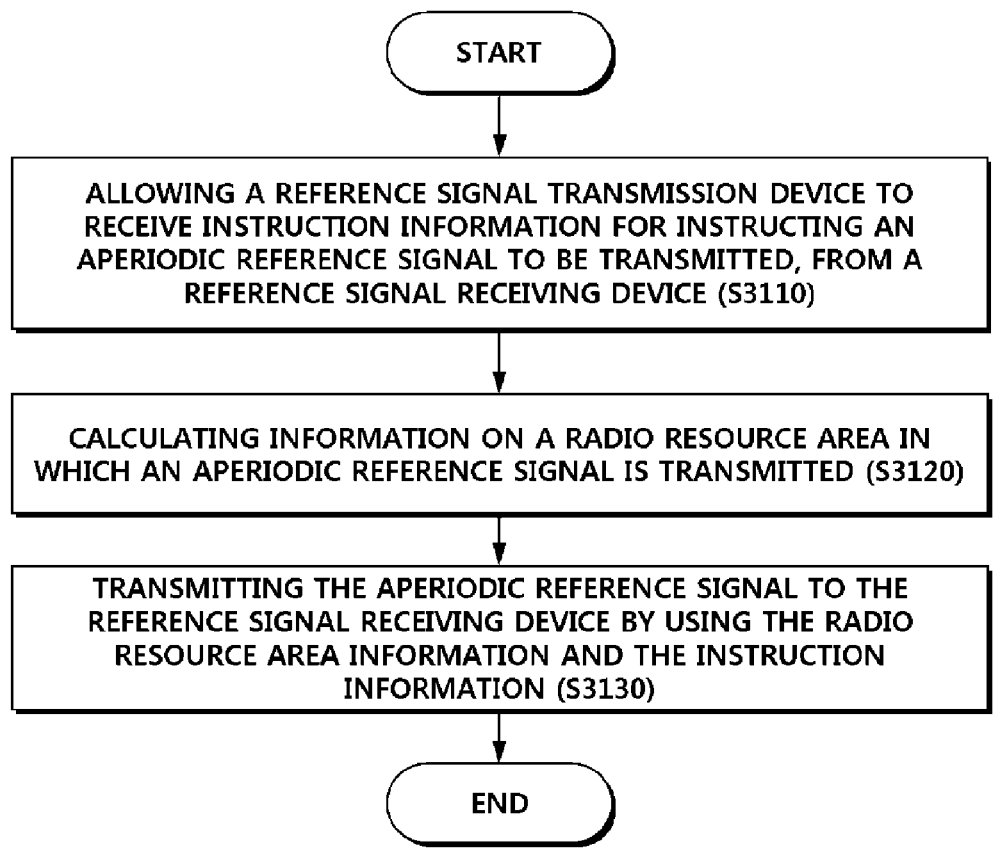
FIG. 31 is a flowchart illustrating a process of transmitting an aperiodic reference signal by using implicit radio resource area information in a reference transmission device according to an embodiment of the present specification.

FIG. 31 is a flowchart illustrating a process of transmitting an aperiodic reference signal by using implicit radio resource area information in a reference transmission device according to an embodiment of the present specification.

The reference signal transmission device may be a UE or a device providing a function of transmitting a reference signal and combined with the UE.

The reference signal transmission device receives instruction information for instructing the aperiodic reference signal to be transmitted, from the reference signal receiving device in step S3110. More particularly, the instruction information has a size of 2 bits or 3 bits, which is involved in a DCI format 4. The DCI format 4 is included in the radio control signal and transmitted. The instruction information may include cyclic shift information necessary for a generation of the aperiodic reference signal. Especially, in the environment of 2TX or 4TX, the instruction information may be cyclic shift group information to be applicable according to the number of antennas of the reference signal transmission device as shown in FIGS. 28 and 29.

Information on the radio resource area to which the aperiodic reference signal is transmitted is calculated by using the environmental information. At this time, an antenna configuration may be an example of the environmental information. That is, the reference signal transmission device can calculate the radio resource area by using the antenna configuration used to transmit the aperiodic reference signal. More particularly, the reference signal transmission device can calculate at least one of bandwidth information, start information of a bandwidth, and comb information by using the antenna configuration.

On the other hand, in a case of calculating information on an allocation bandwidth through which the aperiodic reference signal is transmitted, by using the antenna configuration as shown in FIGS. 23 and 24, a reference position, for example start position, of the bandwidth through which the reference signal transmission device transmits the aperiodic reference signal in the allocation bandwidth, can be calculated by using information calculated by the reference signal transmission device and information calculated at a time point of the aperiodic reference signal transmission, as shown in FIGS. 26 and 27, and indicated by Equations 5 and 6.

The reference signal transmission device transmits radio resource area information through the environmental information, generates a reference signal by using the instruction information and transmits an aperiodic reference signal to the reference signal receiving device in step S3130.

Before performing step S3110, the reference signal transmission device can receive the environmental information from the reference signal receiving device through the RRC. The environmental information to be transmitted the RRC can be continuously used without a separate change. When the base station, for example, the reference signal receiving device, intends to change the environmental information, the reference signal transmission device may transmit the environment information through the RRC.

FIG. 20 is a view illustrating a configuration of the reference signal receiving device, examples of which are shown in FIGS. 22 to 31.

The reference signal receiving device may be a base station or a device which provides a function of receiving a reference signal and is combined with the base station.

The reference signal receiving device includes a controller 2010, a coding unit 2020, and a transmission and reception unit 2030. More particularly, the controller 2010 determines a radio resource area to be calculated by the environmental information of the reference signal transmission device. The coding unit 2020 generates a radio control signal including instruction information for instructing the aperiodic reference signal to be transmitted in the radio resource area. The transmission and reception unit 2030 transmits the radio control signal to the reference signal transmission devices, and receives the aperiodic reference signal from the reference signal transmission device in the radio resource area.

At this time, antenna configuration information may be an example of environmental information. That is, the radio resource area information can be calculated by using the antenna configuration information which the reference signal transmission device uses in order to transmit the aperiodic reference signal. More particularly, the antenna configuration information is used to calculate at least one of bandwidth information, start information of a bandwidth, and comb information.

On the other hand, in a case of calculating information on an allocation bandwidth through which the aperiodic reference signal is transmitted, by using the antenna configuration information as shown in FIGS. 23 and 24, a reference position, for example start position, of a bandwidth through which the reference signal transmission device transmits the aperiodic reference signal in the allocation bandwidth can be calculated by using information calculated at a time point of a transmission of the aperiodic reference signal and information calculated by the reference signal transmission device, as shown in FIGS. 26 and 27, and indicated by Equations 5 and 6.

The instruction information has a size of 2 bits or 3 bits, which is involved in a DCI format 4. The DCI format 4 is included in the radio control signal and transmitted.

The instruction information may include cyclic shift information necessary for a generation of the aperiodic reference signal. Especially, in the environment of 2TX or 4TX, the instruction information may be cyclic shift group information to be applicable according to the number of antennas of the reference signal transmission device as shown in FIGS. 28 and 29.

The transmission and reception unit 2030 can transmit the environmental information to the reference signal transmission device through the RRC. The environmental information to be transmitted through the RRC can be continuously used without a separate change. When the base station intends to change the environmental information, the transmission and reception unit 2030 may transmit the environment information through the RRC.

FIG. 21 is a view illustrating a configuration of the reference signal transmission device, examples of which are shown in FIGS. 22 to 31.

The reference signal transmission device may be a base station or a device which provides a function of receiving a reference signal and is combined with the base station.

The reference signal transmission device includes a controller 2110, a reference signal generating unit 2120, and a transmission and reception unit 2130. More particularly, the transmission and reception unit 2130 receives instruction information for instructing an aperiodic reference signal to be transmitted, from the reference signal receiving device, and transmits the aperiodic reference signal. The controller 2110 calculates radio resource area information to which the aperiodic reference signal is transmitted, by using environmental information. Further, the reference signal generating unit 2120 generates an aperiodic reference signal by using the instruction information.

At this time, the transmission and reception unit 2130 transmits the aperiodic reference signal to the reference signal receiving device by using information calculated by the controller 2110.

The instruction information has a size of 2 bits or 3 bits, which is involved in a DCI format 4. The DCI format 4 is included in the radio control signal and transmitted. The instruction information may include cyclic shift information necessary for a generation of the aperiodic reference signal. Especially, in the environment of 2TX or 4TX, the instruction information may be cyclic shift group information to be applicable according to the number of antennas of the reference signal transmission device as shown in FIGS. 28 and 29.

Information on the radio resource area to which the aperiodic reference signal is transmitted is calculated by using the environmental information. At this time, an antenna configuration may be an example of the environmental information. That is, the reference signal transmission device can calculate the radio resource area by using the antenna configuration used to transmit the aperiodic reference signal. More particularly, the reference signal transmission device can calculate at least one of bandwidth information, start information of a bandwidth, and comb information by using the antenna configuration.

On the other hand, in a case of calculating information on an allocation bandwidth through which the aperiodic reference signal is transmitted, by using the antenna configuration as shown in FIGS. 23 and 24, a reference position, for example start position, of the bandwidth through which the reference signal transmission device transmits the aperiodic reference signal in the allocation bandwidth, can be calculated by using information calculated by the reference signal transmission device and information calculated at a time point of the aperiodic reference signal transmission, as shown in FIGS. 26 and 27, and indicated by Equations 5 and 6.

The transmission and reception unit 2130 can transmit the environmental information to the reference signal transmission device through the RRC. The environmental information to be transmitted through the RRC can be continuously used without a separate change. When the base station intends to change the environmental information, the transmission and reception unit 2130 may transmit the environment information through the RRC.

The environmental information as mentioned in FIGS. 20, 21, 30 and 31, includes antenna configuration information, etc., and also includes information for a periodic SRS transmission (see. FIGS. 2, 3, 4, 7, 8, 9 and 10).

It is necessary for parameters to be efficiently combined with one another so that each parameter meets a transmission environment, in order to configure several parameters among parameters such as cyclicshift-ap, transmissionComb-ap, srs-Bandwidth-ap, freqDomainPosition-ap, and srsantennaconfig-ap which are configured to transmit the A-SRS, as a configuration parameter set which can be stored in a range of information of 2 bits (3-state) and 3 bits (7-state). In the present specification, an optimum A-SRS configuration parameter set is configured by applying the A-SRS transmission antenna information, a periodic SRS transmission parameter, etc., so that the A-SRS resources can be efficiently allocated through a DCI format 4. For the purpose, several parameters among the A-SRS parameters are allowed to be presumed according to an environment of a UE and other parameters are dynamically allocated. Therefore, it is possible to configure an RRC-configured A-SRS parameter set by using 3-state or 7-state.

Although a preferred embodiment of the present invention has been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A method of receiving a sounding reference signal (SRS) by a base station, the method comprising:
   transmitting, to User Equipment (UE), at least one parameter set comprising an antenna configuration and a transmission bandwidth configured to transmit an aperiodic sounding reference signal (A-SRS) by Radio Resource Control (RRC) signaling;
   generating a radio control signal for a Downlink Control Signal (DCI) Format 4 comprising 2-bits or 3-bits of information instructing the UE to transmit the A-SRS in a radio resource area and indicating one of the at least one parameter set;
   transmitting, to the UE, the radio control signal; and
   receiving the A-SRS in the radio resource area by the indicated parameter set including the antenna configuration and the transmission bandwidth,
   wherein the 2-bits or 3-bits of information indicate A-SRS activation state or no activation state, and
   state '0' of the 2-bits or 3-bits of information indicates the no A-SRS activation state, state '1' of the 2-bits or 3-bits of information indicates a first parameter set of the A-SRS activation state, state '2' of the 2-bits or 3-bits of information indicate a second parameter set of the A-SRS activation state, and state '3' of the 2-bits or 3-bits of information indicates a third parameter set of the A-SRS activation state.

2. The method of claim 1, wherein the antenna configuration comprises a number of antennas to be used.

3. A method of transmitting a sounding reference signal (SRS) by a user equipment (UE), comprising:
   receiving, from a base station (BS), at least one parameter set including an antenna configuration and a transmission bandwidth to transmit an aperiodic sounding reference signal (A-SRS) by Radio Resource Control (RRC) signaling;
   receiving, from the BS, a radio control signal for a Downlink Control Signal (DCI) Format 4 comprising 2-bits or 3-bits of information instructing the UE to transmit the A-SRS in a radio resource area and indicating one of the at least one parameter set;
   generating the A-SRS in the radio resource area by the indicated parameter set including the antenna configuration and the transmission bandwidth; and
   transmitting, to the BS, the A-SRS in the radio resource area,
   wherein the 2-bits or 3-bits of information indicate A-SRS activation state or no activation state, and
   state '0' of the 2-bits or 3-bits of information indicates the no A-SRS activation state, state '1' of the 2-bits or 3-bits of information indicates a first parameter set of the A-SRS activation state, state '2' of the 2-bits or 3-bits of information indicate a second parameter set of the A-SRS activation state, and state '3' of the 2-bits or 3-bits of information indicates a third parameter set of the A-SRS activation state.

4. The method of claim 3, wherein the antenna configuration comprises a number of antennas to be used.

5. An apparatus for receiving a sounding reference signal (SRS) by a base station, comprising:
   a transmission unit configured to transmit, to User equipment (UE), at least one parameter set including an antenna configuration and a transmission bandwidth to transmit an aperiodic sounding reference signal (A-SRS) by Radio Resource Control (RRC) signaling;
   a generation unit configured to generate a radio control signal for a Downlink Control Signal (DCI) Format 4 comprising 2-bits or 3-bits of information instructing the UE to transmit the A-SRS in a radio resource area and indicating one of the at least one parameter set;
   the transmission unit further configured to transmit, to the UE, generated radio control signal; and
   a receiver unit configured to receive the A-SRS in the radio resource area by the indicated parameter set including the antenna configuration and the transmission bandwidth,
   wherein the 2-bits or 3-bits of information indicate A-SRS activation state or no activation state, and
   state '0' of the 2-bits or 3-bits of information indicates the no A-SRS activation state, state '1' of the 2-bits or 3-bits of information indicates a first parameter set of the A-SRS activation state, state '2' of the 2-bits or 3-bits of information indicate a second parameter set of the A-SRS activation state, and state '3' of the 2-bits or 3-bits of information indicates a third parameter set of the A-SRS activation state.

6. The apparatus of claim 5, wherein the antenna configuration comprises a number of antennas to be used.

7. An apparatus for transmitting a sounding reference signal (SRS) by user equipment (UE), comprising:
   a receiving unit configured to receive, from a base station (BS), at least one parameter set including an antenna configuration and a transmission bandwidth to transmit an aperiodic sounding reference signal (A-SRS) by Radio Resource Control (RRC) signaling;

a receiving unit configured to receive, from the BS, a radio control signal for a Downlink Control Signal (DCI) Format 4 comprising 2-bits or 3-bits of information instructing the UE to transmit the A-SRS in a radio resource area and indicating one of the at least one parameter set;

a generating unit configured to generate the A-SRS in the radio resource area by the indicated one of the at least one parameter set including the antenna configuration and the transmission bandwidth;

a transmitting unit configured to transmit, to the BS, the A-SRS in the radio resource area, wherein the 2-bits or 3-bits of information indicate A-SRS activation state or no activation state, and state '0' of the 2-bits or 3-bits of information indicates the no A-SRS activation state, state '1' of the 2-bits or 3-bits of information indicates a first parameter set of the A-SRS activation state, state '2' of the 2-bits or 3-bits of information indicate a second parameter set of the A-SRS activation state, and state '3' of the 2-bits or 3-bits of information indicates a third parameter set of the A-SRS activation state.

8. The apparatus of claim 7, wherein the antenna configuration comprises a number of antennas to be used.

* * * * *